(12) United States Patent
Zhan et al.

(10) Patent No.: US 8,620,636 B2
(45) Date of Patent: Dec. 31, 2013

(54) INTERPRETING WELL TEST MEASUREMENTS

(75) Inventors: Lang Zhan, Pearland, TX (US); Fikri J. Kuchuk, Meudon (FR); James G. Filas, Saint Cloud (FR); Dhandayuthapani Kannan, Missouri City, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 834 days.

(21) Appl. No.: 11/674,449

(22) Filed: Feb. 13, 2007

(65) Prior Publication Data

US 2007/0162235 A1 Jul. 12, 2007

Related U.S. Application Data

(63) Continuation-in-part of application No. 11/211,892, filed on Aug. 25, 2005, now Pat. No. 7,478,555.

(60) Provisional application No. 60/804,585, filed on Jun. 13, 2006.

(51) Int. Cl.
*G06F 17/10* (2006.01)
*E21B 49/00* (2006.01)

(52) U.S. Cl.
CPC ...................................... *E21B 49/00* (2013.01)
USPC ................................. 703/10; 702/6; 700/282

(58) Field of Classification Search
USPC .......................... 703/1, 10, 9; 700/282; 702/6
See application file for complete search history.

(56) References Cited

U.S. PATENT DOCUMENTS

| | | | |
|---|---|---|---|
| 3,217,804 A | 11/1965 | Peter | |
| 4,423,625 A | 1/1984 | Bostic, III | |
| 4,797,821 A | 1/1989 | Petak | |
| 4,860,581 A | 8/1989 | Zimmerman | |
| 4,915,168 A | 4/1990 | Upchurch | |
| 5,186,048 A | 2/1993 | Foster et al. | |
| 5,375,658 A | 12/1994 | Schultz et al. | |
| 5,458,192 A * | 10/1995 | Hunt | 166/250.1 |
| 5,826,662 A | 10/1998 | Beck | |
| 5,887,652 A | 3/1999 | Beck et al. | |
| 5,992,519 A * | 11/1999 | Ramakrishnan et al. | 166/250.15 |
| 6,029,744 A | 2/2000 | Baird | |
| 6,041,860 A | 3/2000 | Nazzal et al. | |
| 6,109,372 A | 8/2000 | Dorel et al. | |

(Continued)

FOREIGN PATENT DOCUMENTS

| | | |
|---|---|---|
| EP | 0295923 B1 | 12/1988 |
| EP | 0210110 B1 | 1/1993 |
| EP | 1712733 A1 | 10/2006 |

OTHER PUBLICATIONS

Beatriz del Socorro Salas., "Closed Chamber Well Test Including Frictional Effects", Aug. 1986., 91 Pages.*

(Continued)

*Primary Examiner* — Eunhee Kim
(74) *Attorney, Agent, or Firm* — Jeffery R. Peterson; Brandon Clark

(57) ABSTRACT

Based on measurements that are obtained from a well test, a pressure in the well is modeled as a function of at least a skin effect factor that varies with time. The results of the modeling may be used to estimate at least one well parameter, such as a formation parameter and/or a well pressure, as examples.

19 Claims, 21 Drawing Sheets

(56) References Cited

U.S. PATENT DOCUMENTS

| | | |
|---|---|---|
| 6,173,772 B1 | 1/2001 | Vaynshteyn |
| 6,236,620 B1 * | 5/2001 | Schultz et al. ............... 367/82 |
| 6,325,146 B1 | 12/2001 | Ringgenberg |
| 6,330,913 B1 | 12/2001 | Langseth |
| 6,357,525 B1 | 3/2002 | Langseth et al. |
| 6,382,315 B1 | 5/2002 | Langseth |
| 6,408,953 B1 * | 6/2002 | Goldman et al. ............ 175/39 |
| 6,446,719 B2 | 9/2002 | Ringgenberg |
| 6,446,720 B1 | 9/2002 | Ringgenberg |
| 6,457,521 B1 | 10/2002 | Langseth |
| 6,598,682 B2 | 7/2003 | Johnson |
| 6,622,554 B2 | 9/2003 | Manke |
| 6,631,763 B1 | 10/2003 | Self |
| 7,027,968 B2 * | 4/2006 | Choe et al. ................... 703/10 |
| 7,089,167 B2 * | 8/2006 | Poe ................................ 703/10 |
| 7,114,385 B2 | 10/2006 | Fisseler et al. |
| RE39,583 E | 4/2007 | Upchurch |
| 7,490,028 B2 * | 2/2009 | Sayers et al. .................. 703/10 |
| 2003/0033866 A1 | 2/2003 | Diakonov |
| 2003/0225522 A1 | 12/2003 | Poe |

OTHER PUBLICATIONS

Ayoub et al., "Impulse Testing," SPE Formation, vol. 4, No. 3, Sep. 1988, pp. 534-546.

Bourdet et al., "A new set of type curves simplifies well test analysis," World Oil, vol. 196, No, 5, May 1983, pp. 1-7.

Bourdet et al., "Use of pressure derivative in well test interpretation", SPE Formation Evaluation, vol. 5. No. 2, Jun. 1989. pp. 293-302.

Kuchuk, "A new method for determination of reserver pressure," SPE paper 56418, presented at SPE annual technical conference and exhibition, Houston, Texas, Oct. 3-6, 1989, pp. 1-12.

Kuchuk et al., "Analysis of simultaneously measured pressure and sandface flow rate in transient well test," Journal of Petroleum Technology, vol. 37, No. 1, Feb. 1985, pp. 323-334.

* cited by examiner

700 ◆ First estimated flow rate
702 --- Initial flow rate model
704 — Final estimated flow rate 710 □ BHP Test data
714 --- BHP Analytical
716 — BHP Numerical 720 —+— Small skin from perforation, and efficient clean-up
722 —△— Small skin from perforation, but inefficient clean-up
724 —□— Large skin from perforation, but efficient clean-up
726 —✕— Large skin from perforation, and inefficient clean-up

INTERPRETING WELL TEST MEASUREMENTS

This application claims the benefit under 35 U.S.C. §119 (e) to U.S. Provisional Application Ser. No. 60/804,585, entitled, "INTERPRETATION METHOD FOR PRESSURE TRANSIENT TESTING IN VARIABLE FLOW RATE AND VARIABLE DAMAGE CONDITION," which was filed on Jun. 13, 2006, and is a continuation-in-part of U.S. Pat. No. 7,478,555, entitled, "TECHNIQUE AND APPARATUS FOR USE IN WELL TESTING," which issued on Jan. 20, 2009, each of which is hereby incorporated by reference in its entirety.

BACKGROUND

The invention generally relates to interpreting well test measurements.

An oil and gas well typically is tested for purposes of determining the reservoir productivity and other key properties of the subterranean formation to assist in decision making for field development. The testing of the well provides such information as the formation pressure and its gradient; the average formation permeability and/or mobility; the average reservoir productivity; the permeability/mobility and reservoir productivity values at specific locations in the formation; the formation damage assessment near the wellbore; the existence or absence of a reservoir boundary; and the flow geometry and shape of the reservoir. Additionally, the testing may be used to collect representative fluid samples at one or more locations.

Various testing tools may be used to obtain the information listed above. One such tool is a wireline tester, a tool that withdraws only a small amount of the formation fluid and may be desirable in view of environmental or tool constraints. However, the wireline tester only produces results in a relatively shallow investigation radius; and the small quantity of the produced fluid sometimes is not enough to clean up the mud filtrate near the wellbore, leading to unrepresentative samples being captured in the test.

Due to the limited capability of the wireline tester, testing may be performed using a drill string that receives well fluid. As compared to the wireline tester, the drill string allows a larger quantity of formation fluid to be produced in the test, which, in turn, leads to larger investigation radius, a better quality fluid sample and a more robust permeability estimate. In general, tests that use a drill string may be divided into two categories: 1.) tests that produce formation fluid to the surface (called "drill stem tests" (DSTs)); and 2.) tests that do not flow formation fluid to the surface but rather, flow the formation fluid into an inner chamber of the drill string (called "closed chamber tests" (CCTs), or "surge tests").

For a conventional DST, production from the formation may continue as long as required since the hydrocarbon that is being produced to the surface is usually flared via a dedicated processing system. The production of this volume of fluid ensures that a clean hydrocarbon is acquired at the surface and allows for a relatively large radius of investigation. Additionally, the permeability calculation that is derived from the DST is also relatively simple and accurate in that the production is usually maintained at a constant rate by means of a wellhead choke. However, while usually providing relatively reliable results, the DST typically has the undesirable characteristic of requiring extensive surface equipment to handle the produced hydrocarbons, which, in many situations, poses an environmental handling hazard and requires additional safety precautions.

In contrast to the DST, the CCT is more environmentally friendly and does not require expensive surface equipment because the well fluid is communicated into an inner chamber (called a "surge chamber") of the drill string instead of being communicated to the surface of the well. However, due to the downhole confinement of the fluid that is produced in a CCT, a relatively smaller quantity of fluid is produced in a CCT than in a DST. Therefore, the small produced fluid volume in a CCT may lead to less satisfactory wellbore cleanup. Additionally, the mixture of completion, cushion and formation fluids inside the wellbore and the surge chamber may deteriorate the quality of any collected fluid samples. Furthermore, in the initial part of the CCT, a high speed flow of formation fluid (called a "surge flow") enters the surge chamber. The pressure signal (obtained via a chamber-disposed pressure sensor) that is generated by the surge flow may be quite noisy, thereby affecting the accuracy of the formation parameters that are estimated from the pressure signal.

For reservoirs with weak pressure, the upper end of the surge chamber may be open to production facilities or temporary processing system during the test. This type of test is called "slug test". When the wellbore liquid column, or the "slug", reaches the surface, the slug test terminates and a conventional DST starts. A slug test has the similar characteristics of a surge flow as a CCT, so it shares the similar issues in its data interpretation. Many other operations, such underbalanced perforating using a wireline conveyed gun, may also lead to similar issues when analyzing the measured data. The primary feature of these tests is the variation of skin effect factor due to the continuous increase in damage from the injection of incompatible fluids, or, a continuous decrease in skin factor from clean-up. The variation of skin effect factor is often, but not always, compounded with variable flow rate, making the problem more challenging.

The data that is obtained from a CCT, slug test, or other tests with surge flow, may be relatively difficult to interpret due to complicated wellbore dynamics and other effects. Thus, there exists a continuing need for better ways to interpret test results that are obtained from these tests.

SUMMARY

In an embodiment of the invention, based on measurements that are obtained from a well test, a pressure in the well is modeled as a function of at least a skin effect factor that varies with time.

Advantages and other features of the invention will become apparent from the following description, drawing and claims.

DETAILED DESCRIPTION

Figure 1:
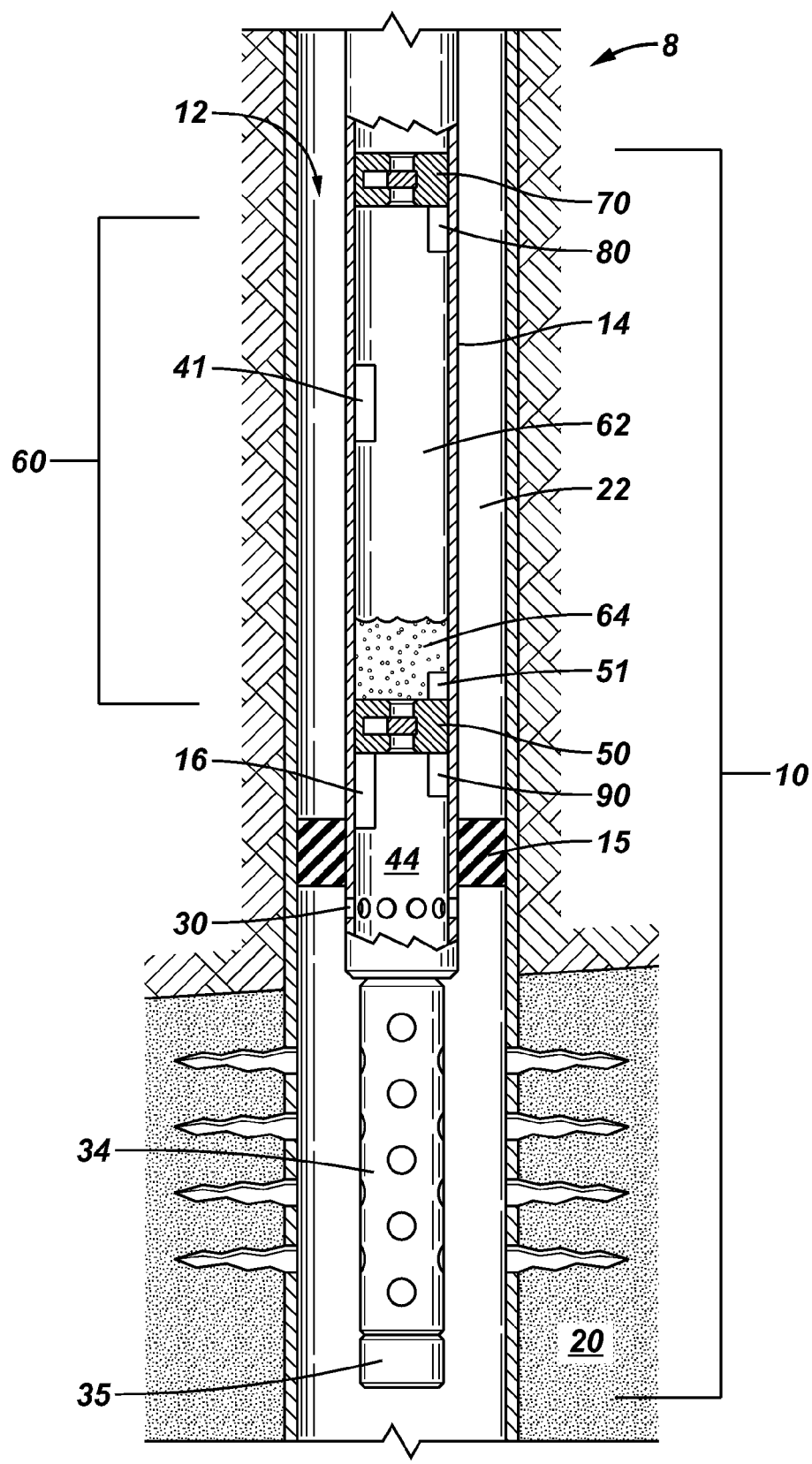
FIG. 1 is a schematic diagram of a closed chamber testing system before a bottom valve of the system is open and a closed chamber test begins, according to an embodiment of the invention.

Referring to FIG. 1, as compared to a conventional closed chamber testing (CCT) system, a CCT system 10 in accordance with an embodiment of the invention obtains more accurate bottom hole pressure measurements, thereby leading to improved estimation of formation property parameters of a well 8 (a subsea well or a non-subsea well). The CCT system 10 may also offer an improvement over results obtained from wireline testers or other testing systems that have more limited radii of investigation. Additionally, as described below, the CCT system 10 may provide better quality fluid samples for pressure volume temperature (PVT) and flow assurance analyses.

The design of the CCT system 10 is based on at least the following findings. During a closed chamber test using a conventional CCT system, the formation fluid is induced to flow into a surge chamber and the test is terminated sometime after the wellbore pressure and formation pressure reach equilibrium. Occasionally, a shut-in at the lower portion of the surge chamber is implemented after pressure equilibrium has been reached, in order to conduct other operations, but there is no method to determine an appropriate shut-in time in a conventional CCT system. The pressure in the CCT system's surge chamber has a strong adverse effect on the bottom hole pressure measurement, thereby making the interpretation of formation properties from the bottom hole pressure data inaccurate. However, it has been discovered that the surge chamber pressure effect on the bottom hole pressure may be eliminated, in accordance with the embodiments of the invention described herein, by shutting in, or closing, the surge chamber to isolate the chamber from the bottom hole pressure at the appropriate time (herein called the "optimal time" and further described below).

The optimal time is reached when the surge chamber is almost full while the bottom hole pressure is still far from equilibrium with formation pressure. The signature of this optimal time can be identified by a variety of ways (more detailed description of the optimal time is given in the following). Additionally, as further described below, closing the surge chamber at the optimal time enables the well test to produce almost the full capacity of the chamber to improve clean up of the formation and expand the radius of investigation into the formation, as compared to conventional CCTs. After the bottom valve of the surge chamber is shut-in, the upper surge chamber does not adversely affect the quality of the recorded pressure at a location below the bottom valve. The pressure thusly measured below the bottom valve during this shut-in time is superior for inferring formation properties.

The various embodiments of this invention described herein are generally geared toward determining this optimal time and controlling the various components in the system accordingly in order to realize improved test results.

Turning now to the more specific details of the CCT system 10, in accordance with some embodiments of the invention, the CCT system 10 is part of a tubular string 14, such as drill string (for example), which extends inside a wellbore 12 of the well 8. The tubular string 14 may be a tubing string other than a drill string, in other embodiments of the invention. The wellbore 12 may be cased or uncased, depending on the particular embodiment of the invention. The CCT system 10 includes a surge chamber 60, an upper valve 70 and a bottom valve 50. The upper valve 70 controls fluid communication between the surge chamber 60 and the central fluid passageway of the drill string 14 above the surge chamber 60; and the bottom valve 50 controls fluid communication between the surge chamber 60 and the formation. Thus, when the bottom valve 50 is closed, the surge chamber 60 is closed, or isolated, from the well.

FIG. 1 depicts the CCT system 10 in its initial state prior to the CCT (herein called the "testing operation"). In this initial state, both the upper 70 and bottom 50 valves are closed. The upper valve 70 remains closed during the testing operation. As further described below, the CCT system 10 opens the bottom valve 50 to begin the testing operation and closes the bottom valve 50 at the optimal time to terminate the surge flow and isolate the surge chamber from the bottom hole wellbore. As depicted in FIG. 1, in accordance with some embodiments of the invention, prior to the testing operation, the surge chamber 60 may include a liquid cushion layer 64 that partially fills the chamber 60 to leave an empty region 62 inside the chamber 60. It is noted that the region 62 may be filled with a gas (a gas at atmospheric pressure, for example) in the initial state of the CCT system 10 (prior to the CCT), in accordance with some embodiments of the invention.

For purposes of detecting the optimal time to close the bottom valve 50, the CCT system 10 measures at least one downhole parameter that is responsive to the flow of well fluid into the surge chamber 60 during the testing operation. In accordance with the various embodiments of the invention, one or more sensors can be installed anywhere inside the surge chamber 60 or above the surge chamber in the tubing 14 or in the wellbore below the valve 50, provided these sensors are in hydraulic communication with the surge chamber or wellbore below the valve 50. As a more specific example, the CCT system 10 may include an upper gauge, or sensor 80, that is located inside and near the top of the surge chamber 60 for purposes of measuring a parameter inside the chamber 60. In accordance with some embodiments of the invention, the upper sensor 80 may be a pressure sensor to measure a chamber pressure, a pressure that exhibits a behavior (as further described below) that may be monitored for purposes of determining the optimal time to close the bottom valve 50. The sensor 80 is not limited to being a pressure sensor, however, as the sensor 80 may be one of a variety of other non-pressure sensors, as further described below.

The CCT system 10 may include at least one additional and/or different sensor than the upper sensor 80, in some embodiments of the invention. For example, in some embodiments of the invention, the CCT system 10 includes a bottom gauge, or sensor 90, which is located below the bottom valve 50 (and outside of the surge chamber 60) to sense a parameter upstream of the bottom valve 50. More specifically, in accordance with some embodiments of the invention, the bottom sensor 90 is located inside an interior space 44 of the string 14, a space that exists between the bottom valve 50 and radial ports 30 that communicate well fluid from the formation to the surge chamber 60 during the testing operation. The sensor 90 is not restricted to interior space 44, as it could be anywhere below valve 50 in the various embodiments of the invention.

In some embodiments of the invention, the bottom sensor 90 is a pressure sensor that provides an indication of a bottom hole pressure; and as further described below, in some embodiments of the invention, the CCT system 10 may monitor the bottom hole pressure to determine the optimal time to close the bottom valve 50.

Determining the optimal time to close the bottom valve 50 and subsequently extract formation properties may be realized either via the logged data from a single sensor, such as the bottom sensor 90, or from multiple sensors. If the bottom sensor 90 has the single purpose of determining the optimal valve 50 closure time, the sensor 90 may be located above or below the bottom valve 50 in any location inside the surge chamber 60 or string space 44 without compromising its capability, although placement inside space 44 below the bottom valve 50 is preferred in some embodiments of the invention. However, in any situation, at least one sensor is located below the bottom valve 50 to log the wellbore pressure for extracting formation properties. In the following description, the bottom sensor 90 is used for both determining optimal time to close the bottom valve 50 and logging bottom wellbore pressure history for extracting formation properties, although different sensor(s) and/or different sensor location(s) may be used, depending on the particular embodiment of the invention.

Thus, the upper 80 and/or bottom 90 sensor may be used either individually or simultaneously for purposes of monitoring a dynamic fluid flow condition inside the wellbore to time the closing of the bottom valve 50 (i.e., identify the "optimal time") to end the flowing phase of the testing operation. More specifically, in accordance with some embodiments of the invention, the CCT system 10 includes electronics 16 that receives indications of measured parameter(s) from the upper 80 and/or lower 90 sensor. As a more specific example, for embodiments of the invention in which the upper 80 and lower 90 sensors are pressure sensors, the electronics 16 monitors at least one of the chamber pressure and the bottom hole pressure to recognize the optimal time to close the bottom valve 50. Thus, in accordance with the some embodiments of the invention, the electronics 16 may include control circuitry to actuate the bottom valve 50 to close the valve 50 at a time that is indicated by the bottom hole pressure or chamber pressure exhibiting a predetermined characteristic. Alternatively, in some embodiments of the invention, the electronics 16 may include telemetry circuitry for purposes of communicating indications of the chamber pressure and/or bottom hole pressure to the surface of the well so that a human operator (or a computer, as another example) may monitor the measured parameter(s) and communicate with the electronics 16 to close the bottom valve 50 at the appropriate time.

It is noted that the chamber pressure and/or bottom hole pressure may be logged by the CCT system 10 (via a signal that is provided by the sensor 80 and/or 90) during the CCT testing operation for purposes of allowing key formation properties to be extracted from the CCT.

Therefore, to summarize, in some embodiments of the invention, the CCT system 10 may include electronics 16 that monitors one or more parameters that are associated with the testing operation and automatically controls the bottom valve 50 accordingly; and in other embodiments of the invention, the bottom valve 50 may be remotely controlled from the surface of the well in response to downhole measurements that are communicated uphole. The remote control of the bottom valve 50 may be achieved using any of a wide range of wireless communication stimuli, such as pressure pulses, radio frequency (RF) signals, electromagnetic signals, or acoustic signals, as just a few examples. Furthermore, cable or wire may extend between the bottom valve 50 and the surface of the well for purposes of communicating wired signals between the valve 50 and the surface to control the valve 50. Other valves that are described herein may also be controlled from the surface of the well using wired or wireless signals, depending on the particular embodiment of the invention. Thus, many variations are possible and are within the scope of the appended claims.

Among the other features of the CCT system 10, the CCT system 10 includes a packer 15 to form an annular seal between the exterior surface of the string 14 and the wellbore wall. When the packer 15 is set, a sealed testing region 20 is formed below the packer 15. When the bottom valve 50 opens to begin the testing operation, well fluid flows into the radial ports 30, through the bottom valve 50 and into the chamber 60. As also depicted in FIG. 1, in accordance with some embodiments of the invention, the CCT system 10 includes a perforation gun 34 and another surge apparatus 35 that is sealed off from the well during the initial deployment of the CCT system 10. Prior to the beginning of the testing operation, perforating charges may be fired or another technique may be employed to establish communication of fluid flow between formation 20 and a wellbore 21 for purposes of allowing fluid to flow into the gun 34 and surge apparatus 35. This inflow of fluid into the surge apparatus 35 prior to the testing operation permits better perforation and clean up. Depending on the particular embodiment of the invention, the surge apparatus 35 may be a waste chamber that, in general, may be opened at any time to collect debris, mud filtrate or non-formation fluids (as examples) to improve the quality of fluid that enters the surge chamber 60.

In other embodiments of the invention, the surge apparatus 35 may include a chamber and a chamber communication device to control when fluid may enter the chamber. More specifically, the opening of fluid communication between the chamber of the surge apparatus 35 and the wellbore 21 may be timed to occur simultaneously with a local imbalance to create a rapid flow into the chamber. The local imbalance may be caused by the firing of one or more shaped charges of the perforation gun 35, as further described in U.S. Pat. No. 6,598,682 entitled, "RESERVOIR COMMUNICATION WITH A WELLBORE," which issued on Jul. 29, 2003.

Figure 2:
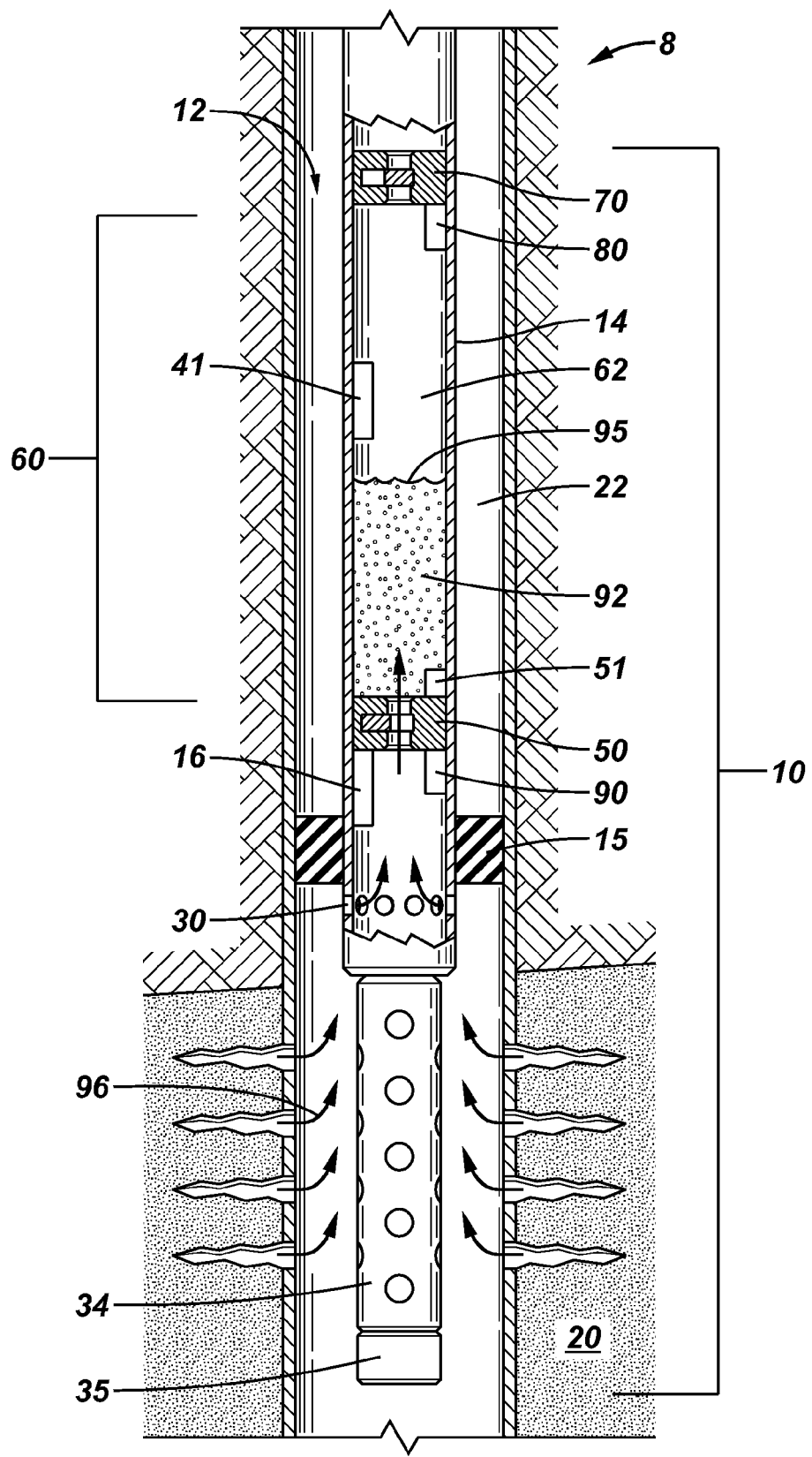
FIG. 2 is a schematic diagram of the closed chamber testing system illustrating the flow of well fluid into a surge chamber of the system during a closed chamber test according to an embodiment of the invention.

For purposes of capturing a representative fluid sample from the well, in accordance with some embodiments of the invention, the CCT system 10 includes a fluid sampler 41 that is in communication with the surge chamber 60, as depicted in FIG. 2. The fluid sampler 41 may be operated remotely from the surface of the well or may be automatically operated by the electronics 16, depending on the particular embodiment of the invention. The location of the fluid sampler 41 may vary, depending on the particular embodiment of the invention. For example, the fluid sample may be located below in the bottom valve 50 in the space 44, in other embodiments of the invention. Thus, many variations are possible and are within the scope of the appended claims.

FIG. 2 depicts the CCT system 10 during the CCT testing operation when the bottom valve 50 is open. As shown, well fluid flows through the radial ports 30, through the bottom valve 50 and into the surge chamber 60, thereby resulting in a flow 96 from the formation. As the well fluid accumulates in the surge chamber 60, a column height 95 of the fluid rises inside the chamber 60. Measurements from one or both of the sensors 80 and 90 may be monitored during the testing operation; and the fluid sampler 41 may be actuated at the appropriate time to collect a representative fluid sample. As further described below, at an optimal time indicated by one or more downhole measurements, the bottom valve 50 closes to end the fluid flow into the surge chamber 60.

After the surge flow ends, the sensor 90 below the bottom valve 50 continues to log wellbore pressure until an equilibrium condition is reached between the formation and the wellbore, or, a sufficient measurement time is reached. The data measured by sensor 90 contains less noise after the bottom-valve 50 closes, yielding a better estimation of formation properties. The fluid samples that are subsequently captured below the bottom valve 50 after its closure are of a higher quality because of their isolation from contamination due to debris and undesirable fluid mixtures that may exist in the surge chamber. After the test is completed, a circulating valve 51 and upper valve 70 are opened. The produced liquid in the surge chamber can be circulated out by injecting a gas from the wellhead through pipe string 14 or a wellbore annulus 22 above the packer 15. The entire surge chamber can then be reset to be able to conduct another CCT test again. This sequence may be repeated as many times as required.

Figure 3:
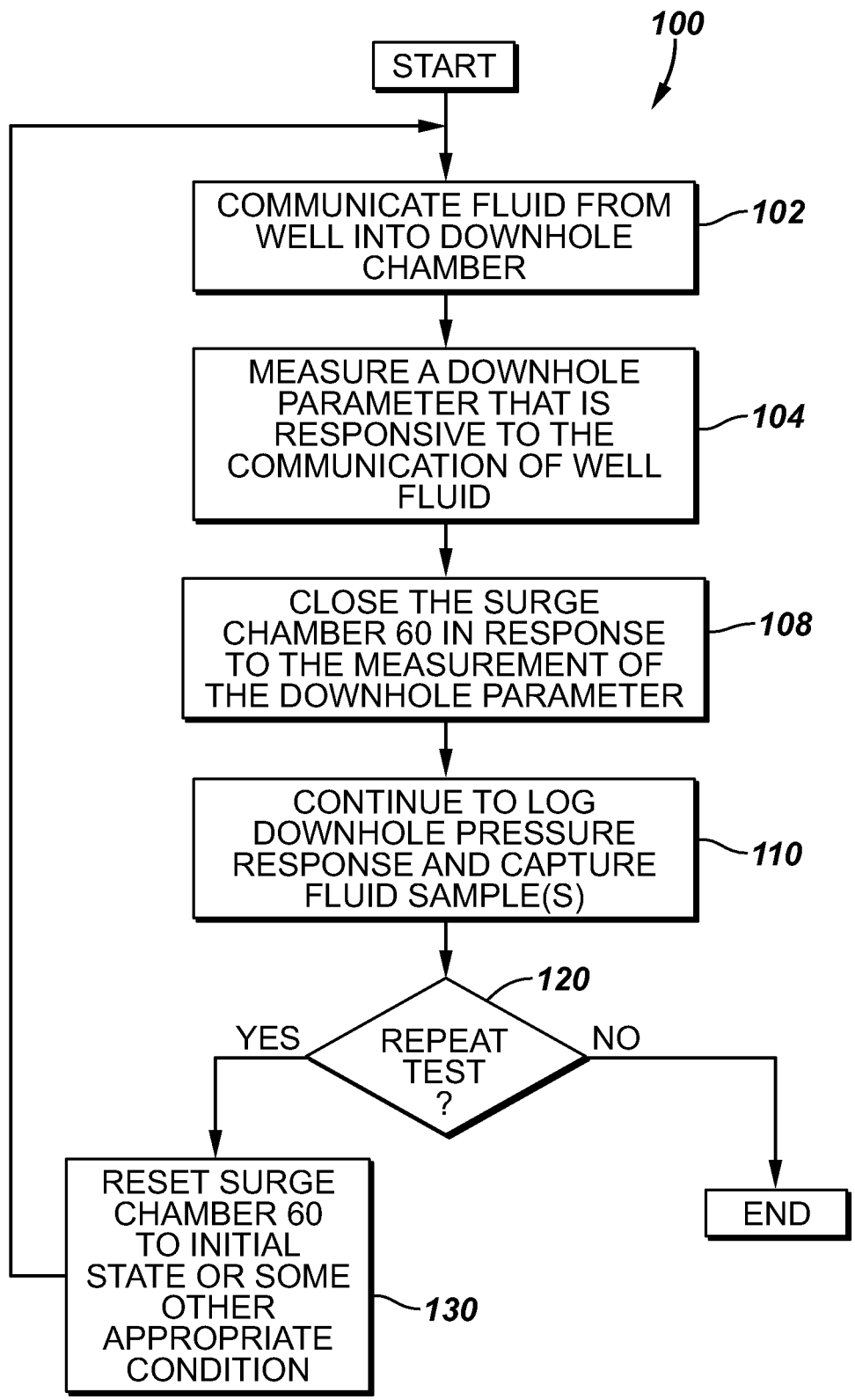
FIG. 3 is a flow diagram depicting a technique to isolate the surge chamber of the closed chamber testing system from the formation at the conclusion of the closed chamber test according to an embodiment of the invention.

To summarize, the CCT system 10 may be used in connection with a technique 100 that is generally depicted in FIG. 3. Pursuant to the technique 100, fluid is communicated from the well into a downhole chamber, pursuant to block 102. A downhole parameter that is responsive to this communication of well fluid is monitored, as depicted in block 104. A determination is made (block 108) when to close, or isolate, the surge chamber 60 from the well, in response to the monitoring of the downhole parameter, as depicted in block 108. Thus, as examples, the bottom valve 50 may be closed in response to the monitored downhole parameter reaching a certain threshold or exhibiting a given time signature (as just a few examples), as further described below.

After the surge chamber 60 is closed, the bottom hole pressure continues to be logged, and finally, one or more fluid samples are captured (using the fluid sampler 41), as depicted in block 110. A determination is then made (diamond 120) whether further testing is required, and if so, the surge chamber 60 is reset (block 130) to its initial state or some other appropriate condition, which may include, for example, circulating out the produced liquid inside the surge chamber 60 via the circulating valve 51 (see FIG. 2, for example). Thus, blocks 102-130 may be repeated until no more testing is needed.

Figure 4:
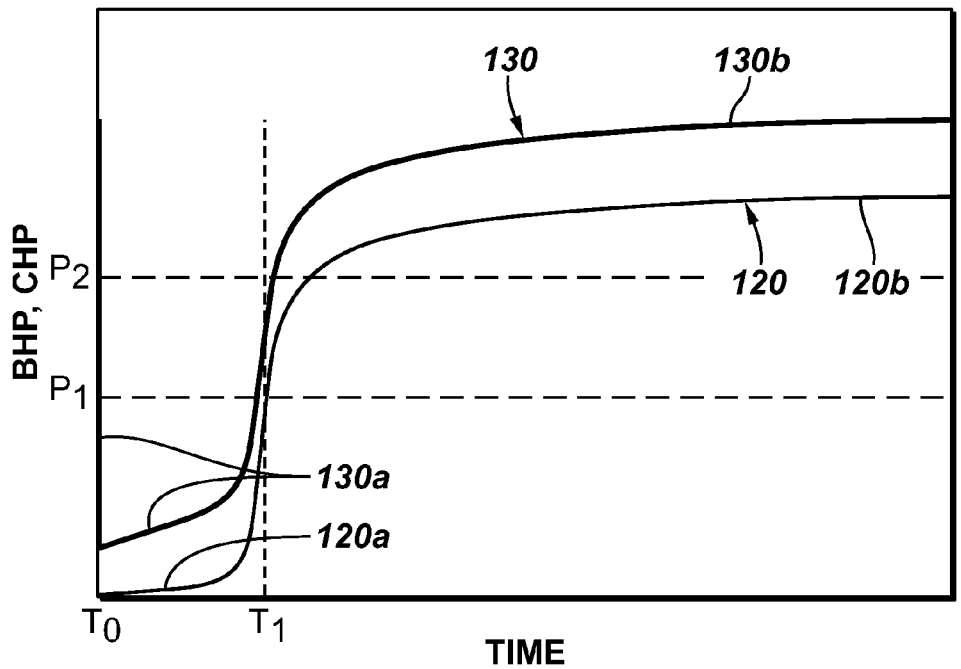
FIG. 4 depicts exemplary waveforms of a bottom hole pressure and a surge chamber pressure that may occur in connection with a closed chamber test according to an embodiment of the invention.

In some embodiments of the invention, the upper 80 and lower 90 sensors may be pressure sensors to provide indications of the chamber pressure and bottom hole pressure, respectively. For these embodiments of the invention, FIG. 4 depicts exemplary waveforms 120 and 130 for the chamber pressure and bottom hole pressure, respectively, which generally illustrate the pressures that may arise in connection with a CCT testing operation. Referring to FIG. 4, soon after the bottom valve 50 is open at time $T_0$ begin the testing operation, the bottom hole pressure waveform 130 decreases rapidly to a minimum pressure. Because as formation fluid flows into the surge chamber 60 the liquid column inside the chamber 60 rises, the bottom hole pressure increases due to the increasing hydrostatic pressure at the location of the lower sensor 90. Therefore, as depicted in FIG. 4, the bottom hole pressure waveform 130 includes a segment 130a during which the bottom hole pressure rapidly decreases at time $T_0$ and then increases from approximately time $T_0$ time $T_1$ due to the increasing hydrostatic pressure.

In addition to the hydrostatic pressure effect, other factors also have significant influences on the bottom hole pressure, such as wellbore friction, inertial effects due to the acceleration of fluid, etc. One of the key influences on the bottom hole pressure originates with the chamber pressure that is communicated to the bottom hole pressure through the liquid column inside the surge chamber 60. As depicted in FIG. 4 by a segment 120*a* of the chamber pressure waveform 120, the chamber pressure gradually increases during the initial testing period from time $T_0$ time $T_1$. The gradual increase in the chamber pressure during this period is due to liquid moving into the surge chamber 60, leading to the continuous shrinkage of the gas column 62 (see FIG. 2, for example). The magnitude of the chamber pressure increase is approximately proportional to the reduction of the gas column volume based on the equation of state for the gas. However, as the testing operation progresses, the gas column 62 shrinks to such an extent that no more significant volume reduction of the column 62 is available to accommodate the incoming formation fluid. The chamber pressure then experiences a dramatic growth since formation pressure starts to be passed onto the chamber pressure via the liquid column.

More particularly, in the specific example that is shown in FIG. 4, the dramatic increase in the chamber pressure waveform 120 occurs at time $T_1$, a time at which the chamber pressure waveform 120 abruptly increases from the lower pressure segment 120*a* to a relatively higher pressure segment 120*b*. While the formation pressure acts on the chamber pressure directly after time $T_1$, the reverse action is also true: the chamber pressure affects the bottom hole pressure. Thus, as depicted in FIG. 4, at time $T_1$, the bottom hole pressure waveform 130 also abruptly increases from the lower pressure segment 130*a* to a relatively higher pressure segment 130*b*.

The chamber pressure continuously changes during the testing operation because the gas chamber volume is constantly reduced, although with a much slower pace after the gas column can no longer be significantly compressed. Thus, as shown in FIG. 4, after time $T_1$, as illustrated by the segment 120*b*, the chamber pressure waveform 120 increases at a much slower pace. Solution gas that was previously released from the liquid column may possibly re-dissolve back into the liquid, depending on the pressure difference between the chamber pressure and the bubble point of produced liquid hydrocarbon. Therefore, conventional algorithms that do not properly account for the effect of the chamber pressure on the bottom hole pressure usually cannot provide a reliable estimate of formation properties. However, including all fluid transport and phase behavior phenomena in the gas chamber model is very complex. As described below, the CCT system 10 closes the bottom valve 50 to prevent the above-described dynamics of the chamber pressure from affecting the bottom hole pressure, thereby allowing the use of a relatively non-complex model to accurately estimate the formation properties.

More specifically, in accordance with some embodiments of the invention, the optimal time to close the bottom valve 50 is considered to occur when two conditions are satisfied: 1.) the surge chamber 60 is almost fall of liquid and virtually no more formation fluid is able to move into the chamber 60; and 2.) the bottom hole pressure is still much lower than the formation pressure.

In accordance with some embodiments of the invention, the optimal time for closing the bottom valve 50 occurs at the transition time at which the chamber pressure is no longer generally proportional to the reduction of the gas column and significant non-linear effects come into play to cause a rapid increase in the chamber pressure. At this time, the bottom hole pressure also rapidly increases due to the communication of the chamber pressure through the liquid column. As further described in the following, this optimal time also corresponds to the filling of the surge chamber to its approximate maximum capacity, which is then indicated by a variety of dynamic fluid transport signatures. Thus, referring to the example that is depicted in FIG. 4, the optimal time is a time near time $T_1$ (i.e., a time somewhere in a range between a time slightly before time $T_1$ and a time slightly after time $T_1$), the time at which the chamber pressure and the bottom hole pressure abruptly rise. Therefore, the chamber pressure and/or bottom hole pressure may be monitored to identify the optimal time to close the bottom valve 50 depending on the particular embodiment of the invention.

In accordance with some embodiments of the invention, the electronics 16 may measure the bottom hole pressure (via the lower sensor 90) to detect when the bottom hole pressure increases past a predetermined pressure threshold (such as the exemplary threshold called "$P_2$" in FIG. 4). Thus, the electronics 16 may, during the testing operation, continually monitor the bottom hole pressure and close the bottom valve 50 to shut-in, or isolate, the surge chamber 60 from the formation in response to the bottom hole pressure exceeding the predetermined pressure threshold.

Alternatively, in some embodiments of the invention, the electronics 16 may monitor the chamber pressure to determine when to close the bottom valve 50. Thus, in accordance with some embodiments of the invention, the electronics 16 monitors the chamber pressure (via the upper sensor 80) to determine when the chamber pressure exceeds a predetermined pressure threshold (such as the exemplary threshold called "$P_1$" in FIG. 4); and when this threshold crossing is detected, the electronics 16 actuates the bottom valve 50 to close or isolate, the surge chamber 60 from the formation.

As discussed above, the pressure magnitude change in the chamber pressure is greater than the pressure magnitude change in the bottom hole pressure when the substantial non-linear effects begin. Thus, by monitoring the chamber pressure instead of the bottom hole pressure to identify the optimal time to close the bottom valve 50, a larger signal change (indicative of the change of the chamber pressure) may be used, thereby resulting in a larger signal-to-noise (S/N) ratio for signal processing. However, a possible disadvantage in using the chamber pressure versus the bottom hole pressure is that the surge chamber 60 may be relatively long (on the order of several thousand feet, for example); and thus, relatively long range telemetry may be needed to communicate a signal from the upper sensor 80 (located near the top end of the surge chamber 60 in some embodiments of the invention) to the electronics 16 (located near the bottom end of the surge chamber in some embodiments of the invention).

The chamber pressure and bottom hole pressure that are measured by the sensors 80 and 90 are only two exemplary parameters that may be used to identify the optimal time to close the bottom valve 50. For example, a sensor that is located at any place inside the surge chamber 60, space 44, or bottom hole wellbore 21 may also be used for this purpose without compromising the spirit of this invention. Depending on the location of the sensor, the measured pressure history will either more closely match that of sensor 80 or sensor 90.

Figure 5:
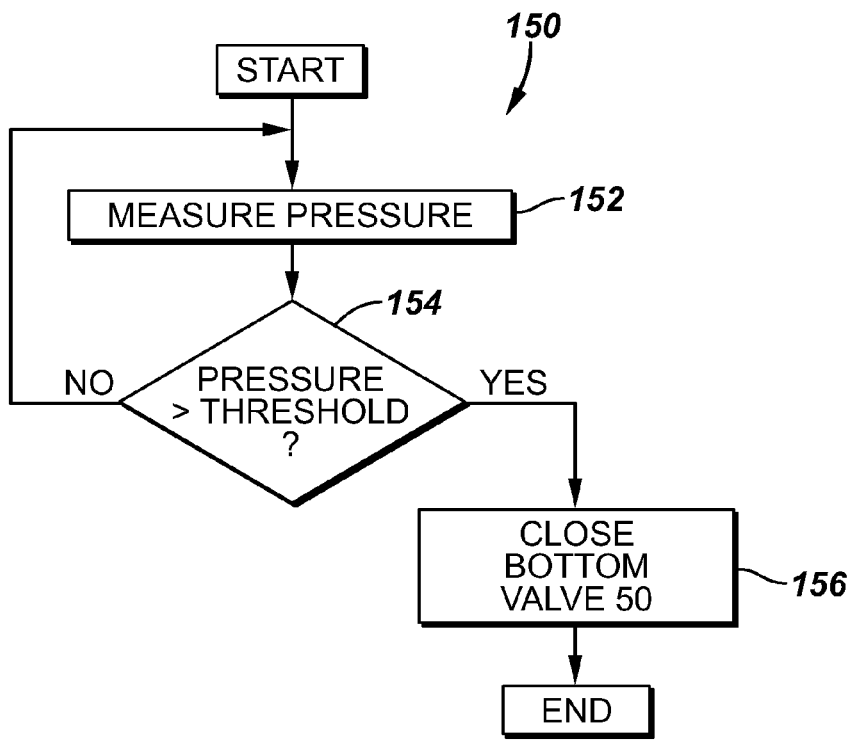
FIG. 5 is a flow diagram depicting a technique to use a measured pressure to time the closing of a bottom valve of the closed chamber testing system to end a closed chamber test according to an embodiment of the invention.

Regardless of the pressure that is monitored, a technique 150 (that is generally depicted in FIG. 5) may be used, in accordance with some embodiments of the invention, to control the bottom valve 50 during a CCT testing operation. Referring to FIG. 5, pursuant to the technique 150, a pressure (the bottom hole pressure or chamber pressure, as examples)

is monitored during the CCT testing operation, as depicted in block 152. A determination (diamond 154) is made whether the pressure has exceeded a predetermined threshold. If not, then the pressure monitoring continues (block 152). Otherwise, if the measured pressure exceeds the predetermined threshold, then the bottom valve 50 is closed (block 156).

FIG. 5 depicts the aspects of the CCT related to the determining the optimal time to close the bottom valve 50. Although not depicted in the figures, the technique 150 as well as the alternative CCT testing operations that are described below, may include, after the closing of the bottom valve 50, continued logging of the downhole pressure (such as the bottom hole pressure), the collection of one or more fluid samples, reinitialization of the surge chamber 60 and subsequent iterations of the CCT.

As mentioned above, many variations and embodiments of the invention are possible. For example, the bottom valve 50 may be controlled, pursuant to the technique 150, remotely from the surface of the well instead of automatically being controlled using the downhole electronics 16.

Figure 6:
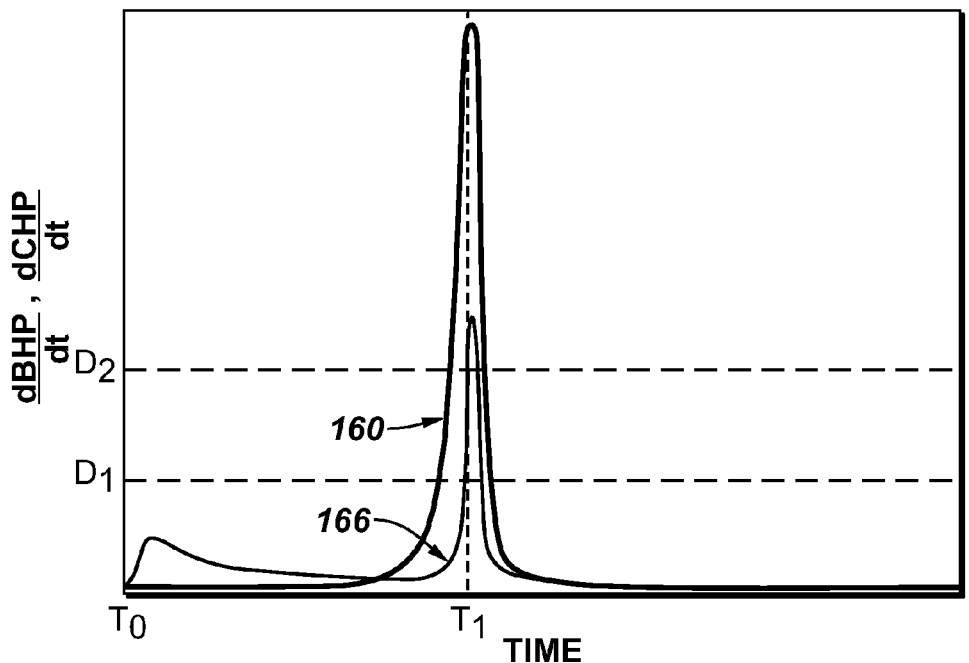
FIG. 6 depicts exemplary time derivative waveforms of a bottom hole pressure and a surge chamber pressure that may occur in connection with a closed chamber test according to an embodiment of the invention.

Other techniques in accordance with the many different embodiments of the invention may be used to detect the optimal time to close the bottom valve 50. For example, in other embodiments of the invention, the time derivative of either the chamber pressure or bottom hole pressure may be monitored for purposes of determining the optimal time to close the bottom valve 50. As a more specific example, referring to FIG. 6 in conjunction with FIG. 4, FIG. 6 depicts a waveform 160 of the first order time derivative of the chamber pressure waveform 120

$$\left(\text{i.e., } \frac{dCHP}{dt}\right)$$

and a waveform 166 of the first order time derivative of the bottom hole pressure waveform 130

$$\left(\text{i.e., } \frac{dBHP}{dt}\right).$$

As shown in FIG. 6, at time $T_1$ (the optimum time for this example), the waveforms 160 and 166 contain rather steep increases, or "spikes." These spikes are attributable to the abrupt changes in the bottom hole pressure 130 and chamber pressure 120 waveforms at time $T_1$, as depicted in FIG. 4. Therefore, in accordance with some embodiments of the invention, the first order time derivative of either the chamber pressure or the bottom hole pressure may be monitored to determine if the derivative surpasses a predetermined threshold.

For example, in some embodiments of the invention, the first order time derivative of the chamber pressure may be monitored to determine when the chamber pressure surpasses a rate threshold (such as an exemplary rate threshold called "$D_2$" that is depicted in FIG. 6). Upon detecting that the first order time derivative of the chamber pressure has surpassed the rate threshold, the electronics 16 responds to close the bottom valve 50.

In a similar manner, the electronics 16 may monitor the bottom hole pressure and thus, detect when the bottom hole pressure surpasses a predetermined rate threshold (such as an exemplary rate threshold called "$D_1$" that is depicted in FIG. 6) so that the electronics 16 closes the bottom valve 50 upon this occurrence. Similar to the detection of the magnitudes of the chamber pressure or bottom hole pressure exceeding predetermined pressure thresholds, the use of the chamber pressure time derivative may be beneficial in terms of S/N ratio; and the use of the bottom hole pressure time derivative may be more beneficial for purposes avoiding the problems that may be associated with long range telemetry between the upper sensor 80 and the electronics 16. Furthermore, as set forth above, instead of the electronics 16 automatically controlling the bottom valve 50 in response to the first order time derivative of the pressure reaching a threshold, the bottom valve 50 may be controlled remotely from the surface of the well. Thus, many variations are possible and are within the scope of the appended claims.

It is noted that in other embodiments of the invention, higher order derivatives or other characteristics of the bottom hole pressure or chamber pressure may be used for purposes of detecting the optimal time to close the bottom valve 50. Thus, many variations are possible and are within the scope of the appended claims.

Figure 7:
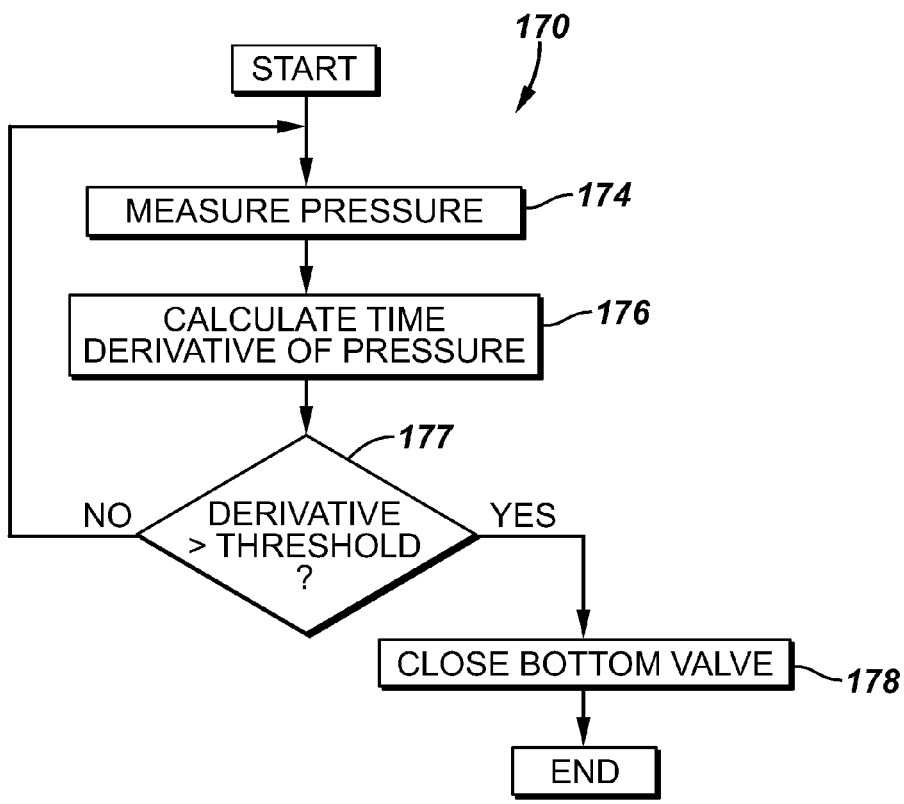
FIG. 7 is a flow diagram depicting a technique to use the time derivative of a measured pressure to time the closing of the bottom valve of the closed chamber testing system according to an embodiment of the invention.

To summarize, a technique 170 that is generally depicted in FIG. 7 may be used in accordance with some embodiments of the invention to determine the optimal time to close the bottom valve 50. Referring to FIG. 7, pursuant to the technique 170, a pressure is measured (block 174), and then a time derivative of the pressure is calculated (block 176). If a determination is made (diamond 177) that the derivative exceeds a predetermined derivative threshold, the bottom valve 50 is closed (block 178). Otherwise, the pressure continues to be measured (block 174), and the derivative continues to be calculated (block 176) until the threshold is reached.

Although, as described above, the optimal time to close the bottom valve 50 may be determined by comparing a pressure magnitude or its time derivative to a threshold, other techniques may be used in other embodiments of the invention using a measured pressure magnitude and/or its time derivative. For example, in other embodiments of the invention, the shape of the pressure waveform or the time derivative waveform (obtained from measurements) may be compared to a predetermined time signature for purposes of detecting a pressure magnitude or rate change that is expected to occur at the optimal closing time (see FIGS. 4 and 6) using what is generally known as a pattern recognition approach. Thus, an error analysis (as an example) may be performed to compare a "match" between a moving window of the pressure magnitude or derivative and an expected pressure magnitude/derivative time signature. When the calculated error falls below a predetermined threshold (as an example), then a match is detected that triggers the closing of the bottom valve 50.

In yet another embodiment of the invention, the measured pressure or its time derivative can be transformed into the frequency domain via a mathematical transformation algorithm, for example, a Fourier Transform or Wavelet Transform, to name a few. The pattern of the transformed data is then compared with the predetermined signature in the frequency domain to detect the arrival of the optimal time during the CCT.

Parameters other than pressure may be monitored to determine the optimal time to close the bottom valve 50 in other embodiments of the invention. For example, a flow rate may be monitored for purposes of determining the optimal time. More specifically, the sandface flow rate decreases to an insignificant magnitude at the optimal time to close the bottom valve 50. For purposes of measuring the flow rate, the bottom sensor 90 may be a downhole flow meter, such as a Venturi device, spinner or any other type of flow meter that uses physical, chemical or nuclear properties of the wellbore fluid.

Figure 8:
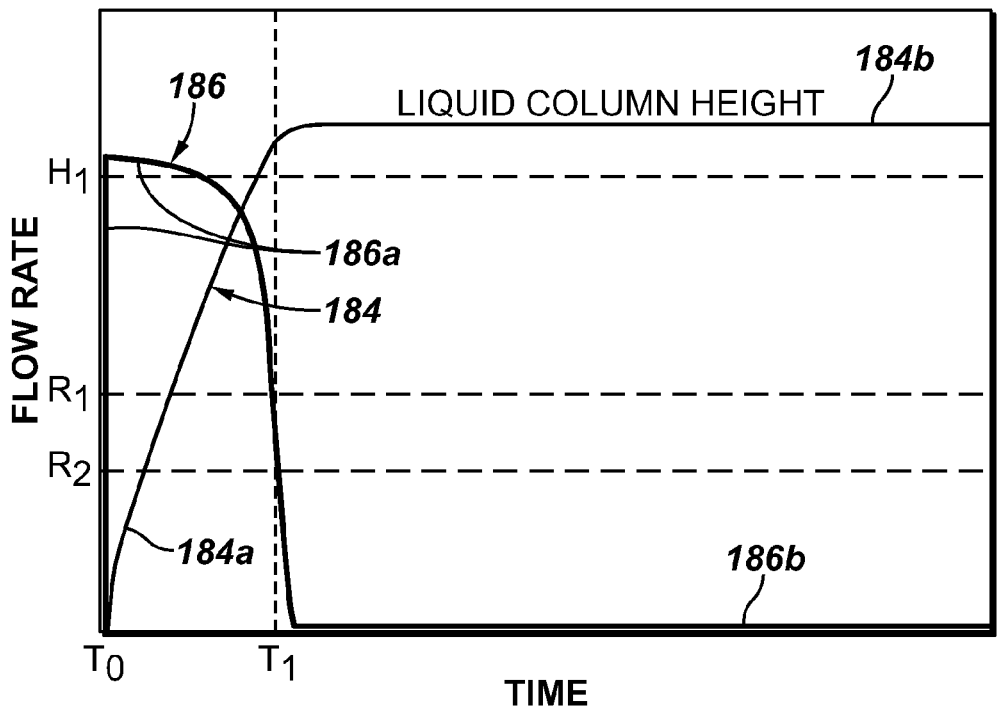
FIG. 8 depicts exemplary liquid column height and flow rate waveforms that may occur in connection with a closed chamber test according to an embodiment of the invention.

FIG. 8 depicts an exemplary flow rate waveform 186 that may be observed during a particular CCT testing operation. Near the beginning of the testing operation when the bottom valve 50 opens at time $T_0$, the flow rate abruptly increases from zero to a maximum value, as shown in the initial abrupt increase in the waveform 186 in a segment 186a of the waveform. After this abrupt increase, the flow rate decreases, as illustrated in the remaining part of the segment 186a of the waveform 186 from approximately time $T_0$ to time $T_1$. Near time $T_1$, the flow rate abruptly decreases to almost zero flow, as shown in the segment 186b. Thus, time $T_1$ is the optimal time for closing the bottom valve 50, as the flow rate experiences an abrupt downturn, indicating the beginning of more significant non-linear gas effects.

Thus, in some embodiments of the invention, the downhole flow rate may be compared to a predetermined rate threshold (such as an exemplary rate threshold called "$R_1$" that is depicted in FIG. 8) for purposes of determining the optimum time to close the bottom valve 50. When the flow rate decreases below the rate threshold, the electronics 16 (for example) responds to close the bottom valve 50. Other flow rate thresholds (such as an exemplary threshold called "$R_2$") may be used in other embodiments of the invention.

In other embodiments of the invention a parameter obtained from the flow rate measurement may be used to determine the optimal time to close the bottom valve 50. For example, the absolute value of the time derivative of the flow rate has a spike, similar to the pressure derivative "spike" shown in FIG. 6. Identifying this spike can also indicate the optimal time to close the bottom valve 50.

Figure 9:
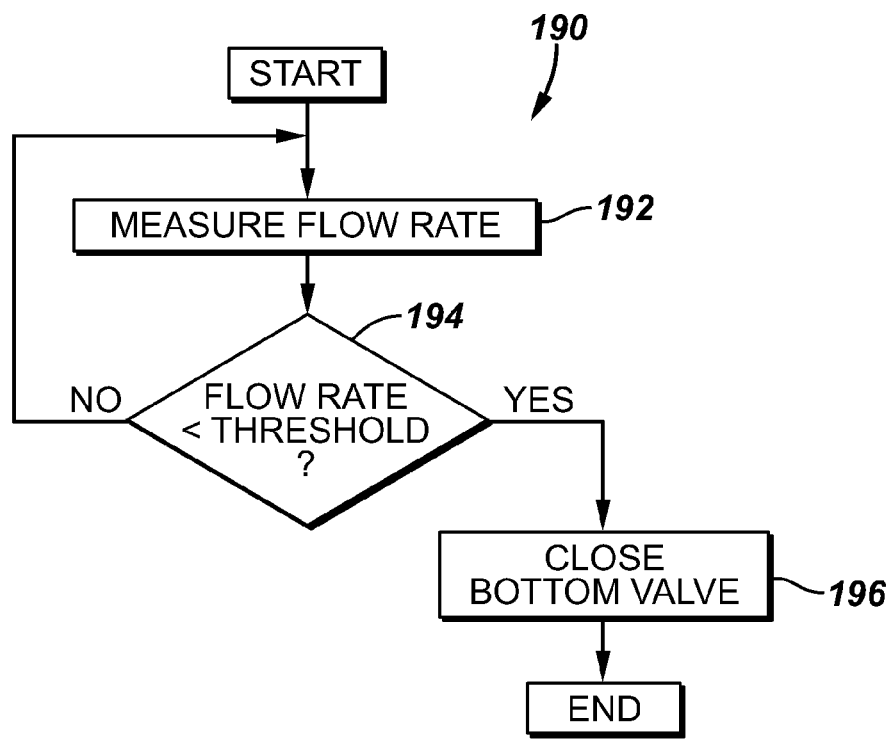
FIG. 9 is a flow diagram depicting a technique to use a measured flow rate to time the closing of the bottom valve of the closed chamber testing system according to an embodiment of the invention.

To summarize, in accordance with some embodiments of the invention, a technique 190 that is generally depicted in FIG. 9 may be used to control the bottom valve 50. Referring to FIG. 9, pursuant to the technique 190, a flow rate is measured (block 192) and then a determination is made (diamond 194) whether the flow rate has decreased below a predetermined rate threshold. If not, then one or more additional measurement(s) are made (block 192) until the flow rate decreases past the threshold (diamond 194). In response to detecting that the flow rate has decreased below the predetermined rate threshold, the bottom valve 52 is closed, as depicted in block 196.

Yet, in another embodiment of the invention, the measured flow rate or its time derivative can be transformed into the frequency domain via a mathematical transformation algorithm, for example, a Fourier Transform or Wavelet Transform, to name a few. The pattern of the transformed data is compared with the predetermined signature in the frequency domain to detect the arrival of the optimal time.

The height of the fluid column inside the chamber 60 is another parameter that may be monitored for purposes of determining the optimal time to close the bottom valve 50, as a specific height indicates the beginning of more significant non-linear gas effects. More specifically, a detectable cushion fluid or wellbore fluid (for example, a special additive in the mud, completion or cushion fluid) is placed in the surge chamber 60 before the testing. Thus, referring back to FIG. 1, this fluid may be the liquid cushion 64, for example. The detectable fluid may be anything that can be detected when it rises to a specified location in the surge chamber 60. At this specified location, the CCT system 10 includes a fluid detector. Thus, in some embodiments of the invention, the upper sensor 80 may be a fluid detector that is located at a predetermined height in the surge chamber 60 to indicate when the detectable fluid reaches the specified height. In other embodiments of the invention, the fluid detector may be separate from the upper sensor 80.

When the liquid column (or other detectable fluid) comes in close proximity to the fluid detector, the detector generates a signal that may be, for example, detected by the electronics 16 for purposes of triggering the closing of the bottom valve 50.

In some embodiments of the invention, physical and chemical properties of the wellbore fluid may be detected for purposes of determining the optimal time to close the bottom valve 50. For example, the density, resistivity, nuclear magnetic response, sonic frequency, etc. of the wellbore fluid may be measured at specified location(s) in the surge chamber 60 (alternatively, anywhere in the tubing 14 above valve 70 or below the valve 50) for the purpose of obtaining the liquid length in the chamber 60 to detect the optimal time to close the bottom valve 50.

Referring back to FIG. 8, FIG. 8 depicts an exemplary waveform 184 of a fluid height in the surge chamber 60, which may be observed during a CCT testing operation. The waveform 184 includes an initial segment 184a (between approximately time $T_0$ to time $T_1$) in which the fluid height rises at a greater rate with respect to a latter segment 184b (that occurs approximately after time $T_1$) of the waveform 184. The transition between the segments 184a and 184b occurs at the optimal time $T_1$ (at an exemplary height threshold called "$H_1$") to close the bottom valve 50. In other words, after time T1, the surge chamber 60 cannot hold significantly more produced fluid from the formation, as it has been nearly filled to capacity. Keeping the surge chamber 60 open longer will not significantly increase the volume of the produced formation fluid nor achieve a better clean up. Thus, in accordance with some embodiments of the invention, the electronics 16 monitors the fluid level detector for purposes of detecting a predetermined height in the chamber 60. For example, as shown in FIG. 8, the fluid detector may be located at the $H_1$ height (called for example) so that when the fluid column reaches this height, the fluid detector generates a signal that is detected by the electronics 16; and in response to this detection, the electronics 16 closes the bottom valve 50.

In other embodiments of the invention, the mathematically-processed fluid level measured by the sensor 80 may be used to determine the optimal time to close the bottom valve 60. For example, the time derivative of the fluid level has a recognizable signature around the optimal time T1. The bottom valve 50 closes in response to the identification of the signature.

Figure 10:
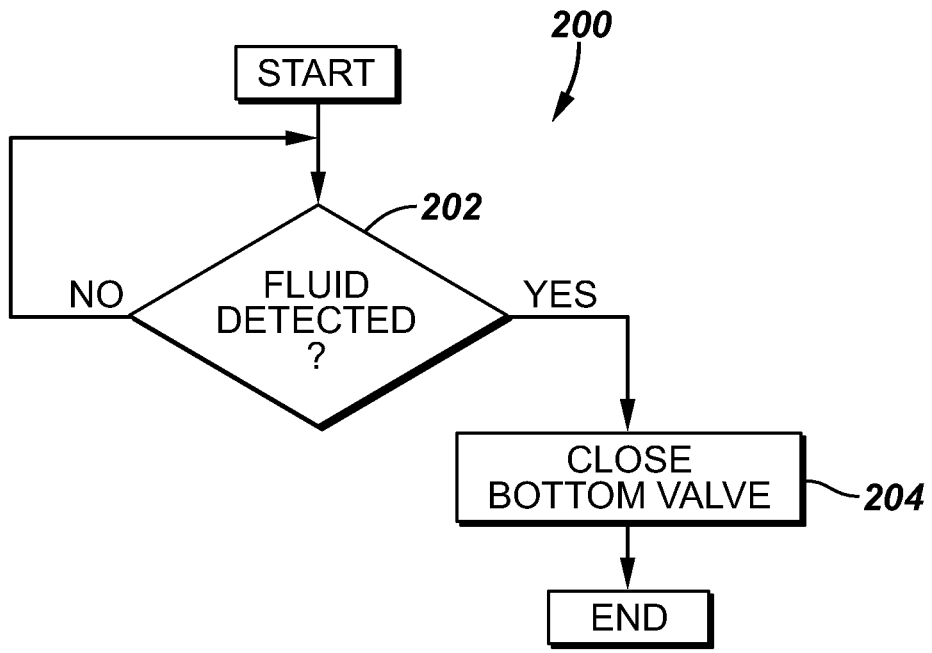
FIG. 10 depicts a technique to use the detection of a particular fluid to time the closing of the bottom valve of the closed chamber testing system according to an embodiment of the invention.

Therefore, to summarize, in accordance with some embodiments of the invention, the CCT system 10 performs a technique 200 that is depicted in FIG. 10. Pursuant to the technique 200, a determination is made (diamond 202) whether the fluid has been detected by the fluid detector. If so, then the bottom valve 50 is closed (block 204).

In yet another embodiment of the invention, the measured fluid height or its time derivative may be transformed into the frequency domain via a mathematical transformation algorithm, for example, a Fourier Transform or Wavelet Transform, to name a few. The pattern of the transformed data is compared with the predetermined signature in the frequency domain to detect the arrival of the optimal time during the CCT.

Figure 11:
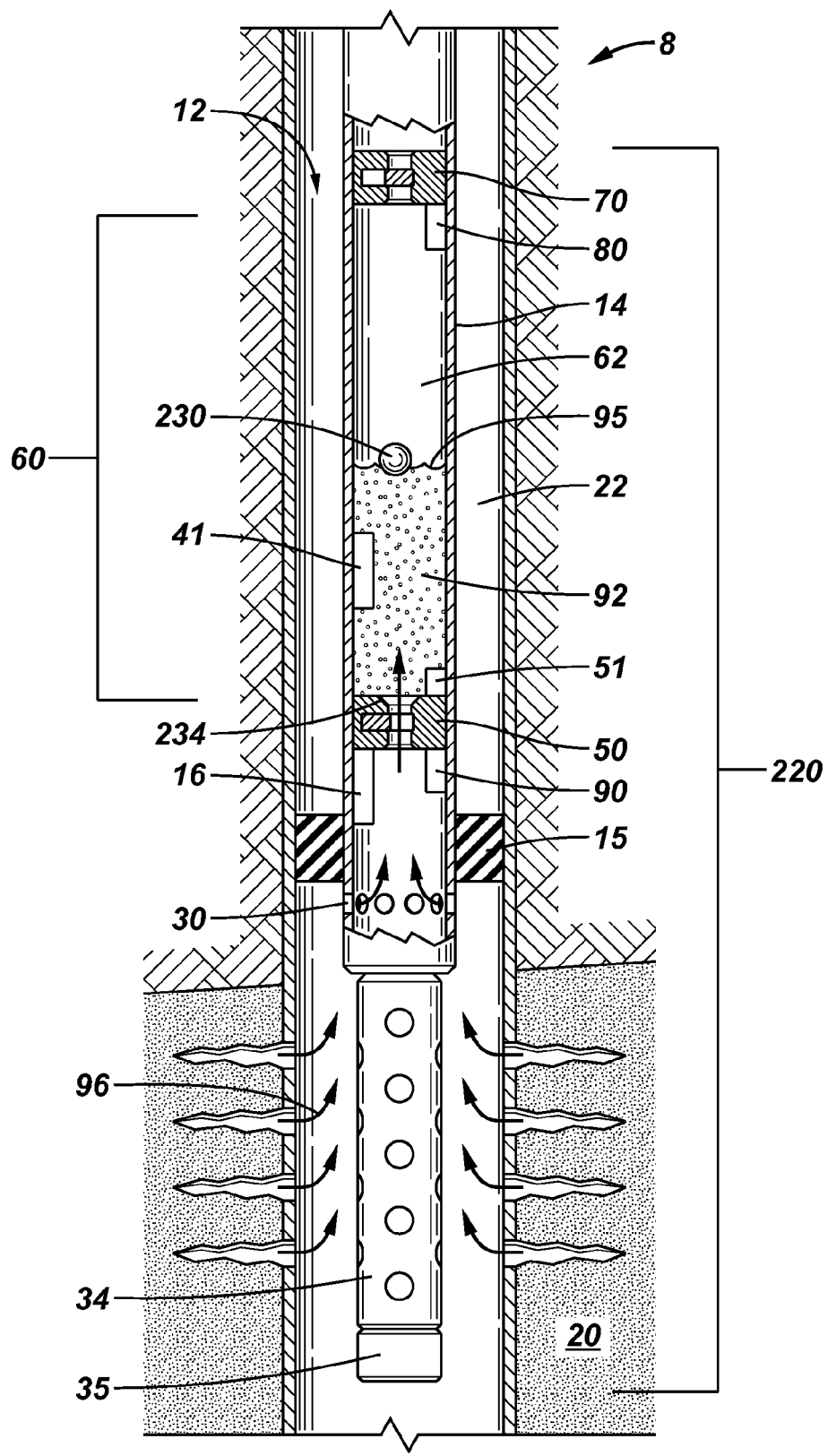
FIG. 11 is a schematic diagram of a closed chamber testing system that includes a mechanical object to time the closing of the bottom valve of the system according to an embodiment of the invention.

Referring to FIG. 11, a CCT system 220 may be used in place of the CCT system 10, in other embodiments of the invention. The CCT system 220 has a similar design to the CCT system 10, with common elements being denoted in FIG. 11 by the same reference numerals used in FIGS. 1 and 2. Unlike the CCT system 10, the CCT system 220 includes a mechanical object such as a ball 230, that is located inside the surge chamber 60 for purposes of forming a system to detect the height of the liquid column inside the chamber 60. Thus, as a more specific example, the ball 230 may be located on top of the liquid cushion layer 64 (see FIG. 1) prior to the opening of the bottom valve 50 to begin the closed chamber test. Alternatively, in some embodiments of the invention in which a liquid cushion layer 64 is not present, the ball 230 may rest on a seat 234 of the bottom valve 50. Thus, many variations are possible and are within the scope of the appended claims.

The ball 230 has a physical property that is detectable by a sensor (such as the upper sensor 80, for example) that is located inside the chamber 60 for purposes of determining when the liquid column reaches a certain height. For example, in some embodiments of the invention, the upper sensor 80 may be a coil that generates a magnetic field, and the ball 230 may be a metallic ball that affects the magnetic field of the coil. Thus, when the ball 230 comes into proximity to the coil, the coil generates a waveform that is indicative of the liquid column reaching a specified height.

In another embodiment of this invention, the velocity of the ball 230 may be used to determine the optimal time to close the bottom valve 50. The velocity of the ball 230 may be measured via sensor 80 using, for example, an acoustic apparatus. When the liquid column approaches its highest level, due to considerable gas compression, the velocity of ball 230 significantly reduces to nearly zero. When the velocity of the ball 230 is below a predetermined value, the bottom-valve 50 may be signaled to close.

Figure 12:
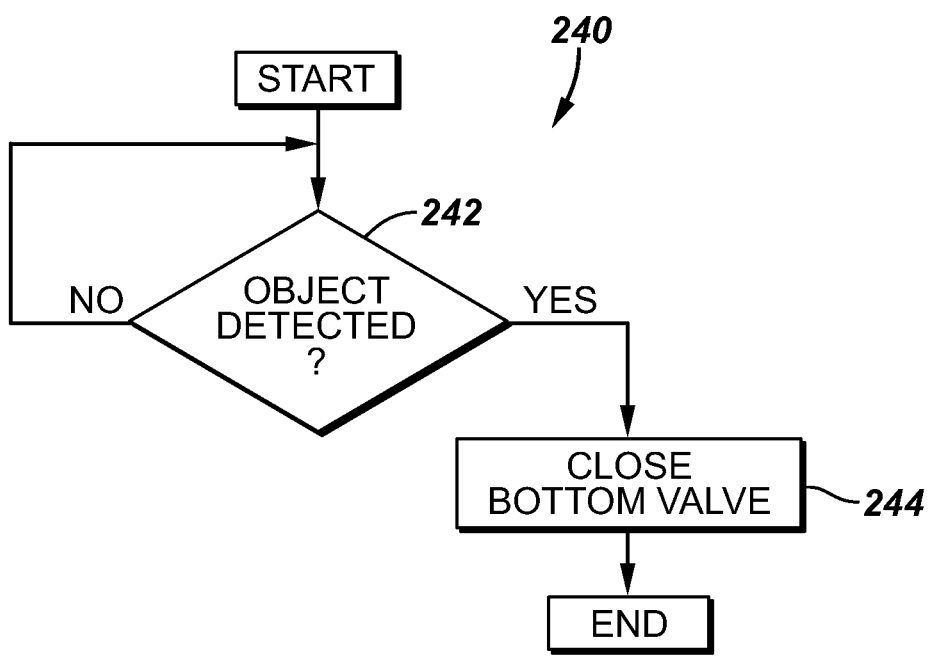
FIG. 12 is a flow diagram depicting a technique to use a mechanical object to time the closing of the bottom valve of a closed chamber testing system according to an embodiment of the invention.

To summarize, in accordance with some embodiments of the invention, a technique 240 that is generally depicted in FIG. 12 includes determining (diamond 242) whether a mechanical object has been detected at a predetermined location in the surge chamber 60, and if so, the bottom valve 50 is closed in response to this detection, as depicted in block 244.

In yet another embodiment of the invention, the measured velocity of the ball or its time derivative may be transformed into the frequency domain via a mathematical transformation algorithm, for example, a Fourier Transform or Wavelet Transform, to name a few. The pattern of the transformed data is compared with the predetermined signature in the frequency domain to detect the arrival of the optimal time during the CCT.

In some embodiments of the invention, a moveable pig may be used for purposes of detecting the optimal time to close the lower valve 50. For example, a liquid cushion fluid may exist above the ball 230. In this situation, the liquid cushion may partially fill the surge chamber 60, completely fill it, or completely fill the tubular string between the ball 230 and the surface of the well. In the two latter cases, the ball 230 separates the fluid below and above the ball, and the upper valve 70 is open to allow formation fluid below the ball 230 to move up along the tubular when the lower valve 50 is open. Because the movement of the ball 230 is restricted within the length of the tubular string, even when the upper valve 70 is open, the total amount of produced fluid from the formation is still limited to the maximum length of passage of the ball 230. All previously-mentioned characteristics that are related to the optimal closing time of the lower valve 50, including pressure, pressure derivative, flow rate, liquid column height, the location or speed of the mechanical object etc may be used alone or in some combination to determine the optimal time to close the bottom valve 50.

In some embodiments of the invention, fluid below the ball 230 may pass through the ball 230 to the space above the ball 230 after the ball 230 reaches the end of the passage channel 14. In this situation, the well testing system 8 may not restrict the produced formation fluid into a fixed volume. Because there is a transition stage between the ball 230 moving up and the fluid passing through the ball 230 after it stops, many of the measured properties using the sensors 80 and/or 90 show the similar characteristics of the closed system when the transition stage starts. Therefore, the aforementioned techniques can be applied to all these situations, which are within the scope of the appended claims.

Figure 13:
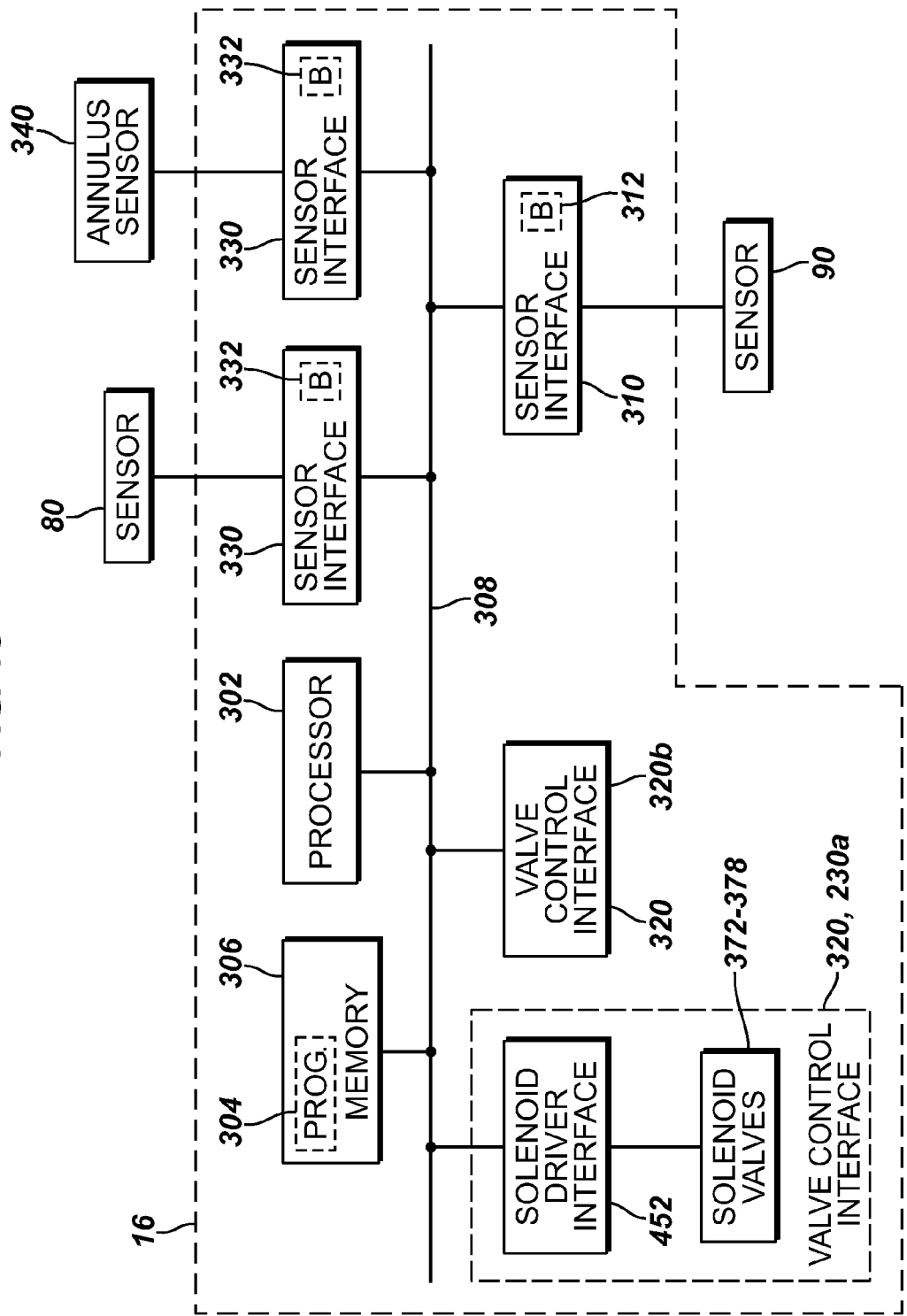
FIG. 13 is a schematic diagram of the electrical system of the closed chamber testing system according to an embodiment of the invention.

The electronics 16 may have a variety of different architectures, one of which is depicted for purposes of example in FIG. 13. Referring to FIG. 13, the architecture includes a processor 302 (one or more microprocessors or microcontrollers, as examples) that is coupled to a system bus 308. The processor 302 may, for example, execute program instructions 304 that are stored in a memory 306. Thus, by executing the program instructions 304, the processor 302 may perform one or more of the techniques that are disclosed herein for purposes of determining the optimal time to close the bottom valve 50 as well as taking the appropriate measures to close the valve 50.

In some embodiments of the invention, the lower 90 and upper 80 sensors may be coupled to the system bus 308 by sensor interfaces 310 and 330, respectively. The sensor interfaces 310 and 330 may include buffers 312 and 332, respectively, to store signal data that is provided by the tower sensor 90 and upper sensor 80, respectively. In some embodiments of the invention, the sensor interfaces 310 and 330 may include analog-to-digital converters (ADCs) to convert analog signals into digital data for storage in the buffers 312 and 332. Furthermore, in some embodiments of the invention, the sensor interface 330 may include long range telemetry circuitry for purposes of communicating with the upper sensor 80.

The electronics 16 may include various valve control interfaces 320 (interfaces 320a and 320b, depicted as examples) that are coupled to the system bus 308. The valve control interfaces 320 may be controlled by the processor 302 for purposes of selectively actuating the upper valve 70 and bottom valve 50. The valve control interface 320a may control the bottom valve 50; and the valve control interface 320b may control the upper valve 70. Thus, for example, the processor 302 may communicate with the valve control interface 320a for purposes of opening the bottom valve 50 to begin the closed chamber test; and the processor 302 may, in response to detecting the optimal time, communicate with the valve control interface 320a to close the bottom valve 50.

In accordance with some embodiments of the invention, each valve control interface 320 (i.e., either interface) includes a solenoid driver interface 452 that controls solenoid valves 372-378, for purposes of controlling the associated valve. The solenoid valves 372-378 control hydraulics 400 (see FIG. 14) of the associated valve, in some embodiments of the invention. The valve control interfaces 320a and 320b may be substantially identical in some embodiments of the invention.

In some embodiments of the invention, the valve control interface 320a may be used in the control of the bottom valve 50, and the valve control interface 320b may be used in the control of the upper valve 70. In some embodiments of the invention the valve interface 320b may include long range telemetry circuit for purposes of communicating with the upper valve 70 and the interface may be physically located apart from the upper valve 70.

Figure 14:
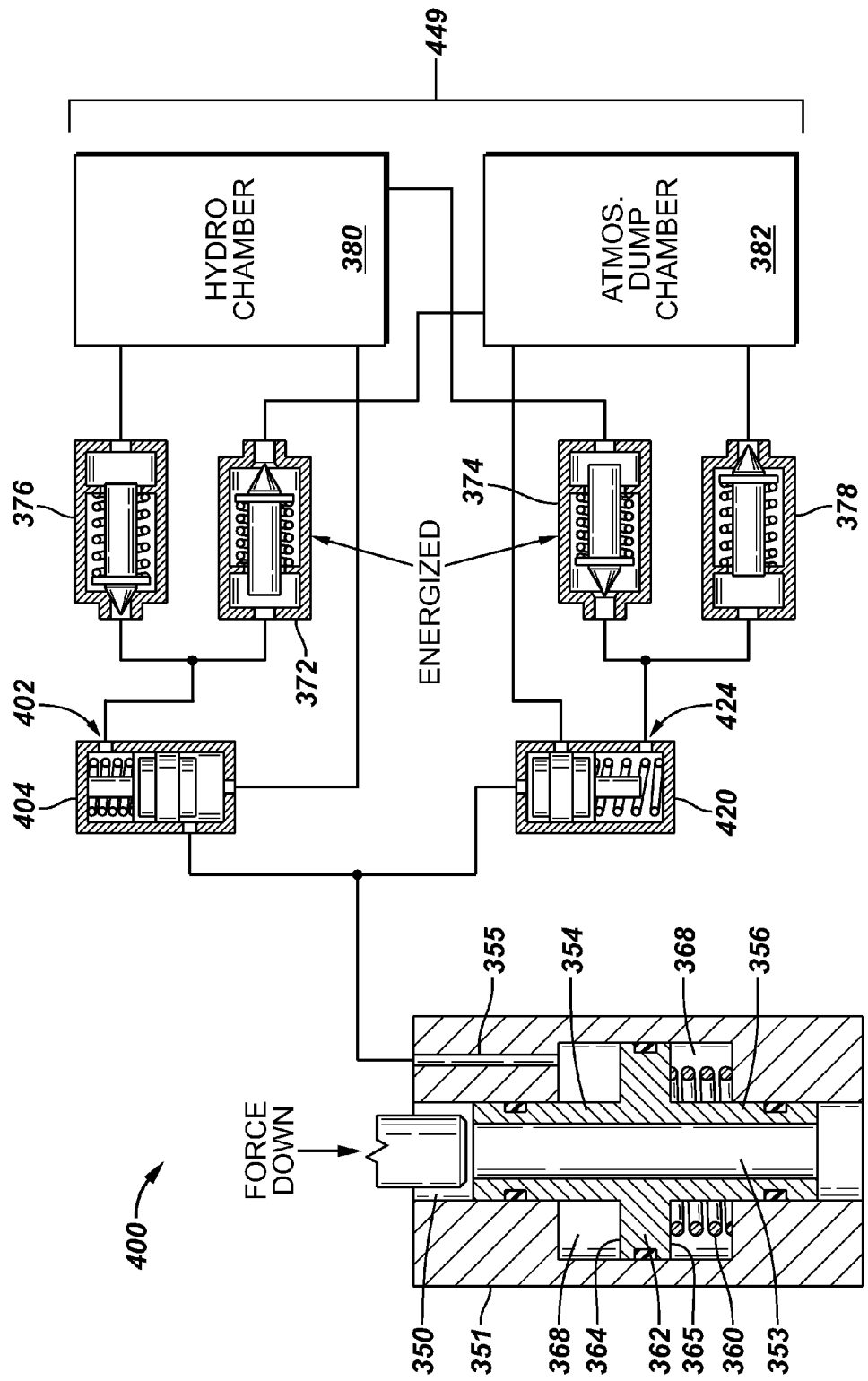
FIG. 14 is a block diagram depicting a hydraulic system to control a valve of the closed chamber testing system according to an embodiment of the invention.

Referring to FIG. 14 to illustrate a possible embodiment of the control hydraulics 400 (although many other embodiments are possible and are within the scope of the appended claims), each valve uses a hydraulically operated tubular member 356 which through its longitudinal movement, opens and closes the valve. The tubular member 356 may be slidably mounted inside a tubular housing 351 of the CCT system. The tubular member 356 includes a tubular mandrel 354 that has a central passageway 353, which is coaxial with a central passageway 350 of the tubular housing 351. The tubular member 356 also has an annular piston 362, which radially extends from the exterior surface of the mandrel 354. The piston 362 resides inside a chamber 368 that is formed in the tubular housing 351.

The tubular member 356 is forced up and down by using a port 355 in the tubular housing 351 to change the force applied to an upper face 364 of the piston 362. Through the port 355, the face 364 is subjected to either a hydrostatic pressure (a pressure greater than atmospheric pressure) or to atmospheric pressure. A compressed coiled spring 360, which contacts a lower face 365 of the piston 362, exerts upward forces on the piston 362. When the upper face 364 is subject to atmospheric pressure, the spring 360 forces the tubular member 356 upward. When the upper face 364 is subject to hydrostatic pressure, the piston 362 is forced downward.

The pressures on the upper face 364 are established by connecting the port 355 to either a hydrostatic chamber 380 (furnishing hydrostatic pressure) or an atmospheric dump chamber 382 (furnishing atmospheric pressure). The four solenoid valves 372-378 and two pilot valves 404 and 420 are used to selectively establish fluid communication between the chambers 380 and 382 and the port 355.

The pilot valve 404 controls fluid communication between the hydrostatic chamber 380 and the port 355; and the pilot valve 420 controls fluid communication between the atmospheric dump chamber 382 and the port 355. The pilot valves 404 and 420 are operated by the application of hydrostatic and atmospheric pressure to control ports 402 (pilot valve 404) and 424 (pilot valve 420). When hydrostatic pressure is applied to the port 355 the valve shifts to its down position and likewise, when the hydrostatic position is removed, the valve shifts to its upper position. The upper position of the valve is associated with a particular state (complementary states, such as open or closed) of the valve, and the lower position is associated with the complementary state, in some embodiments of the invention.

It is assumed herein, for purposes of example, that the valve is closed when hydrostatic pressure is applied to the port 355 and open when atmospheric pressure is applied to the port 355, although the states of the valve may be reversed for these port pressures, in other embodiments of the invention.

The solenoid valve 376 controls fluid communication between the hydrostatic chamber 380 and the control port 402. When the solenoid valve 376 is energized, fluid communication is established between the hydrostatic chamber 380 and the control port 402, thereby closing the pilot valve 404. The solenoid valve 372 controls fluid communication between the atmospheric dump chamber 382 and the control port 402. When the solenoid valve 372 is energized, fluid communication is established between the atmospheric dump chamber 382 and the control port 402, thereby opening the pilot valve 404.

The solenoid valve 374 controls fluid communication between the hydrostatic chamber 380 and the control port 424. When the solenoid valve 374 is energized, fluid communication is established between the hydrostatic chamber 380 and the control port 424, thereby closing the pilot valve 420. The solenoid valve 378 controls fluid communication between the atmospheric dump chamber 382 and the control port 424. When the solenoid valve 378 is energized, fluid communication is established between the atmospheric dump chamber 382 and the control port 424, thereby opening the pilot valve 420.

Thus, to force the moving member 356 downward, (which opens the valve) the electronics 16 (i.e., the processor 302 (FIG. 13) by its interaction with the solenoid driver interface 452 of the CCT system energize the solenoid valves 372 and 374. To force the tubular member 356 upward (which closes the valve), the electronics 16 energizes the solenoid valves 376 and 378. Various aspects of the valve hydraulics in accordance with the many different possible embodiments of the invention are further described in U.S. Pat. No. 4,915,168, entitled "MULTIPLE WELL TOOL CONTROL SYSTEMS IN A MULTI-VALVE WELL TESTING SYSTEM," which issued on Apr. 10, 1990, and U.S. Pat. No. 6,173,772, entitled "CONTROLLING MULTIPLE DOWNHOLE TOOLS," which issued on Jan. 16, 2001.

Other embodiments are within the scope of the appended claims. For example, referring back to FIG. 13, in some embodiments of the invention, the electronics 16 may be coupled to an annulus sensor 340 (of the CCT system) that is located above the packer 15 (see FIG. 1) for purposes of receiving command-encoded fluid stimuli that are communicated downhole (from the surface of the well 8) through the annulus 22. Thus, the electronics 16 may include a sensor interface 330 that is coupled to the annulus sensor 340, and the sensor interface 330 may, for example, include an ADC as well as a buffer 332 to store data provided by the sensor's output signal.

Therefore, in some embodiments of the invention, command-encoded stimuli may be communicated to the CCT system from the surface of the well for such purposes of selectively opening and closing the upper 70 and/or bottom 50 valves, as well as controlling other valves and/or different devices, depending on the particular embodiment of the invention.

As an example of yet another embodiment of the invention, referring back to FIG. 2, it is noted that if desired, produced formation fluid may be forced back into the formation or other subterranean formation by injecting a working fluid through tubing 14 using a surface pump rather than circulating it out to the surface. In this situation, zero emission of hydrocarbons is maintained during the CCT. In another implementation of the technique, the injection of a working fluid into the formation may be continuous for a prolonged time, after which the bottom valve 50 is shut in to conduct a so-called injection and fall-off test.

Although a liquid formation fluid is described above, the techniques and systems that are described herein may likewise be applied to gas or gas condensate reservoirs. For example, the flow rate may be used to identify the optimal closing time of the bottom valve 50 for gas formation testing.

The closed chamber testing techniques that are disclosed herein provide significantly improved results relative to conventional closed chamber tests. However, these results must be correctly interpreted to fully take advantage of the improved testing techniques. The interpretation of the test results is complicated by wellbore dynamics, in which some parameters that are not directly measurable but are important in interpreting the test results, vary with time during the test. As a more specific example, it may be economically or technologically infeasible, if not impossible, to directly measure the flow rate of well fluid into the chamber during the surge flow period before the closure of the bottom valve. As described herein, the flow rate varies with respect to time during the test, and an accurate estimate of the flow rate is needed for purposes of interpreting the test data.

Another and related challenge in interpreting the test data is associated with accurately estimating the skin effect factor, which is also not directly measurable and also varies with time during the test. In general, the "skin effect factor" accounts for formation damage at or near the sandface, called "skin," that is attributable to drilling of the well. The skin effect factor varies during the test because during the surge of well fluid during the test, mud and other debris are removed, thereby reducing the skin.

The knowledge of the skin effect factor in conjunction with knowledge of the flow rate and bottom hole pressure history may be used to optimize perforation strategy, including selection of the perforating gun and the charges in a specific field. Currently, there is no known analytical solution to deal with a time-varying skin effect factor for a well test, and as a result, current interpretation methods may not produce accurate results.

As described herein, an integrated interpretation workflow handles these two major difficulties (flow rate and skin effect factor) in interpreting the closed chamber test data (and data from other tests that have similar characteristics, described later) by accounting for the variations of the skin effect factor and flow with time.

In general the closed chamber test provides measurements (chamber pressure, bottom hole pressure, chamber temperature and/or bottom hole temperature, as just a few examples) that are a function of various factors, which must be estimated, such as the flow rate, skin effect factor, reservoir type, formation properties, initial reservoir pressure, etc. As described herein, in view of measurements obtained during the closed chamber test; the flow rate and skin effect factor are modeled, and the test measurements are used in conjunction with the modeling to estimate parameters of the well.

Figure 15:
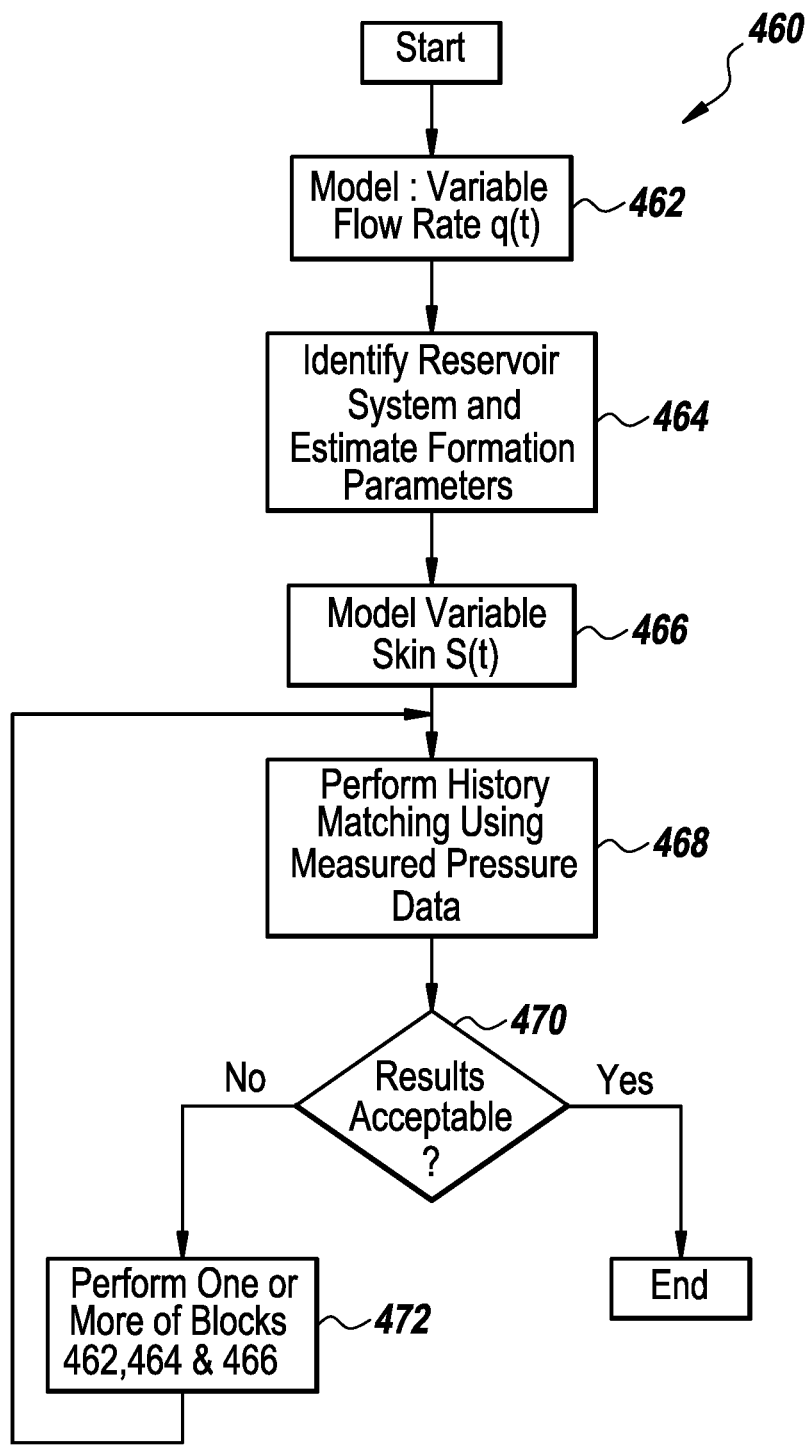
FIG. 15 is a flow diagram depicting a technique to estimate at least one parameter of a well based on results obtained from a well test according to an embodiment of the invention.

A systematic workflow, which is generally depicted in FIG. 15, may be used for purposes of interpreting the test data. Referring to FIG. 15, the technique 416 includes modeling (block 462) a flow rate (herein called "q(t)"); and identifying a reservoir system and estimating formation parameters, pursuant to block 464. The technique 460 also includes modeling the variable time skin effect factor (herein called "S(t)"), pursuant to block 466. Next, pursuant to the technique 460, history matching is used (block 468) to validate the estimated parameters and identified reservoir system. If results are not acceptable (diamond 470), then the technique 460 includes performing (block 472) one or more of the blocks 462, 464 and 466 (as further described herein) until acceptable results are achieved.

The interpretation workflow is conducted in an interactive fashion so that the estimated individual parameters from the analytical solution correspond to a special flow regime that may be verified through consistency with other parameters. The interpretation results not only include initial reservoir pressure and permeability/productivity that are provided by traditional well testing, but also accounts for the time variation of the skin effect factor and flow rate during the test. The latter better characterizes perforating quality for well completion and field development.

As stated above, the flow rate varies with time during the closed chamber test. A time-varying flow rate presents a complicated condition for the development of well testing analysis techniques. Using a simple but reasonable flow rate model (described below), facilitates development of interpretation method, and at the same time, takes into account the effects of a changing flow rate. The flow rate during the test carries the flow rate signature for all time (i.e., for the time during the test and for the time after the test ends). Without considering the time-varying aspects of the flow rate, permeability estimates derived from the analysis of specific flow regimes may be inaccurate.

As described herein, exponential functions are used to model the buildup during the test, a modeling which addresses the effect from time-varying flow rate on the pressure responses with reasonable accuracy without using an excessively detailed flow rate history representation.

Figure 16:
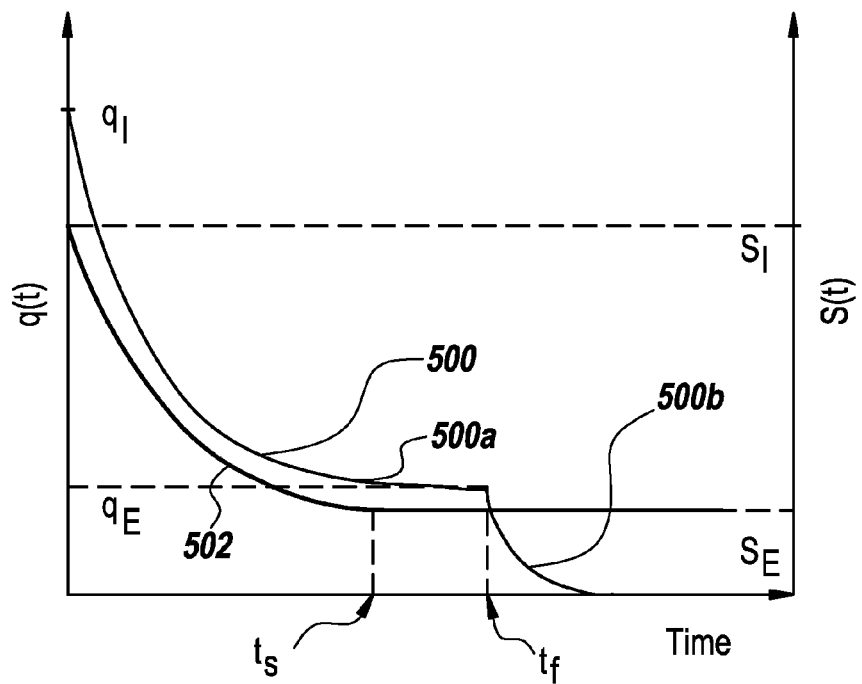
FIG. 16 illustrates an exemplary flow and an exemplary skin effect factor associated with a closed chamber test according to an embodiment of the invention.

FIG. 16 depicts an exemplary flow 500 (called "q(t)") and an exemplary skin effect factor 502 (called "S(t)") during a closed chamber test in accordance with embodiments of the invention. Near the beginning of the surge test, the q(t) flow 500 has an initial value (called "$q_I$"). During a segment 500a of time in which well fluid flows into the chamber, the q(t) flow decreases as depicted in FIG. 16. At time $t_f$, the time at which the chamber is closed, the q(t) flow has a value $q_E$ and exhibits a discontinuity; and from time $t_f$, the flow decays pursuant to a different decay envelope, as depicted in segment 500b. The S(t) skin effect factor 502 generally decays from an initial value called "$S_I$" to an ending value called "$S_E$". At time $t_s$, the skin effect factor 502 follows a relatively constant and stabilized skin level (called "$S_E$").

As can be appreciated from FIG. 16, the segments 500a and 500b of the q(t) flow 500, as well as the entirety of the skin effect factor 502, may each be represented by an exponential function.

More specifically, in accordance with some embodiments of the invention, the q(t) flow may be mathematically described as follows:

$$q(t) = \begin{cases} \frac{(q_I - q_E)}{[1 - \exp(-\alpha)]}\left[\exp\left(-\frac{\alpha t}{t_f}\right) - \exp(-\alpha)\right] + q_E & t \leq t_f \\ q_E \exp[-\hat{\beta}(t - t_f)] & t > t_f, \end{cases} \quad \text{Eq. 1}$$

In Eq. 1, "$q_I$" and "$q_E$" are the initial and ending flow rates, respectively, during the surge period; "α" and "β" are constants; and "$t_f$" is the time when the chamber is closed. Thus, the entire flow rate history during a test is completely characterized by four constants: $q_I$, $q_E$, α, and β when the $t_f$ time is known from the testing operation. The four unknown parameters may be determined in an integrated workflow 550, which is described in detail below in connection with FIGS. 20, 21 and 22.

Eq. 1 essentially constructs an exponentially-varying flow rate between an initial magnitude $q_I$ and an ending value $q_E$ within the time period of $t_f$. By incorporating the above flow rate model into an appropriate convolution algorithm, analytical solutions for surge and buildup pressures may be derived. These solutions capture the major features of surge flow, but still maintain straightforward formulations. Therefore, the solutions may be used as diagnostic tools, for specific flow regime analysis, or for quick history matching of entire pressure measurements. The detailed derivations of these solutions are described further below.

It is noted that Eq. 1 is set forth herein for purposes of example only, as the time-varying q(t) flow rate may be modeled using other mathematical functions, in accordance with the many different possible embodiments of the invention.

Similar to flow rate variation, the S(t) skin effect factor changes significantly during the test. This is because the largest under-balanced pressure differential and flow rate occur during the initial time of the test, due to the initial stage of the surge being the most efficient time for removing damage from drilling and perforating operations. As the pressure differential and q(t) flow rate each reduces, the skin effect factor rapidly stabilizes. The skin effect factor may be modeled by the following exponential function, in accordance with some embodiments of the invention:

$$S(t) = \begin{cases} \frac{(S_I - S_E)}{[1 - \exp(-\lambda)]}\left[\exp\left(-\frac{\lambda t}{t_s}\right) - \exp(-\lambda)\right] + S_E & t \leq t_s \\ S_E & t > t_s, \end{cases} \quad \text{Eq. 2}$$

where "$\lambda$" represents a constant, "$S_I$" and "$S_E$" represents initial and ending skins factors, respectively, during the surge period within a characteristic interval of time, "$t_s$," during which the skin effect factor substantially varies. The variation $t_s$ is usually less than the characteristic time of flow rate variation $t_f$, although this relationship may be reversed, in accordance with other embodiments of the invention. The four parameters of Eq. 2 may be inferred from the bottom hole pressure signatures and the integrated workflow 550 (FIGS. 20, 21 and 22), as further described below.

The skin effect factor model that is set forth in Eq. 2 may alternatively be embedded in a convolution algorithm and/or a surge flow simulator, in other embodiments of the invention. An advantage of accounting for the time variance of the S(t) skin effect factor with an analytical expression rather than discretized values is that smoother pressure results are obtained from the simulator so that the quality of the history matching between simulated and measured pressures may be quantified without abrupt pressure discontinuities due to sudden changes in skin at discretized times. Although the exponential representation of Eq. 2 is favorable in many situations, other skin factor models may also be applied to development of an analytical solution or a numerical simulator. Thus, many variations are contemplated and are within the scope of the appended claims.

The general pressure solution for draw down and build up for a time invariant skin effect factor but a time-varying flow rate is widely documented in literature, for example, in the article by Kuchuk and Ayestaran, entitled, "Analysis of simultaneously measured pressure and sandface flow rate in transient well test," published in February 1985 issue of Journal of Petroleum Technology (Vol. 37, No. 1), and is set forth below:

$$p_{wD}(t_D) = \int_0^{t_D} q_D(\tau)p'_D(t_D - \tau)d\tau + p_D(0)q_D(t_D) + Sq_D(t_D) \quad \text{Eq. 3}$$

$$= \int_0^{t_D} q'_D(\tau)p_D(t_D - \tau)d\tau + p_D(t_D)q_D(0) + Sq_D(t_D)$$

In Eq. 3, the subscript "D" represents the dimensionless variables of the corresponding parameters; "$p_{wD}$" represents the wellbore pressure; "$q_D$" and "$q'_D$" represent the flow rate and its derivative, respectively; "S" represents the skin effect factor; "$p_D(0)$" and "$q_D(0)$" represents the initial pressure and flow rate condition; "$p_D$" and "$p'_D$" represents the pressure response and its derivative under unit production rate condition for the reservoir system. The dimensionless quantities in Eq. 3 may be defined as follows:

$$p_{wD} = \frac{p_i - p_w(t)}{p_i - p_o} \quad \text{Eq. 4}$$

$$q_D = \frac{141.2\mu q(t)}{kh(p_i - p_o)} \quad \text{Eq. 5}$$

$$t_D = \frac{0.000264kt}{\phi\mu c_t r_w^2} \quad \text{Eq. 6}$$

In Eqs. 4, 5 and 6, "$p_i$" represents the initial reservoir pressure; "$p_o$" represents the initial cushion pressure inside wellbore before the test; and "$c_t$" represents the total compressibility of the fluid dynamic system. Thus, Eq. 3 is a general solution for various reservoir models, such as homogeneous and infinite reservoir; dual-porosity reservoir (infinite, finite reservoir with closed boundary, finite reservoir with constant pressure boundary); hydraulically fractured reservoir (infinitely or finite conductivity); etc. Substituting the solution $p'_D$ for a specific reservoir model, the first formula of Eq. 3 gives the corresponding pressure solution. Eq. 3 and its various simplified forms have been widely used in calculating pressure transient solutions for well condition of variable flow rate but constant skin.

Eq. 3 may be extended to describe the more accurate characterization of a time-varying flow rate and a time varying variable skin effect factor by replacing the skin effect factor constant S with a function ($S(t_D)$), which describes the skin effect factor as being a function of time, as described below:

$$p_{wD}(t_D) = \int_0^{t_D} q_D(\tau)p'_D(t_D - \tau)d\tau + \quad \text{Eq. 7}$$
$$p_D(0)q_D(t_D) + S(t_D)q_D(t_D)$$
$$= \int_0^{t_D} q'_D(\tau)p_D(t_D - \tau)d\tau +$$
$$p_D(t_D)q_D(0) + S(t_D)q_D(t_D)$$

Eq. 7 holds because the skin factor is an instantaneous, additional pressure drop added to the existing pressure drawdown due to formation fluid transport. As Eq. 3 may be the general solution for various reservoir models, the Eq. 7 is also valid for all applicable reservoir systems. Therefore, Eq. 7 is the general solution for various reservoir systems when both the flow rate and skin effect factor are modeled as varying with time. As described herein, Eq. 7 is used as a fundamental component in the following described analytical solutions and interpretation techniques.

A pressure solution for a specific reservoir model may be obtained by substituting the suitable $p_D$ and $p'_D$ expressions of a unit production rate as well as skin and flow rate variation models in Eq. 7, and then conducting direct integration. The $p'_D$ pressure derivative of a unit production rate is called the impulse response (called "$g_{wD}(t_D)$"). For an isotropic, homogeneous and infinite single layer reservoir and for a line source representation, the impulse response may be expressed as follows:

$$p'_D(t_D) = g_{wD}(t_D) = \frac{1}{2t_D}\exp\left(-\frac{1}{4t_D}\right). \quad \text{Eq. 8}$$

Using step functions, dimensionless forms of the variable flow rate (Eq. 1) and skin models of (Eq. 2) may be written as follows:

$$q_D(t_D) = \qquad \text{Eq. 9}$$

$$(1-S_f)\left\{\frac{(q_{ID}-q_{ED})}{[1-\exp(-\alpha)]}\left[\exp\left(-\frac{\alpha t_D}{t_{fD}}\right)-\exp(-\alpha)\right]+q_{ED}\right\}+$$

$$S_f q_{ED}\exp[-\beta(t_D-t_{fD})], \text{ and}$$

$$S(t_D) = \qquad \text{Eq. 10}$$

$$(1-S_s)\left\{\frac{(S_I-S_E)}{[1-\exp(-\lambda)]}\left[\exp\left(-\frac{\lambda t_D}{t_{sD}}\right)-\exp(-\lambda)\right]+S_E\right\}+S_sS_E.$$

In Eq. 9, "$\hat{\beta}$" represents the dimensionless parameter of "$\hat{\beta}$" in Eq. 1. The step functions "$S_f$" and "$S_s$" in Eqs. 9 and 10 may be expressed as follows:

$$S_f = \begin{cases} 0 & t_D < t_{fD} \\ 1 & t_D \geq t_{fD}, \text{ and} \end{cases} \qquad \text{Eq. 11}$$

$$S_s = \begin{cases} 0 & t_D < t_{sD} \\ 1 & t_D \geq t_{sD}. \end{cases} \qquad \text{Eq. 12}$$

Substituting the impulse response (Eq. 8), flow rate model (Eq. 9) and the skin factor function (Eq. 10) into the general solution (Eq. 7), the pressure solution for a homogeneous single layer reservoir under the condition of a time-varying flow rate and a time-varying skin effect factor during a surge flow period ($t_D \leq t_{fD}$; $t_{sD} \neq t_{fD}$) may be described as follows:

$$p_{wD}(t_D) = -\frac{(q_{ID}-q_{ED})}{2[1-\exp(-\alpha)]} \qquad \text{Eq. 13}$$

$$\exp\left(-\frac{\alpha}{t_{fD}}t_D\right)\left[-\ln\left(\frac{\alpha}{t_{fD}}\right)-2\gamma+\ln 4 + E_i\left(\frac{\alpha}{t_{fD}}t_D\right)\right]+$$

$$\frac{(q_{ID}-q_{ED})\exp(-\alpha)}{2[1-\exp(-\alpha)]}E_i\left(-\frac{1}{4t_D}\right)-\frac{q_{ED}}{2}E_i\left(-\frac{1}{4t_D}\right)+$$

$$\left\{\frac{(q_{ID}-q_{ED})}{[1-\exp(-\alpha)]}\left[\exp\left(-\frac{\alpha}{t_{fD}}t_D\right)-\exp(-\alpha)\right]+q_{ED}\right\}\times$$

$$\left\{(1-S_s)\left\{\frac{(S_I-S_E)}{[1-\exp(-\lambda)]}\left[\exp\left(-\frac{\lambda}{t_{sD}}t_D\right)-\exp(-\lambda)\right]+\right.\right.$$

$$\left.\left.S_E\right\}+S_sS_E+p_D(0)\right\},$$

where "$\gamma$" equals 0.5772 and the exponential integral "$E_i$" in Eq. 13 is defined as follows:

$$E_i(x) = \int_{-\infty}^{x}\frac{e^u}{u}du. \qquad \text{Eq. 14}$$

Eq. 13 may be simplified as $t_D$ approaches $t_{fD}$. The solution also reduces to a constant flow rate (with respect to time) or constant skin effect factor solution (with respect to time) if $q_I=q_E$ or $S_I=S_E$, respectively. If both the flow rate and skin factor are constants (i.e., if $q_I=q_E$ and $S_I=S_E$), Eq. 13 reduces to the following drawdown solution:

$$p_{wD}(t_D) = -\frac{q_{ED}}{2}E_i\left(-\frac{1}{4t_D}\right)+q_{ED}S_E. \qquad \text{Eq. 15}$$

Figure 17:
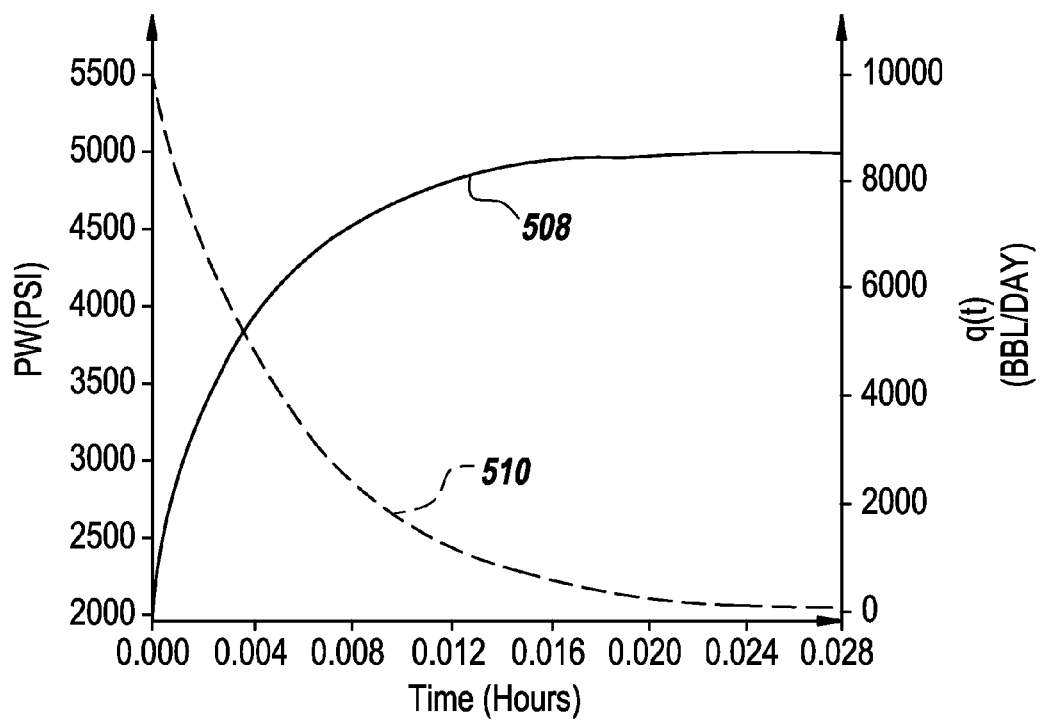
FIG. 17 depicts a pressure described by a model according to an embodiment of the invention.

As an example, FIG. 17 illustrates a bottom hole pressure curve 508, which is derived from Eq. 13. The flow rate (depicted by curve 510) used in the solution varies from 10,000 bbl/day to 10 bbl/day following the function defined in Eq. 1, while the skin effect factor changes from 5 to 0 following the function defined in Eq. 2 during the same surge period ($t_{sD}=t_{fD}$). As depicted by the curve 508, the bottom hole pressure starts from the small cushion pressure inside the wellbore, then increases continuously as formation fluid moves into the wellbore, leading to higher and higher hydrostatic pressure in the wellbore. Accordingly, the increasing hydrostatic pressure in the wellbore reduces the pressure differential between the wellbore and the formation, resulting in a decreasing flow rate. The major distinguishing feature of the solution depicted in FIG. 17 is that the skin factor also continuously decreases during the production, an effect that is not accounted for in conventional test interpretation techniques. The decaying skin effect factor is due to the continuous reduction of the invaded mud filtration and partial removal of the mud cake attached to the sandface.

The pressure solution for the buildup period may be obtained by substituting Eqs. 8, 9 and 10 into Eq. 7 and continuously integrating the resulted expression beyond shut-in time. If $t_D=t_{fD}+\Delta t_D>t_{fD}$ and $t_{sD} \leq t_{fD}$, the solution after the closure of the bottom testing valve may be described as follows:

$$p_{wD}(t_{fD}+\Delta t_D) = \qquad \text{Eq. 16}$$

$$\int_0^{t_{fD}+\Delta t_D}q_D(\tau)\frac{1}{2(t_{fD}+\Delta t_D-\tau)}\exp\left(-\frac{1}{4(t_{fD}+\Delta t_D-\tau)}\right)d\tau+$$

$$q_{ED}\exp(-\beta\Delta t_D)\times[S_E+p_D(0)].$$

Because of the two piecewise functions of the $q_D(t)$ equation (Eq. 9) account for the flow rate before and after "$t_{fD}$" in Eq. 9, integration in Eq. 16 may be relatively difficult. Rather than dealing with the complicated integral of the first term on the right side of Eq. 16, the solution may be alternatively described using Laplace transformations.

The general solution (Eq. 7) in the Laplace domain may be expressed as follows:

$$\bar{p}_{wD}(z)=z\bar{q}_D(z)\bar{p}_D(z)+\Im[S(t_D)q_D(t_D)], \qquad \text{Eq. 17}$$

where "z" represents the Laplace variable; the upper bars denote the corresponding properties in Laplace domain; and "$\Im$" represents the Laplace transformation. After the first term on the right side of Eq. 17 is obtained, the general solution in the real time domain may be inverted from the Laplace domain solution using standard numerical methods, such as the Stehfest algorithm. The real time solution may be described as follows:

$$p_{wD}(t_D)=\Im^{-1}[z\bar{q}_D(z)\bar{p}_D(z)]+S(t_D)q_D(t_D). \qquad \text{Eq. 18}$$

"$\Im^{-1}$" in Eq. 18 represents the inverse Laplace transformation. Because a variety of Laplace domain solutions exist for various reservoir systems, it is very convenient to obtain the corresponding solutions in real time domain by directly using these Laplace domain solutions and the Laplace transformation of the flow rate, "$\bar{q}_D(z)$", in Eq. 18. Therefore, obtaining a solution in real time domain for a particular reservoir system under the condition of variable flow rate and variable skin includes the following steps: 1.) obtaining a suitable solution in Laplace domain (i.e., assembling the first term on the right side of Eq. 17 by selecting a proper $\bar{p}_D(z)$ and transformed flow rate in Laplace domain $\bar{q}_D(z)$); 2.) inverting the assembled Laplace domain solution into real time domain using Stehfest algorithm; and 3.) then adding $S(t_D)q_D(t_D)$ on the result.

During the surge flow period ($t_D \leq t_{fD}$), the second term of the flow rate model (see Eq. 9) does not appear. The Laplace domain expression $\bar{q}_D(z)$ has a simple form. The line source solution for a homogeneous, infinite, single layer reservoir, the wellbore pressure solution in Laplace domain for flowing period for $t_D \leq t_{fD}$ may be described as follows:

$$\bar{p}_{wD}(z) = \qquad \text{Eq. 19}$$

$$\left\{ C_q \left[ \frac{zt_{fD}}{\alpha + zt_{fD}} - \exp(-\alpha) \right] + q_{ED} \right\} \frac{K_o(\sqrt{z})}{z} + \Im[S(t_D)q_D(t_D)].$$

If a finite wellbore radius solution is used in place of the line source solution in Eq. 19, the Laplace domain solution may be described as follows for $t_D \leq t_{fD}$:

$$\bar{p}_{wD}(z) = \qquad \text{Eq. 20}$$

$$\left\{ C_q \left[ \frac{zt_{fD}}{\alpha + zt_{fD}} - \exp(-\alpha) \right] + q_{ED} \right\} \frac{K_o(\sqrt{z})}{z^{3/2} K_1(\sqrt{z})} + \Im[S(t_D)q_D(t_D)]$$

In Eqs. 19 and 20, "$C_q$" is defined as follows:

$$C_q = \frac{q_{ID} - q_{ED}}{1 - \exp(-\alpha)}; \qquad \text{Eq. 21}$$

and "$K_o$" and "$K_1$" are the zero and first order of the second kind of Modified Bessel functions.

If the Laplace domain solution of an infinite, naturally-fractured reservoir model is utilized, the Laplace domain solution for the variable flow rate and variable skin problem may be changed, as follows:

$$\bar{p}_{wD}(z) = \qquad \text{Eq. 22}$$

$$\left\{ C_q \left[ \frac{zt_{fD}}{\alpha + zt_{fD}} - \exp(-\alpha) \right] + q_{ED} \right\} \frac{K_o(\sqrt{zf(z)})}{zf(z)[\sqrt{zf(z)} K_1(\sqrt{zf(z)})]} +$$

$$\Im[S(t_D)q_D(t_D)];$$

where $$f(z) = \frac{\omega(1-\omega)z + \lambda}{(1-\omega)z + \lambda}; \qquad \text{Eq. 23}$$

$$\omega = \frac{\phi_f c_f}{\phi_f c_f + \phi_m c_m}; \text{ and} \qquad \text{Eq. 24}$$

$$\lambda = \begin{cases} \frac{12 k_m r_w^2}{k_f} & \text{Slabs} \\ \frac{15 k_m r_w^2}{k_f} & \text{spheres.} \end{cases} \qquad \text{Eq. 25}$$

Eqs. 19, 20 and 22 set forth several simple examples to demonstrate the flexibility of the techniques that are disclosed herein. It is not meant to exhaust all options of Eq. 17. Other suitable expressions of "$\bar{p}_D(z)$" and "$\bar{q}_D(z)$" may also be used in the derivation of the corresponding solutions and are within the scope of the appended claims.

The corresponding solutions in real time domain may be obtained by applying numerical Laplace inversion algorithms to the first term on the right side of Eqs. 19, 20 and 22. For example, the corresponding real time domain solution for Laplace domain solution (Eq. 20) has the following formulation:

$$p_{wD}(t_D) = \Im^{-1} \left\{ \left\{ C_q \left[ \frac{zt_{fD}}{\alpha + zt_{fD}} - \exp(-\alpha) \right] + q_{ED} \right\} \frac{K_o(\sqrt{z})}{z^{3/2} K_1(\sqrt{z})} \right\} + \qquad \text{Eq. 26}$$

$$S(t_D)q_D(t_D).$$

The solutions of Eqs. 19 and 22 may also be expressed in real time domain using the same approach. The general form of the last term in Eq. 26 is:

$$S(t_D)q_D(t_D) = \qquad \text{Eq. 27}$$
$$(1-S_f)(1-S_s)[C_q(E_{\alpha t} - E_\alpha) + q_{ED}][C_s(E_{\lambda t} - E_\lambda) + S_E] +$$
$$(1-S_f)S_s[C_q(E_{\alpha t} - E_\alpha) + q_{ED}]S_E +$$
$$S_f(1-S_s)[C_s(E_{\lambda t} - E_\lambda) + S_E]q_E \exp[-\beta(t_D - t_{fD})] +$$
$$S_f S_s S_E q_{ED} \exp[-\beta(t_D - t_{fD})],$$

where $$E_{\alpha t} = \exp\left(-\alpha \frac{t_D}{t_{fD}}\right), \qquad \text{Eq. 28}$$

$$E_{\lambda t} = \exp\left(-\lambda \frac{t_D}{t_{sD}}\right), \qquad \text{Eq. 29}$$

$$E_\alpha = \exp(-\alpha), \qquad \text{Eq. 30}$$

$$E_\lambda = \exp(-\lambda), \text{ and} \qquad \text{Eq. 31}$$

$$C_s = \frac{S_I - S_E}{1 - \exp(-\lambda)}. \qquad \text{Eq. 32}$$

During the surge flow period, $t_D \leq t_{fD}$ and $S_f = 0$. If $t_{sD}$ is less than or equal to $t_{fD}$, Eq. 27 may be simplified ($t_{sD} \leq t_{fD}$) as follows:

$$S(t_D)q_D(t_D) = (1-S_s)[C_q(E_{\alpha t}-E_\alpha)+q_{ED}][C_s(E_{\lambda t}-E_\lambda)+S_E] + S_s[C_q(E_{\alpha t}-E_\alpha)+q_{ED}]S_E \qquad \text{Eq. 33}$$

The above derivations in Eqs. 26, 27 and 33 are given to demonstrate capability of solution development for the variable time flow rate and variable time skin effect factor problems. Other flow rate models, skin variation functions and Laplace domain $\bar{p}_D(z)$ may also be applied to the solution development without deviating from the scope of the appended claims.

Eqs. 19, 20 and 22 are only applicable for the surge flow period. For solutions after the closure of the bottom hole flow control valve, the Laplace transformation may be taken of the step function in the flow rate model (Eq. 9). Taking Laplace transformation in Eq. 9, the flow rate model in buildup period may be written as follows ($t_D > t_{fD}$):

$$\bar{q}_D(z) = -\frac{C_q t_{fD}}{\alpha + zt_{fD}} \{\exp[-(\alpha + zt_{fD})] - 1\} - \qquad \text{Eq. 34}$$

$$\frac{1}{z}[-C_q \exp(-\alpha) + q_{ED}][\exp(-zt_{fD}) - 1] + \frac{q_{ED}\exp(-zt_{fD})}{\beta + z}.$$

If the finite wellbore radius solution is used for $\bar{p}_D(z)$ in Eq. 17, the buildup pressure solution in Laplace domain for a homogeneous, infinite, single layer reservoir may be described as follows ($t_D > t_{fD}$):

$$\overline{p}_{wD}(z) = \left\{ -\frac{C_q t_{fD}}{\alpha + z t_{fD}} \{\exp[-(\alpha + z t_{fD})] - 1\} \right\} \frac{K_o(\sqrt{z})}{\sqrt{z} K_1(\sqrt{z})} + \quad \text{Eq. 35}$$

$$\left\{ -\frac{1}{z}[-C_q \exp(-\alpha) + q_{ED}][\exp(-z t_{fD}) - 1] + \frac{q_{ED} \exp(-z t_{fD})}{\beta + z} \right\}$$

$$\frac{K_o(\sqrt{z})}{\sqrt{z} K_1(\sqrt{z})} + \Im[S(t_D) q_D(t_D)].$$

Directly applying the flow rate and skin models of Eqs. 9 and 10 in the buildup period to Eq. 35, the corresponding wellbore pressure solution in real time domain may be described as follows ($t_D > t_{fD}$; $t_{sD} \le t_{fD}$):

$$p_{wD}(t_D) = \quad \text{Eq. 36}$$

$$\Im^{-1} \left\{ \left\{ -\frac{C_q t_{fD}}{\alpha + z t_{fD}} \{\exp[-(\alpha + z t_{fD})] - 1\} \right\} \frac{K_o(\sqrt{z})}{\sqrt{z} K_1(\sqrt{z})} \right\} +$$

$$\Im^{-1} \left\{ \left\{ -\frac{1}{z}[-C_q \exp(-\alpha) + q_{ED}][\exp(-z t_{fD}) - 1] + \right. \right.$$

$$\left. \left. \frac{q_{ED} \exp(-z t_{fD})}{\beta + z} \right\} \frac{K_o(\sqrt{z})}{\sqrt{z} K_1(\sqrt{z})} \right\} +$$

$$S_E q_{ED} \exp[-\beta(t_D - t_{fD})].$$

Eq. 36 is an exemplary solution after the bottom flow control valve is closed in a surge test. Other suitable $\overline{p}_D(z)$, $\overline{q}_D(z)$ and flow rate and skin variation models can also be used to develop wellbore pressure solutions for the buildup period in other embodiments of the invention.

Figure 18:
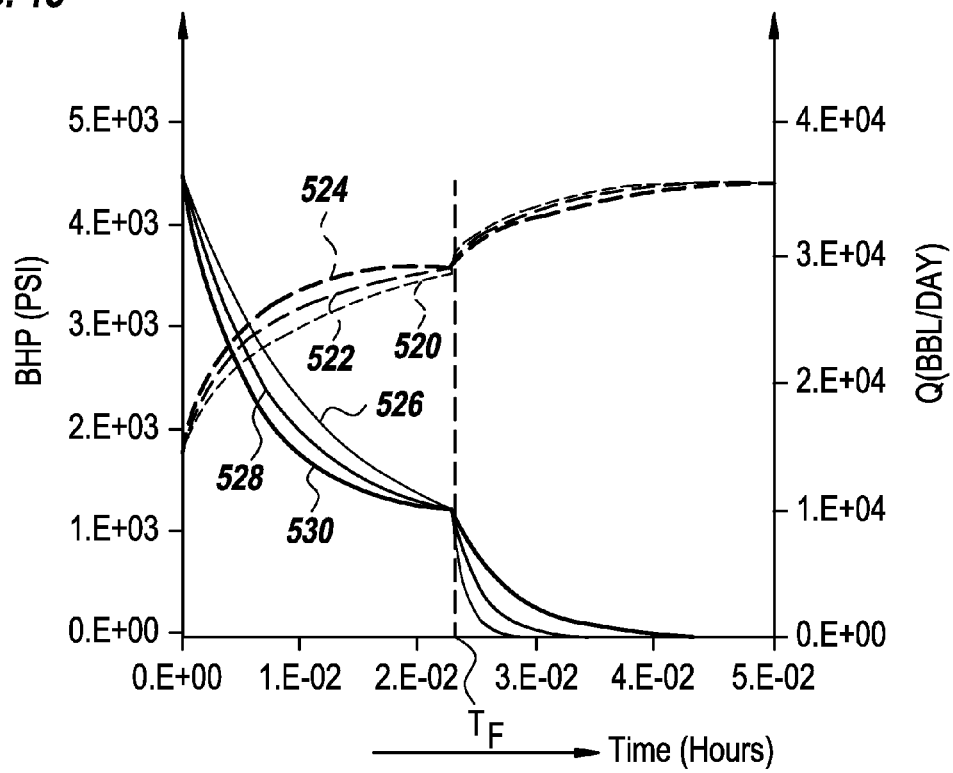
FIG. 18 depicts bottom hole pressure using Laplace domain translations and the associated variations of flow rate according to an embodiment of the invention.

FIG. 18 depicts exemplary bottom hole pressure responses and flows calculated using Eqs. 26 and 36. In particular, FIG. 18 depicts a bottom hole pressure plot 520 associated with α of 2 and β of 800; a bottom hole pressure plot 522 associated with α of 3 and β of 400; and a bottom hole pressure plot 524 associated with α of 4 and β of 200. Regarding the flows, plot 526 depicts a flow, where α equals 2 and β equals 800; plot 528 depicts a flow for α equal to 3 and β equal to 400; and plot 530 depicts a flow for α equal to 4 and β equal to 200. The flows were assumed declining from q=36000 bbl/day at the beginning of the test to 10000 bbl/day at the shut-in time. The skin effect factor varied from 2 to zero with λ=4 in the skin model (Eq. 10) during the first 30 seconds of the test. Three different values of the two parameters, α and β, in the flow rate model (Eq. 9) were simulated. It can be seen that larger α or β leads to faster decrease of the flow rate and quicker increase of the bottom hole pressure during flowing or buildup period, respectively.

Figure 19:
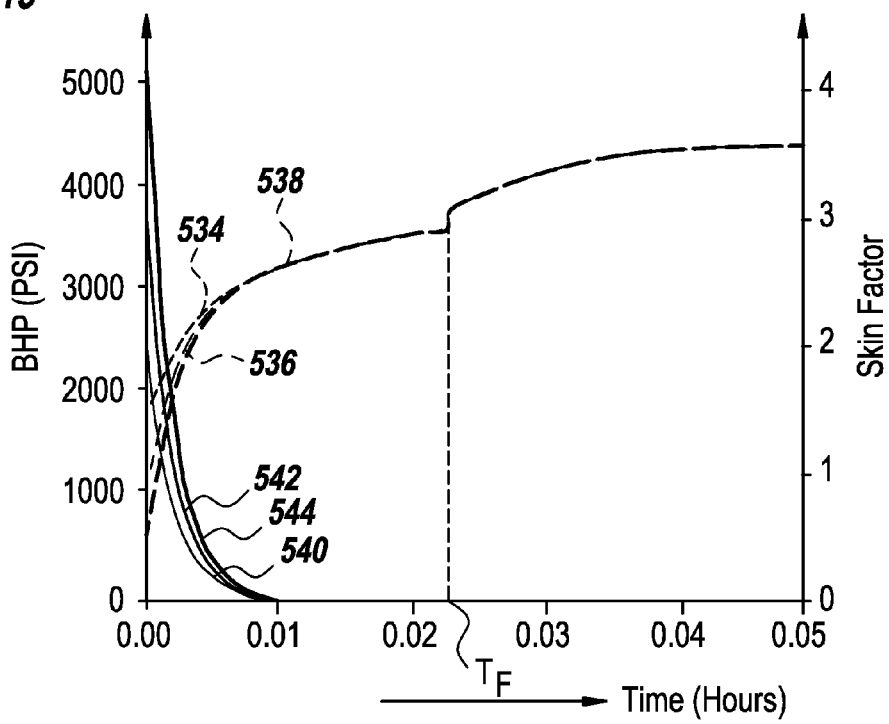
FIG. 19 depicts calculated bottom hole pressures obtained using Laplace domain transformations and associated variations of skin effect factor according to an embodiment of the invention.

FIG. 19 depicts the exemplary effect of skin variations on the bottom hole pressure responses in an exemplary surge test. In FIG. 19, plot 534 represents a bottom hole pressure where the skin factor S(t) varies from 2 to 0 and λ equals 4; plot 536 represents a bottom hole pressure where the skin varies from 3 to 0 and λ equals 4; and plot 538 represents pressure where the skin varies from 4 to 0 and λ equals 4. Also depicted in FIG. 19 are a plot 540 for the skin effect factor where the skin effect factor varies from 2 to 0 and λ equals 4; a plot 542 for the skin effect factor where the skin effect factor varies from 3 to 0 and λ equals 4; and a plot 544 for the skin effect factor in which the skin varies from 4 to 0 and λ equals 4. The two parameters, α and β, in the flow rate model (Eq. 9) were fixed at 3 and 800 in the simulations, while the parameter λ in the skin model was 4. The initial skin value was 2, 3, 4, respectively, in the three cases. The skin variations had significant effect on the initial pressure calculations. Without considering the skin variation, the initial bottom hole pressure would otherwise deviate from the actual bottom hole pressure measurements.

In FIGS. 18 and 19, parameter(s) were changed in either the flow rate or the skin effect factor model, but not both. In reality, if the skin variation is different, the flow rate will also vary. This, in turn, leads to different bottom hole pressure responses. Matching the simulated bottom hole pressure with the measurements, it is possible to infer all parameters associated with the solutions introduced herein. These include initial reservoir pressure, formation permeability, α, β and λ etc. in flow rate and skin models. Because the skin and flow rate models only have limited number of parameters, the non-uniqueness in the inversion of flow rate and skin models is substantially reduced.

In summary, the solutions described herein are a major departure from conventional well test interpretation techniques, in that the interpretation techniques consider both a time-varying flow rate and a time-varying skin effect factor. The solutions also take into account the different trends in the flow rate variations before and after the closure of the flow control valve closure in conjunction with the skin effect factor change. These analytical solutions have the potential to match the entire history of a surge test, thereby facilitating quick estimation of formation properties from analytical solutions using the entire pressure data, rather than just a portion of the data.

Although the description herein focuses on handling well test under time variable flow rate and variable skin condition, it should be recognized that other conditions, such as constant flow rate and variable skin effect factor, or variable flow rate and constant skin, or constant flow rate and constant skin, are special situations of the technique developed in this invention. Therefore, the techniques that are disclosed herein are equally applicable to all these conditions, with slight modifications.

The solutions given above were derived assuming $t_{sD}$ is less than or equal to $t_{fD}$. If the opposite is true, the corresponding solutions may be easily developed with similar procedures, as solutions for $t_{sD}$ greater than $t_{fD}$ are within the scope of the appended claims.

Estimating parameters of the well using conventional impulse techniques may be relatively inaccurate without further correction. Reasons for the inaccuracy of the impulse techniques may include the following: a.) the impulse techniques are valid only on portion of the measured data; and b.) the impulse techniques involve some strong assumptions in developing the algorithms, which may not be applicable for many tests. Therefore, as described below, the estimated results from the impulse technique are further improved through history matching of the entire data set with a mathematical model that describes the whole pressure history during the test.

The mathematical model used for the history matching may be an analytical solution, such as Eqs. 26 and 36 given above, or may be provided by any comprehensive simulator that is able to properly describe the fluid dynamic transport inside both the formation and wellbore.

History matching of surge test pressure is conducted in many ways. If analytical solutions are used, only the bottom hole pressure is involved in the history matching. If a numerical simulator is applied, history matching may be accomplished by considering both the bottom hole pressure and the chamber pressure. The latter takes into account all data in the optimization: upper chamber pressures during the flowing period and bottom hole pressures during both flowing and buildup periods for the parameter estimation.

The initial values of the parameters used in the history matching are taken from the impulse techniques. The calculated bottom hole and/or surge chamber pressures from the analytical solutions or a numerical simulator are compared with the measured data in the test. Minimizing the mismatch between the simulated and recorded data for parameter estimation may be accomplished using various optimization algorithms. Because there is substantial difference in the magnitude between bottom hole and chamber pressures during the flowing period, conventional methods using least squares or least absolute value procedures for automatic regression may lead to the dominance of the bottom hole pressure over chamber pressure in the objective function.

Furthermore, the magnitude of bottom hole or surge chamber pressures is quite different at different times during the test. If the same weighting factor is given to all pressure points, it may essentially eliminate the contribution of small magnitude pressure data in the optimization. Assigning different weighting factors for each measurement of the bottom hole and chamber pressures in the objective function may mitigate the problem, but the weighting factors usually are not known and have to be included in the optimization. This significantly increases the number of parameters to be estimated in optimization. Thus, no matter whether the analytical solutions or a numerical simulator is utilized in the history matching, the drawback of the conventional least squares method always exists. An efficient way to resolve this difficulty is to apply the maximum likelihood algorithm. In the maximum likelihood algorithm, the weighting factor of each individual measurement is reciprocally proportional to the square of the uncertainty variance, which may be expressed by the difference between model output and measurement.

More specifically, the application of the maximum likelihood algorithm may be described as follows. First, the initial objective function is constructed as follows:

$$\Theta(\stackrel{\rho}{\chi}) = \frac{1}{2}\sum_{i=1}^{N_w} \ln[p_w(t_i) - F_w(\stackrel{\rho}{\chi}, t_i)]^2 + \frac{1}{2}\sum_{j=1}^{N_c} \ln[p_c(t_j) - F_c(\stackrel{\rho}{\chi}, t_j)]^2. \quad \text{Eq. 37}$$

In Eq. 37, "$p_w$" and "$p_c$" represent pressure measurements at the bottom of wellbore and the upper end of the surge chamber;

$$\text{"}F_w(\stackrel{\rho}{\chi}, t_i)\text{" and "}F_c(\stackrel{\rho}{\chi}, t_j)\text{"}$$

represent simulation results at the corresponding locations, respectively, using either analytical solution, such as Eqs. 26 or 36, or a numerical simulator.

The objective function is minimized to obtain the first estimate of parameter vector $$\stackrel{\rho^*}{\chi}.$$

Next, square of variances, $\sigma^*_{wi}{}^2$ and $\sigma^*_{ci}{}^2$, is calculated for the bottom hole wellbore pressure and the surge chamber pressure, respectively as set forth below:

$$\sigma^{*2}_{wi} = [p_w(t_i) - F_w(\stackrel{\rho^*}{\chi}, t_i)]^2, \text{ and} \quad \text{Eq. 38a}$$

$$\sigma^{*2}_{cj} = [p_c(t_j) - F_c(\stackrel{\rho^*}{\chi}, t_j)]^2 \quad \text{Eq. 38b}$$

The final objective function is minimized to estimate the parameter vector $$\stackrel{\rho}{\chi}$$

using the obtained variances, as described below:

$$\Omega(\stackrel{\rho}{\chi}) = \sum_{i=1}^{N_w} \frac{[p_w(t_i) - F_w(\stackrel{\rho}{\chi}, t_i)]^2}{\sigma^{*2}_{wi}} + \sum_{j=1}^{N_c} \frac{[p_c(t_j) - F_c(\stackrel{\rho}{\chi}, t_j)]^2}{\sigma^{*2}_{cj}}. \quad \text{Eq. 39}$$

Generally, sequential implementation of the above optimization procedures once is enough to estimate $$\stackrel{\rho}{\chi}.$$

If not, variances in Eqs. 38a and 38b are recalculated using $$\stackrel{\rho}{\chi}$$

estimated from Eq. 39. Then, the objective function is updated using Eq. 39 again after new $\sigma^*_{wi}{}^2$ and $\sigma^*_{ci}{}^2$ are calculated.

The above optimization algorithm may be simplified if the variances are the same for individual measurements of the bottom hole and chamber pressures, respectively. In this situation, the variances are obtained by the following relationships:

$$\sigma^{*2}_w = \frac{1}{n}\sum_{i=1}^{N_w} [p_w(t_i) - F_w(\stackrel{\rho^*}{\chi}, t_i)]^2, \text{ and} \quad \text{Eq. 40a}$$

$$\sigma^{*2}_c = \frac{1}{n}\sum_{j=1}^{N_c} [p_c(t_j) - F_c(\stackrel{\rho^*}{\chi}, t_j)]^2. \quad \text{Eq. 40b}$$

Figure 20:
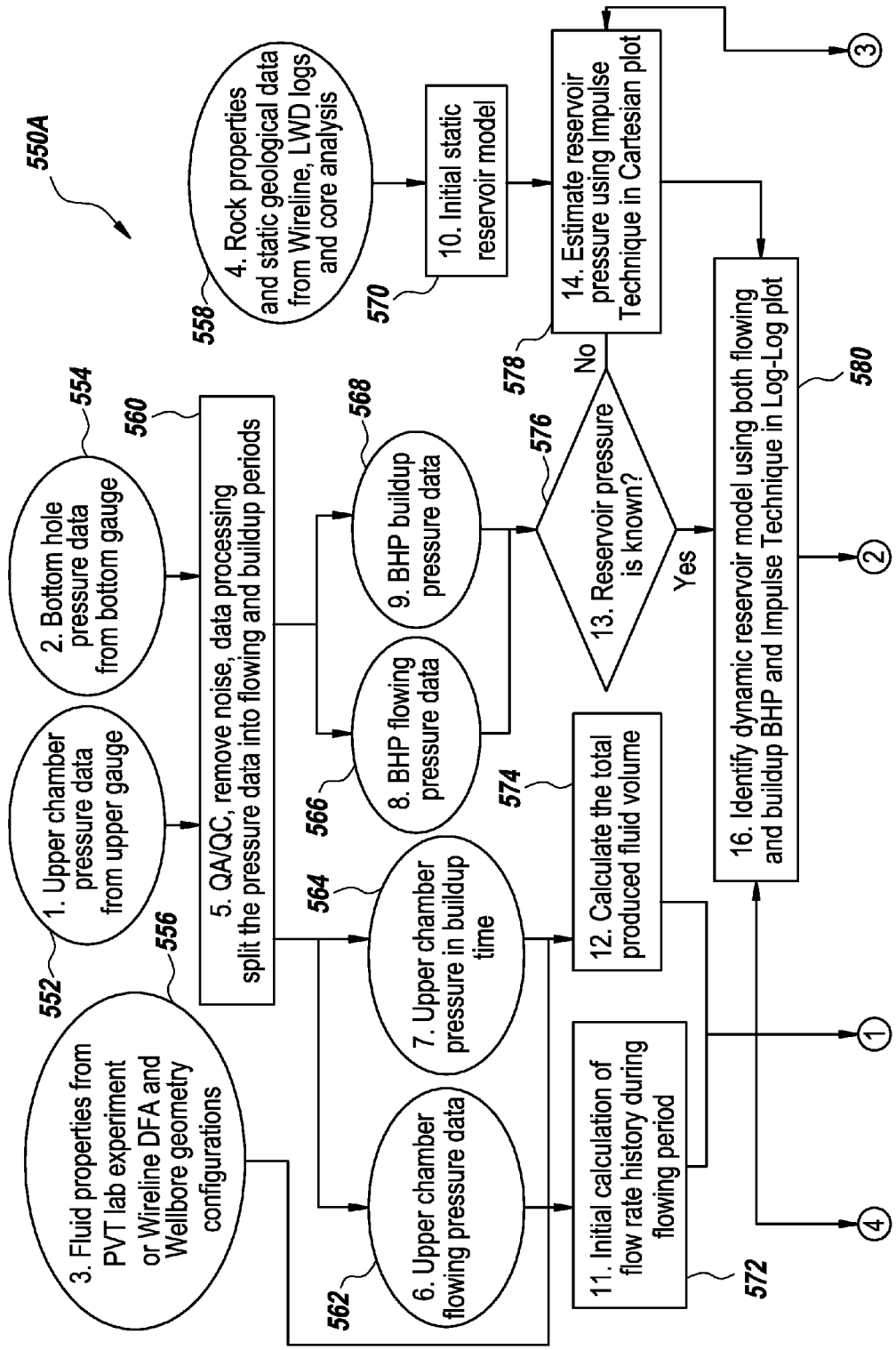
FIGS. 20, 21 and 22 depict an integrated workflow for interpreting data obtained from a closed chamber test to estimate parameters of a well according to an embodiment of the invention.
Figure 21:
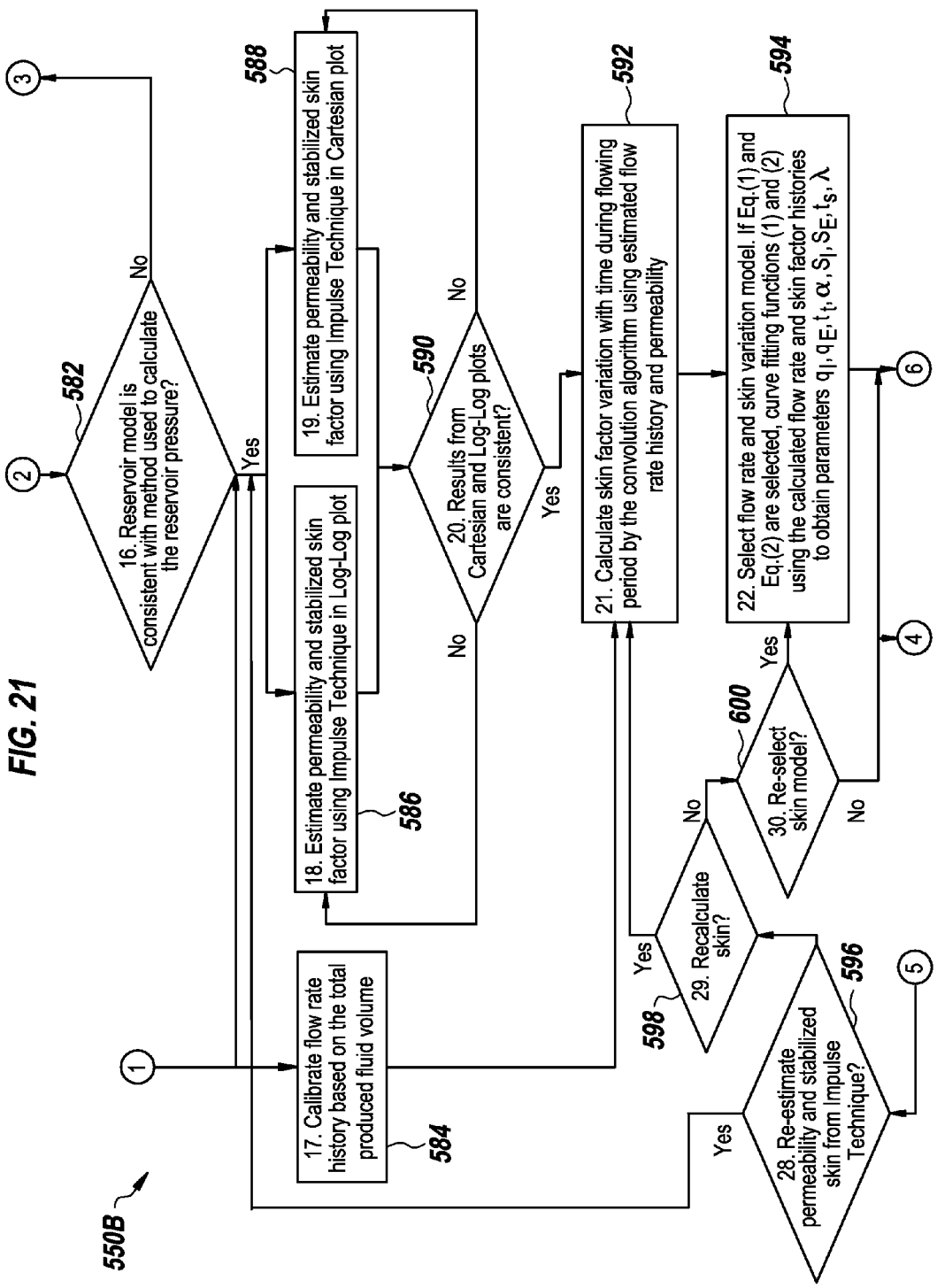
Figure 22:
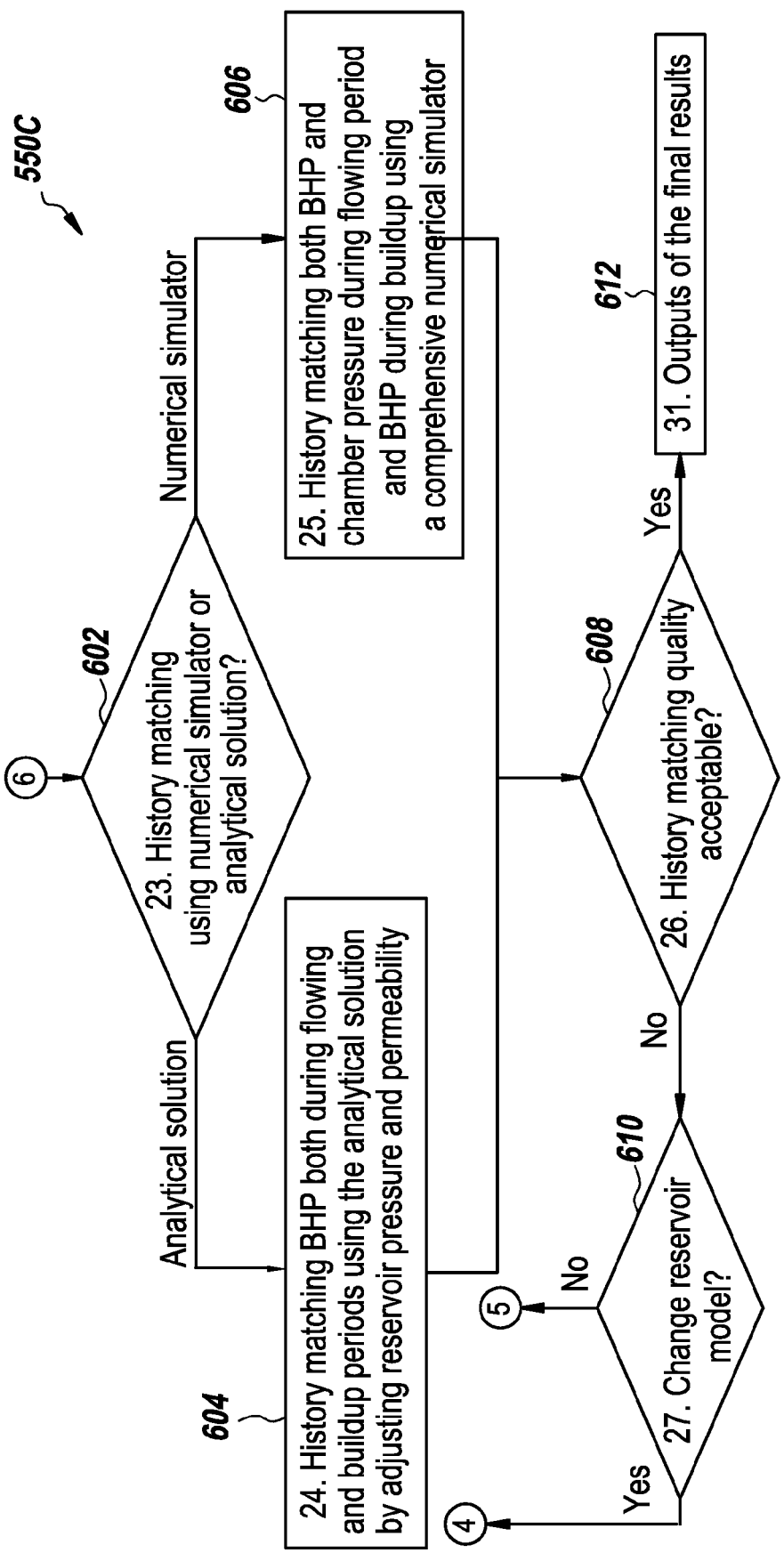

FIGS. 20, 21 and 22 depict portions 550A, 550B and 550C, respectively, of an exemplary integrated test interpretation workflow 550, in accordance with some embodiments of the invention. It is noted that the workflow 550 merely illustrates a particular embodiment of the invention, as variations of the workflow 550 and different workflows are contemplated, all of which are within the scope of the appended claims.

Referring to FIG. 20, the workflow 550 includes obtaining (blocks 552 and 554) upper chamber pressure data from the upper gauge of the chamber and bottom hole pressure data from the bottom gauge. The upper chamber pressure data is recorded at the upper end of the surge chamber and is communication with the surge chamber during the test. The pressure/temperature data is recorded at the bottom of the surge chamber or below the surge chamber. In either event, at least one pressure and/or temperature gauge is below the test valve and is in communication with the producing formation after the surge chamber is closed during the test.

The workflow 550 includes obtaining (block 556) wellbore geometry, test string configuration and fluid properties obtained by pressure-volume-temperature (PVT) laboratory experiments on well fluid brought to the surface (via the fluid sampler in the closed chamber, for example) or acquired by a downhole fluid analyzer in a separate wireline formation tester (WFT)-based test, as just a few examples. Whenever some fluid properties, such as oil viscosity, oil compressibility, water viscosity, water compressibility and solution gas-oil ratio (as examples) are not available, appropriate correlations are used to calculate these properties.

Rock properties (rock compressibility) and formation information (layer thickness, layer porosity etc) based on wireline and/or logging while drilling (LWD) results or core analysis are obtained pursuant to block 558. If rock compressibility is not available, a suitable correlation may be used to calculate this parameter.

Pursuant to block 560, the data obtained in blocks 552 and 554 are loaded into interpretation software in a computer system for quality assurance/quality control (QA/QC). Several tasks are performed for QA/QC in block 560 using pressure/temperature data that is recorded in the downhole gauge(s)/sensor(s). These gauge(s)/sensor(s), which are in communication with the well fluid flow channel during the test may be (as examples) at the upper end of the surge chamber, at the bottom hole below the surge chamber, or inside the bottom hole flow control valve or tool system. All measured data is then synchronized based on specific characteristics of the events during the test. As a more specific example, bottom hole pressure, bottom hole temperature, surge chamber pressure and surge chamber temperature may be synchronized before further processing continues.

Segments of the time of the pressure/temperature data are then selected for further analysis. Outliers and noisy data interval(s) are next removed from the data in that selected time segment. Various operation tools may be used for the data processing and noise removal, including zooming in and out, time and/or pressure shifting of selected data intervals. The selected and de-noised test data is then split into the flowing period and shut-in (or buildup) period according to the timing of the implementation of the optimal down-hole shut-in.

The processing in the block 560 produces upper chamber flowing pressure data (block 562), upper chamber pressure in buildup time (block 564), bottom hole pressure flowing pressure data (block 566) and bottom hole pressure buildup pressure data (block 568).

Next, pursuant to the workflow 550, an initial static geological model is constructed (block 570) based on wireline and/or logging while drilling (LWD) results, as well as other available geological and reservoir information, such as core analysis. The static geological reservoir model may have a single layer or multiple layers intercepted by a vertical, deviated or horizontal well. The constructed or selected reservoir model determines what and how many parameters and properties obtained from blocks 556 and 558 are used in the interpretation.

Next, the first estimate of the q(t) flow rate during the flowing period is derived (block 572) using the chamber pressure and/or chamber temperature (from block 562) using the following relationship:

$$q(t) = -\pi r_p^2 H_{ch} \frac{p_{chi}}{z_{chi} T_{chi}} \frac{d}{dt}\left[\frac{z_{ch} T_{ch}}{p_{ch}}\right], \quad \text{Eq. 41}$$

where "$r_p$" represents the tubing radius; "$H_{ch}$" represents the surge chamber length; "p," "z" and "T" are the pressure, gas deviation factor and temperature, respectively; the subscript "ch" denotes the chamber quantities; and the subscript "i" represents the initial condition in the surge chamber.

Figure 23:
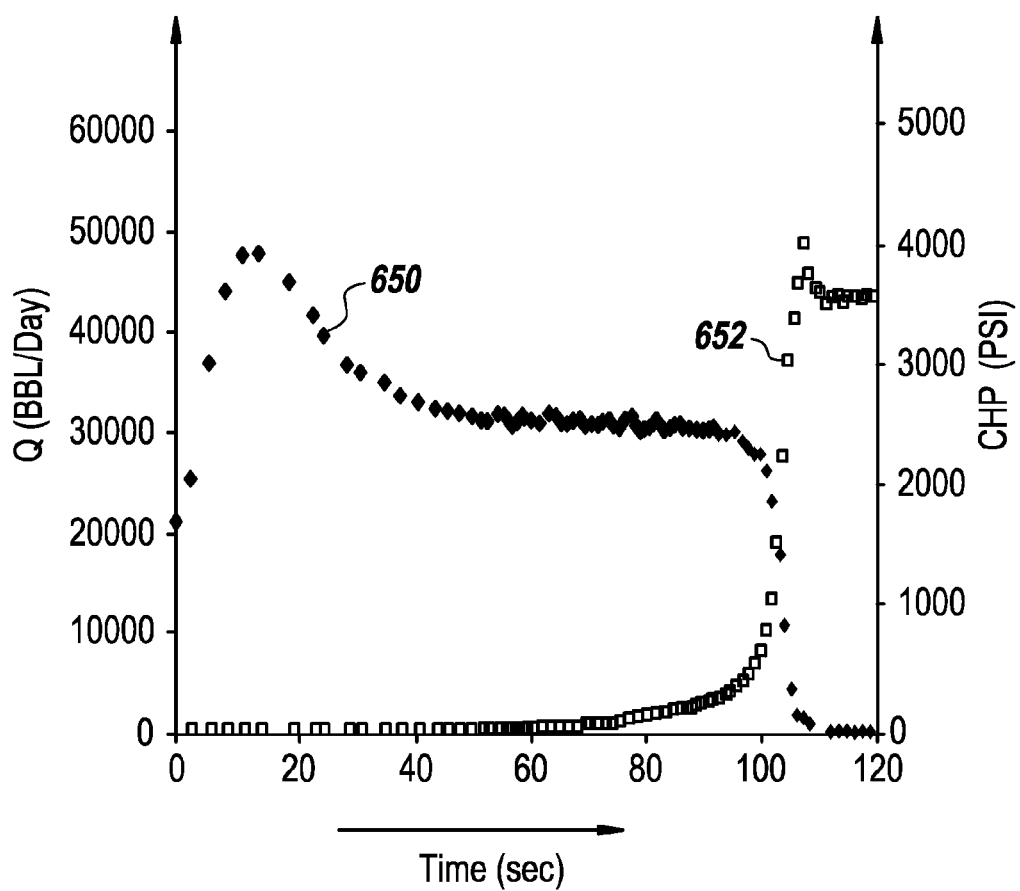
FIG. 23 depicts an exemplary chamber pressure and flow rate history during the flowing period of a closed chamber test according to an embodiment of the invention.

As an example, FIG. 23 depicts a measured chamber pressure curve 652 and a calculated flow rate history 650 using Eq. 41 with results obtained from a field test. Because the chamber temperature did not change substantially, the temperature was assumed to be constant in the calculation. The flow rate increased from a static value to a maximum value quickly, then, it decreased as the chamber pressure increased from atmospheric pressure to a large value. The flow rate drastically reduced to a very small magnitude when the chamber pressure approached a stabilized value.

The calculation that is set forth in Eq. 41 essentially assumes that the shrinkage rate of the surge chamber volume is the same as the flow rate at the sandface. In other words, the formula does not consider the fluid compressibility within the entire wellbore and tool string. The fluid compressibility may not be negligible in many situations. Nevertheless, the result that is depicted as an example in FIG. 23 is the initial estimation of the flow rate history, which is further improved in the latter stages of the workflow 550.

Still referring to FIG. 20, pursuant to block 574, the stabilized condition is selected by the user based on the characteristics of the pressure and temperature obtained from block 564. Then, the total fluid volume produced into the surge chamber may be calculated as follows:

$$V_t = \pi r_p^2 H_{ch}\left[1 - \frac{z_{che} T_{che} p_{chi}}{z_{chi} T_{chi} p_{che}}\right], \quad \text{Eq. 42}$$

where the subscript "e" denotes the stabilized or equilibrium condition at the upper gauge after the bottom flow control valve is closed.

Pursuant to diamond 576, a determination is made whether the reservoir pressure is already known or should alternatively be estimated during the interpretation. If the reservoir pressure is known, then control proceeds to block 580. Otherwise, the reservoir model is identified pursuant to block 578.

The reservoir pressure, formation transmissibility and stabilized skin factor may be estimated using buildup bottom hole pressure obtained in block 568 for the reservoir model selected in block 570. Various techniques may then be applied, such as the one that is described below.

Shut-in pressure equations for short producing (or impulse) test may be expressed as follows when the pressure transient is in radial, spherically radial and linear flow, respectively:

$$p_{ws}(\Delta t) = p_i - \frac{m_{rad}}{2.3026\zeta}\frac{1}{\Delta t}, \quad \text{Eq. 43}$$

$$p_{ws}(\Delta t) = p_i - \frac{m_{sph}}{2\zeta}\frac{1}{\Delta t^{3/2}}, \quad \text{Eq. 44}$$

$$p_{ws}(\Delta t) = p_i - \frac{m_{lin}}{2\zeta}\frac{1}{\Delta t^{1/2}}, \quad \text{Eq. 45}$$

where "$m_{rad}$", "$m_{sph}$" and "$m_{lin}$" may be expressed in field units as $$m_{rad} = \frac{162.6 q_r \mu}{kh},\qquad\text{Eq. 46}$$

$$m_{sph} = \frac{2453 q_r \mu \sqrt{\phi \mu c_t}}{k_h \sqrt{k_v}},\qquad\text{Eq. 47}$$

$$m_{lin} = \frac{4.064 q_r}{h} \sqrt{\frac{\mu}{k \phi c_t L^2}},\qquad\text{Eq. 48}$$

and "$\Delta t$" represents the time after shut-in; "$p_{ws}$" represent the bottom hole pressure during buildup; "$p_i$" represents the reservoir pressure; "$c_t$" represents the total compressibility; "$\phi$" represents the porosity; "$q_r$" represents the flow rate before shut-in; "h" represents the thickness of the formation; "k", "$k_h$" and "$k_v$" represents average, horizontal and vertical permeability, respectively; and "$\zeta$" represents a parameter that describes characteristic of the afterflow during the buildup.

Eqs. 43, 44 and 45 indicate that Cartesian plots of $p_{ws}$ versus $\Delta t^{-1}$, $p_{ws}$ versus $\Delta t^{-3/2}$, and $p_{ws}$ versus $\Delta t^{-1/2}$ will yield straight lines with a slope of $$\frac{m_r}{2.3026\zeta},\ \frac{m_{sph}}{2\zeta}\ \text{and}\ \frac{m_{lin}}{2\zeta}$$

for radial, spherically radial and linear fluid flow and an intercept $p_i$ on ordinate. Although the slopes depend on the afterflow parameter $\zeta$ and formation permeability, which are not known before interpretation, the reservoir pressure $p_i$ can be obtained from these Cartesian plots by extrapolating the straight-line to the intercept on ordinate without knowing the associated parameters, such as $\zeta$, $q_r$, k, $k_v$ and $k_h$.

Figure 24:
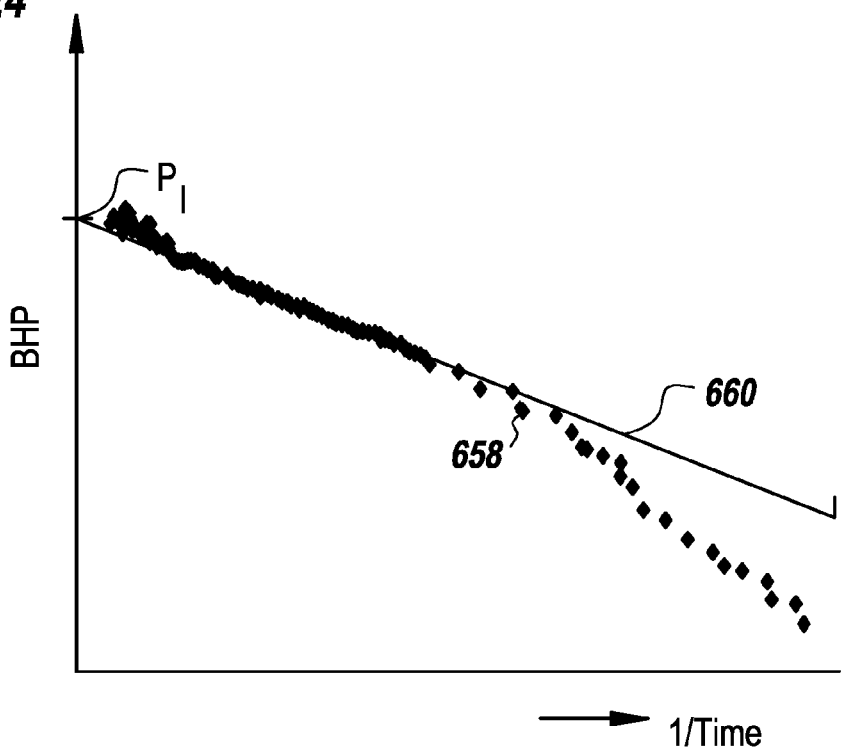
FIG. 24 depicts a Cartesian plot used to estimate a reservoir pressure according to an embodiment of the invention.

FIG. 24 illustrates an application of the impulse technique to the estimation of reservoir pressure for the same field example that is discussed above and depicted in FIG. 23. The bottom hole pressure is plotted (plot 658) versus the reciprocal of time in the Cartesian coordinates using Eq. 43, as a homogeneous formation is expected for the test. A straight-line 660 is extrapolated to derive the initial reservoir pressure of $P_i$, without requiring any additional formation and well information.

Note that estimation of reservoir pressure using Eqs. 43 to 45 requires knowledge of the reservoir model in order to apply an appropriate time group to the Cartesian plot. This reservoir model should be consistent with that identified from the subsequent interpretation in block 580. Block 582 (FIG. 21) is used to make sure that the reservoir models are consistent.

Still referring to FIG. 20, pursuant to block 580, a dynamic reservoir model is identified using the flowing and buildup bottom hole pressure. This step is called system identification in the entire workflow of well testing analysis. Here the system is the underlying reservoir model. Major dynamic reservoir models used in well testing analysis may include the following (as a non-exhaustive list): homogeneous reservoir model, single vertical hydraulic fracture model, dual-porosity model and dual-permeability model. System identification is important in that the subsequent interpretation and its results depend on which reservoir model is utilized in the analysis.

Figure 25:
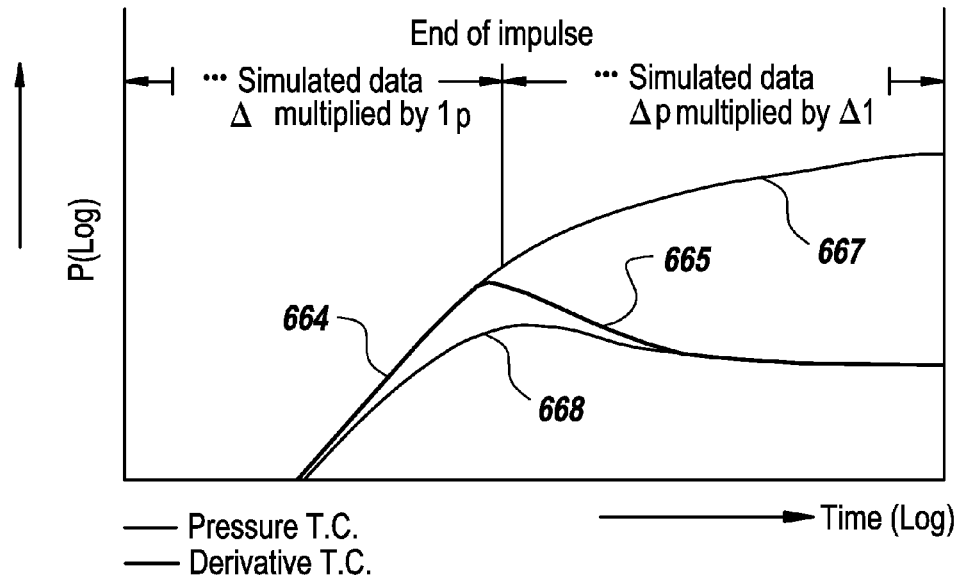
FIG. 25 illustrates an exemplary logarithmic plot to identify a dynamic reservoir model and estimate formation parameters for the case of a homogeneous reservoir according to an embodiment of the invention.
Figure 26:
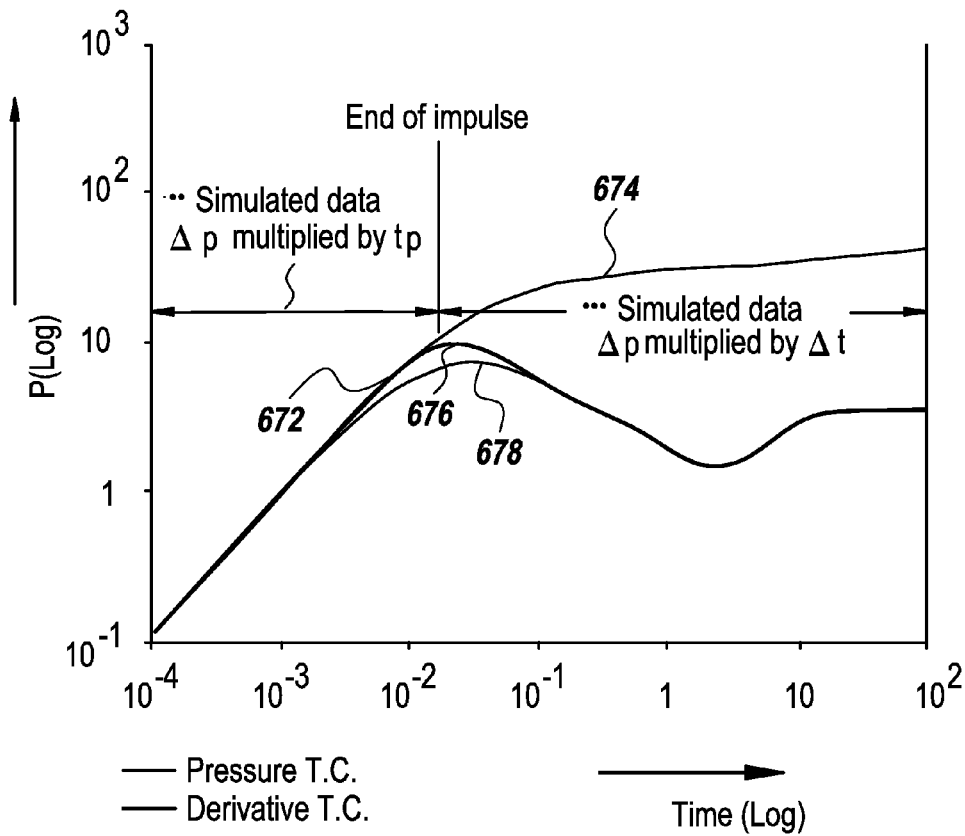
FIG. 26 is an exemplary logarithmic plot to identify a dynamic reservoir model and estimate formation parameters for a dual porosity reservoir according to an embodiment of the invention.

Several approaches are applicable for the purpose of reservoir model selection. In one exemplary approach, a pressure group $\Delta t^*(p_i-p_w)$ is calculated from the measured bottom hole pressure in logarithmic coordinates and is compared to the characteristics of the pressure group with theoretical type curve to identify the underlying dynamic reservoir model. FIGS. 25 and 26 demonstrate an application of this technique 667 (FIG. 25), 674 (FIG. 26) to homogeneous and dual-porosity reservoirs, respectively, for simulated bottom hole pressure with a short producing history. A pressure group $\Delta t^*(p_i-p_w)$ 664 (FIG. 25), 672 (FIG. 26) during the initial surge or flowing period matches a conventional pressure type curve, while the intermediate to late time value (i.e. derived from the data in the buildup period) history 665 (FIG. 25), 676 (FIG. 26) fits the conventional pressure derivative type curve 668 (FIG. 25), 678 (FIG. 26). The conventional pressure and pressure derivative type curves used here were given by Bourdet et al. in the article, entitled, "A new set of type curves simplifies well test analysis" published in the May 1983 issue of World Oil (Vol. 196, No. 5) and in the article, entitled, "Use of pressure derivative in well test interpretation" published in the June 1989 issue of SPE Formation Evaluation (Vol. 5, No. 2). Theoretically, different reservoir model shows special and unique features in pressure derivative curve at the intermediate to late time. From the intermediate to late time characteristics of the pressure group calculated by measured bottom hole pressure, it is possible to identify the underlying dynamic reservoir model that may be used in the further analysis.

Figure 27:
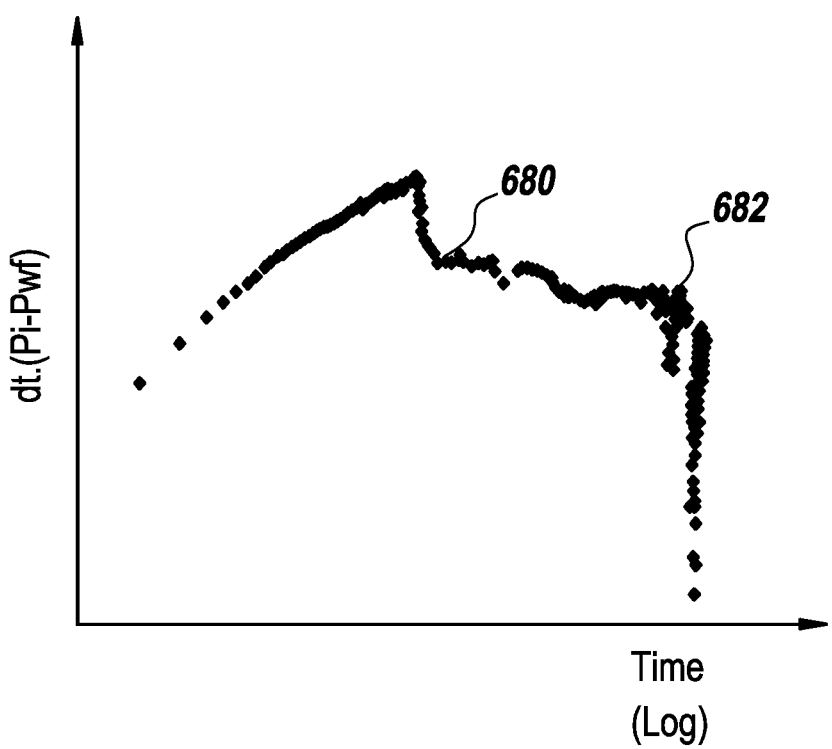
FIG. 27 illustrates an exemplary diagnostic plot using an impulse technique according to an embodiment of the invention.

FIG. 27 depicts the same field example plotted using the impulse technique. As shown, the pressure group $\Delta t^*(p_i-p_w)$ follows (segment 680) the conventional pressure type curve during the flowing period ($\Delta t<0.029$ hour) and then it moves to a conventional pressure derivative type curve on a stabilized horizontal line 682. There is no clear feature of any heterogeneous system in the late time data in FIG. 27, so a homogeneous reservoir model is suitable for the interpretation of the test.

Referring to FIG. 21, pursuant to the workflow 550, a determination (diamond 582) is made whether the identified reservoir model is consistent with the model used in the estimation of the reservoir pressure in block 578 (FIG. 20). If consistent, the interpretation continues, otherwise revisits block 578 where the reservoir pressure is re-estimated using the appropriate time group in the Cartesian plot of impulse technique.

Pursuant to block 584, the flow rate variation obtained from block 572 (FIG. 20) is calibrated by taking into account the total produced volume estimated from block 574, i.e., a coefficient called "$\theta$" is adjusted to equate the following expression:

$$V_t = \theta \int_0^{t_p} q(t)dt,\qquad\text{Eq. 49}$$

where "$V_t$" is the total liquid produced into the surge chamber, "q(t)" is the flow rate calculated from Eq. 41, $\theta$ is a coefficient to fine-tune the flow rate history in order to let the summation of the flow rate be equal to total produced volume. Next, pursuant to block 586, a first estimate of permeability or transmissibility and stabilized skin factor is estimated using the impulse technique in a logarithmic plot.

After the initial reservoir pressure and the reservoir model are determined, the next step of the analysis is to estimate the formation properties, such as permeability/transmissibility and the stabilized skin effect factor. As previously noted, the skin effect factor varies with time during the surge test, especially during the flowing period. Direct estimation of this skin variation in conjunction with permeability/transmissibility is difficult since the non-uniqueness is substantial. In accordance with some embodiments of the invention, a three-step, sequential and iterative procedure is used for the data analysis to enhance the reliability of the results and to minimize the non-uniqueness. Pursuant to this procedure, blocks 586 and 588 obtain the first estimate of permeability or transmissibility and stabilized skin using impulse technique; block 592 obtains, based on flow rate history calculated from block 584 and estimated permeability, the first estimate of skin variation using a convolution method; and blocks 604 and 606 (FIG. 22) are history matching of the bottom hole pressure using either analytical solutions or a numerical simulator to fine-tune the permeability or transmissibility, as well as variations of the skin and flow rate.

Regarding the impulse technique, pursuant to block 586 (FIG. 21), a product of elapsed time and pressure differential of a test (or $\Delta t^*(p_i - p_w)$) versus elapsed time is presented in logarithmic coordinates. Based on the impulse technique, the pressure group corresponding to short-producing period matches the conventional pressure type curve, while that corresponding to pressure buildup period at the intermediate to late time follows the conventional pressure derivative type curve, as depicted in FIGS. 24 and 25. If a sufficient match between the measured data and theoretical type curve is reached, three matching results may be obtained from type curve and measured data readings on abscissa, ordinate and skin index, as set forth below:

$$\left(\frac{t_D/C_D}{\Delta t}\right)_M = M_{abscissa}, \quad \text{Eq. 50}$$

$$\left(\frac{p_D}{\Delta p}\right)_M = M_{ordinate}, \text{ and} \quad \text{Eq. 51}$$

$$C_D e^{2S} = M_{skin\_index}, \quad \text{Eq. 52}$$

where $C_D$ is the dimensionless wellbore storage and is defined in field units by $C_D = 5.615 C/2\pi\phi c_t h r_w^2$, and the C is wellbore storage coefficient.

The first estimate of transmissibility "kh", wellbore storage coefficient "C" and stabilized skin factor "S" may be obtained from the solutions of Eqs. 50 to 52.

When pressure group data matches a pressure derivative type curve of a homogeneous reservoir, Eq. 51 may be reformulated based on the formulae given by Ayoub et al. in an article entitled, "Impulse testing" published in September 1988 issue of SPE Formation Evaluation (Vol. 4, No. 3). Since the horizontal line of the pressure derivative type curve for a homogeneous reservoir is 0.5, the transmissibility may be estimated by (in field units):

$$kh = \frac{1694.4 Q_t \mu}{PG_{reading}} \quad \text{Eq. 53}$$

where "$Q_t$" represents the total produced volume; and "$PG_{reading}$" represents the pressure group reading on the stabilized horizontal line. As a more specific example, substituting $Q_t = 40$ bbl, $\mu = 0.57$ cp, and $PG_{reading} = 0.63$ psi*hour in Eq. 53, the transmissibility kh of the field example shown in FIG. 26 is about 61321 md*ft.

Pursuant to block 588 (FIG. 21), the first estimate of permeability or transmissibility using the impulse technique in a Cartesian plot may also be obtained. One of the limitations of the technique in block 586 is that it requires visual judgment of the matching quality. To enhance the interpretation quality, the impulse technique in a Cartesian plot is also applied to the first estimate of kh and S if a wellbore storage coefficient is obtained.

Impulse pressure response satisfies the following expression at the late time of a buildup for a homogeneous reservoir by Kuchuk in article "A new method for determination of reservoir pressure" published in SPE paper 56418 and presented at SPE annual technical conference and exhibition, Houston, Tex., 3-6 Oct. 1989, as set forth below:

$$p_{ws} = p_i - \frac{141.2 \mu C P_o}{\pi k h}\left[\frac{1}{2\Delta t}\exp\left(-\frac{946.97\phi\mu c_t r_w^2}{4k\Delta t}\right) + \delta(t)S\right], \quad \text{Eq. 54a}$$

where "$p_o$" represents the wellbore pressure before the beginning of the test; and "$\delta(t)$" represents the Dirac delta function. Eq. 54a may be simplified at a sufficiently large time as follows:

$$p_{ws} = p_i - \left(\frac{70.6\mu C P_o}{kh}\right)\frac{1}{\Delta t}. \quad \text{Eq. 54b}$$

It can be seen from Eq. 54b that $p_{ws}$ versus $\Delta t^{-1}$ is a straight-line at the late time of a buildup in Cartesian plot. Using the slope of the straight-line $m_s$, the transmissibility kh may be obtained, as set forth below:

$$kh = \frac{70.6\mu C p_o}{m_s} \quad \text{Eq. 55}$$

Eq. 54b is a similar expression to Eq. 43, but Eq. 54b does not contain the parameter $\zeta$, which is usually unknown in the test. However, Eq. 54 requires wellbore storage C in the transmissibility estimate. This wellbore constant C is estimated from impulse technique in logarithmic plot as described above for block 586 or from conventional method for slug test. If C is not reliable due to insufficient pressure data point at the early test time or no good match on type curve, the entire block can be bypassed, and the parameters estimated in block 586 will be used directly for the further interpretation. Because there was a clear horizontal-line in FIG. 26 using logarithmic plot of the impulse technique for the field example, application of the Cartesian plot of the impulse technique also may be bypassed.

Continuing with the workflow 550, as depicted in FIG. 21, a determination is made, pursuant to diamond 590, whether the transmissibility obtained in blocks 586 and 588 are consistent. If they are consistent, the non-uniqueness of the interpretation is minimized and analysis continues to block 592, otherwise go back to the impulse technique to conciliate the difference from the two approaches.

The initial estimation of the skin variation is then calculated, pursuant to block 592. After flow rate history is obtained through block 572 (FIG. 20) and checked in block 584 and transmissibility is estimated in blocks 586 and 588, the first estimation of skin variation can be performed using a suitable convolution method. As an example, the convolution may be written (in field units) as follows:

$$p_i - p_{wf} = \hat{m}[q_0 \log(t) + q_N \overline{S} + \Sigma(t_N)], \quad \text{Eq. 56}$$

where $$\hat{m} = \frac{162.6\mu}{kh}, \quad \text{Eq. 57}$$

$$\overline{S} = \log\left(\frac{k}{\phi\mu c_t r_w^2}\right) - 3.227 + 0.869S, \quad \text{Eq. 58}$$

$$\Sigma(t_N) = \frac{q_1 - q_0}{t_1 - t_0}[(t_N - t_0)\log(t_N - t_0) - (t_N - t_1)\log(t_N - t_1)] + \frac{q_2 - q_1}{t_2 - t_1}[(t_N - t_1)\log(t_N - t_1) - (t_N - t_2)\log(t_N - t_2)] + \Lambda + (t_N - t_{N-1})\log(t_N - t_{N-1}) + 0.434(q_0 - q_N). \quad \text{Eq. 59}$$

In Eq. 59, $q_0, q_1, \ldots, q_N$ represent flow rate at time of $t_0, t_1, \ldots, t_N$, respectively. According to Eq. 56, if the skin effect factor is constant and the flow rate is accurate, $p_{wf}$ versus $q_0 \log(t) + \Sigma(t_N)$ should be on a straight-line with the slope of $\hat{m}$. Typical application of a convolution analysis is to find this straight-line in the measured pressure versus the time-group plot, and then calculate the transmissibility and constant skin from Eqs. 57 and 58, respectively. Other convolution methods use slightly different pressure group and/or time group expressions, but apply the same methodology for the data interpretation. In accordance with embodiments of the invention, the convolution expression is used to calculate the skin variation rather than transmissibility, as the transmissibility has been estimated approximately from impulse technique in block 586. Any deviation from the straight-line may be attributed to the skin variation. Therefore, the first estimation of the skin history may be obtained as follows:

$$S(t_N) = \frac{\frac{p_i - p_{wf}}{\hat{m}} - q_o \log(t_N) - \sum(t_N) - q_N \Theta}{0.869 q_N}, \quad \text{Eq. 60}$$

where $$\Theta = \log\left(\frac{k}{\phi\mu c_t r_w^2}\right) - 3.227. \quad \text{Eq. 61}$$

Figure 28:
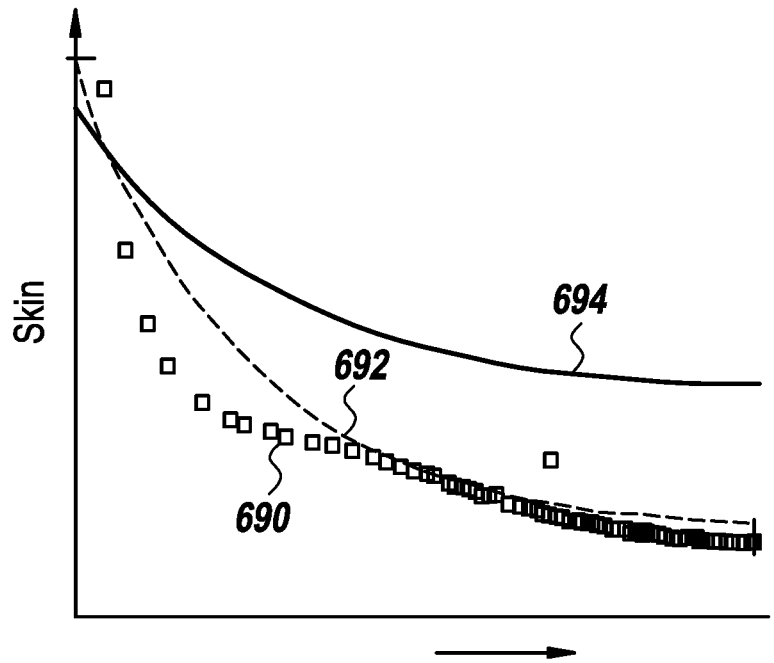
FIG. 28 illustrates calculation of skin effect variation according to an embodiment of the invention.

As a specific example, using the transmissibility kh obtained in block 586 and flow rate history obtained in block 572 and shown in FIG. 20, the skin variation of the field example is calculated. It is called "the first estimated skin variation" in this application and is depicted as squares in a plot 690 in FIG. 28. FIG. 28 also depicts a plot 692 based on the initial skin model and a plot 694 showing the final estimated skin effect factor. The skin effect factor had a large value about 8 at early test time during the flowing period, then, gradually stabilized to a low value of −2. This is a typical characteristic of the skin effect factor time variation, as the well was cleaned up during the early flowing phase. The clean-up capability continuously declined along with flow rate decrease, resulting in skin stabilization. The time variation of the skin effect factor is the major reason of the absence of a straight-line predicted by Eq. 56 or other convolution techniques for analysis of actual test data, since all existing convolution algorithms were derived with the assumption of a constant skin. The key is that when flow rate varies substantially, for which the convolution techniques are used, it induces the skin variation. Therefore, attempting to find a straight-line for analysis of actual tests under variable flow rate condition based on existing convolution algorithms often encounters difficulty. As described herein, in accordance with embodiments of the invention, the interpretation is conducted in such a way that time-varying flow rate and skin variations are considered.

The flow rate history and transmissibility estimated in block 572 (FIG. 20) and block 586 (FIG. 21) both may not be very robust because they were obtained using only a portion of the measured data and considerably simplified methods. For example, the sandface flow rate was assumed to be the same as the shrinkage rate of the air chamber volume during the surge in Eq. 41 of block 572. Only chamber pressure and temperature were used in the calculation, which usually cannot guarantee whether the flow rate history was consistent with the measured bottom hole pressure.

Similarly, the transmissibility was estimated by matching the pressure group to a conventional type curve using bottom hole pressure. The impulse technique is applicable only when the test time is substantially longer than the producing period. This applicability, however, may not be valid for all tests. All these constraints indicate the resulting skin variation shown in squares in FIG. 28 has uncertainties to some extent. Therefore, further improvement and consistency checks may be performed on the time-varying skin effect factor and flow rate. Still referring to FIG. 21, pursuant to block 594, the flow rate and skin variation models are selected; and curve fitting is used to fit the parameters to the selected models.

The plot 690 in FIG. 28 represents the skin variations calculated from Eq. 60. Although many skin models, such as a hyperbolic, parabolic or linear function, may be used in accordance with some embodiments of the invention, a model that uses the exponential function (Eq. 2) is described herein. The plot 692 in FIG. 28 is obtained from the selected model using Eq. 2, in which the parameters are $S_I=8$, $S_E=-2$, $\lambda=4$ and $t_s=100$ sec. A curve fitting technique is preferred in obtaining the best skin model, but not necessary. Manual adjustment may be used if the first estimated skin variation has large noise.

Figure 29:
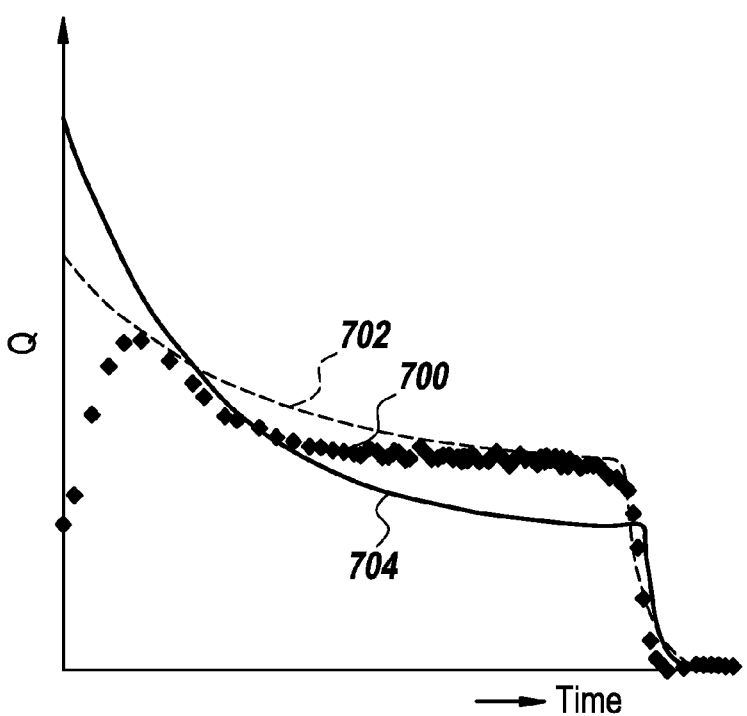
FIG. 29 is an illustration of the calculation of the flow rate history according to an embodiment of the invention.
Figure 30:
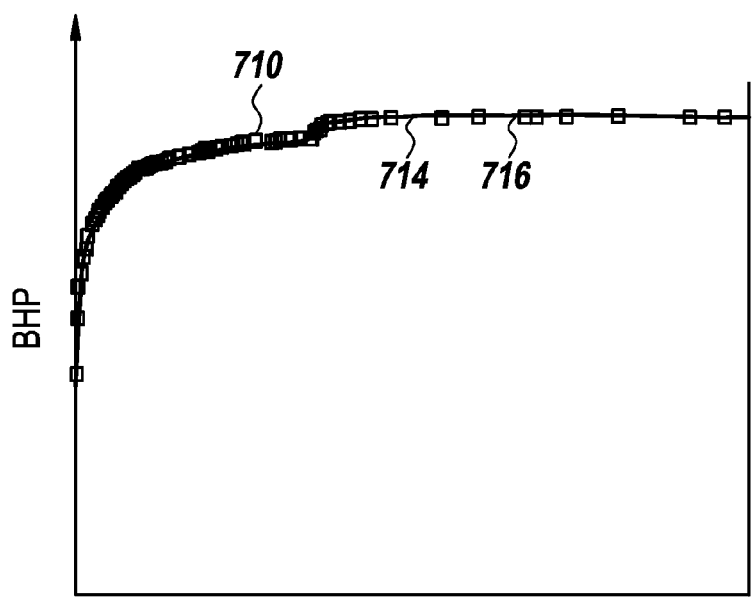
FIG. 30 illustrate a history matching of bottom hole pressure using an analytical solution with exponential flow rate and skin models according to an embodiment of the invention.

A plot 700 in FIG. 29 represents the flow rate history calculated from Eq. 41 and previously plotted in FIG. 23. Similar to skin, many flow rate models, such as a hyperbolic, parabolic or linear function, are possible and may be used, depending on the particular embodiment of the invention. As described below for purposes of example, an exponential function (Eq. 1) is used for constructing a flow rate model. A plot 702 in FIG. 30 is the curve fitting result using Eq. 1 in which the parameters are $q_I=60000$ bbl/day; $q_E=30000$ bbl/day; $\alpha=3$; $t_f=100$ sec and $\beta=1000$ l/hour. A curve fitting technique may be used in obtaining the best flow rate model, but other techniques may be used in other embodiments of the invention. Manual adjustment may be used if the first estimated flow rate history has large noise.

The flow rate and skin models will be further updated and improved in the following history matching of the bottom hole pressure and/or chamber pressure using analytical solution or numerical simulator.

Referring to FIG. 22 in conjunction with FIG. 21, continuing the workflow 550, a determination is made (diamond 602) whether the history matching is using a numerical simulator or an analytical solution. For the analytical solution, Eqs. 26 and 36 may be used.

The necessity of conducting history matching of as much measured pressure data as possible can be best understood from the limitations of the existing techniques used in blocks 586 and 588. From FIGS. 25 and 26, the measured data at early time match a pressure curve while late time match a pressure derivative curve. There is a transitional period, within which the measured data do not match any theoretical model. This indicates the theoretical solution does not match all measured pressure data but only a portion of it. A significant amount of the data, such as the pressure data corresponding to the transitional time between the end of the impulse and the matching of the derivative type curve, may be of no use in FIGS. 25 and 26. Thus, no solution in the impulse technique may be used for this portion of pressure measurements in the data analysis. On the other hand, convolution solutions, such as Eq. 56, predict a straight-line between the measured pressure and a time group if flow rate history is known. After the slope of the straight-line is determined, transmissibility is calculated using expression linking the slope to the formation property, such as Eq. 57 for the convolution expression in Eq. 56. However, due to variable skin and uncertainty associated with flow rate history, such a straight-line usually does not exist. Even if there seems to have a straight-line, it may substantially deviate from the accurate value. Estimation of transmissibility from the existing convolution algorithms using the plausible straight-line is not reliable unless the flow rate can be obtained accurately, which is often not the case. Therefore, the conventional analytical algorithms cannot render solutions that match all or almost all measured pressure data.

Using the methodology presented herein, the analytical solutions accounts for time-varying variable flow rate and skin. The representative solutions are given in Eqs. 26 and 36. Other solutions suitable for dual porosity, dual permeability, and hydraulically fractured reservoirs etc. may be derived in a similar manner and are within the scope of the appended claims. Because there was no heterogeneous characteristics from the system identification plot in block 580, Eqs. 26 and 36 are applied to the field example. Essentially, the transmissibility estimated in block 586; flow rate and skin models selected in block 594 and shown in FIGS. 28 and 29 provide very good initial conditions to match bottom hole pressure using the analytical solutions (Eq. 26 and 36). Adjusting the parameter values in the flow rate and skin models as well as transmissibility by optimization algorithm outlined in Eq. 37 to Eq. 40 or manual improvement, it is possible the calculated bottom hole pressure can match the measured pressure data. Because the flow rate and skin models in Eqs. 1 and 2 greatly simplifies the complicated actual data, history matching can be conducted by only changing limited parameters, $S_f$, $S_E$, $\lambda$, $t_s$, $q_f$, $q_E$, $\alpha$, $t_f$ and $\beta$. Note that not all of these parameters may be optimized in a test.

Some parameters may be determined based on visual assessment of the flow rate and skin results. For example, $t_f$ should be known when the optimal shut-in is implemented (Eq. 1). The time $t_s$ may be known from the general shape of the skin variation. This makes application of the optimization algorithm to the history matching possible. Excellent matching between Eqs. 26 and 36 and the bottom hole pressure measurement may be obtained for the field example as demonstrated by plot 714 in FIG. 30. The analytical solution (shown by plot 714) and numerical solution (shown by plot 716) closely follow the measured bottom hole pressure (plot 710) both in the flowing and buildup periods. This indicates the solutions indeed represent the entire bottom hole pressure variation rather than a portion of it. From this excellent matching, flow rate and skin models as well as formation transmissibility can be finalized.

Plots 694 (FIG. 28) and 704 (FIG. 29) depict the finalized skin variation and flow rate history, respectively, for this field test using the analytical solutions. They are different from the first estimated skin and flow rate, but not very far from them. The final transmissibility estimated from the history matching is 1.09e+5 ft*md.

If a numeral simulator is used for the history matching, then the numerical simulator integrates the dynamic flow simulation inside wellbore and fluid transport in formation, pursuant to block 606 of FIG. 22. The wellbore dynamic characteristics may be obtained by solving the following governing equations or their various simplified forms:

$$\frac{\partial}{\partial t}(A\rho) + \frac{\partial}{\partial z}(A\rho v) = \hat{q}_{prod}[S(z = z_L) - S(z = z_T)], \quad \text{Eq. 62}$$

$$\frac{\partial}{\partial t}(A\rho v) + \frac{\partial}{\partial t}(A\rho v^2) = -A\frac{\partial p}{\partial z} - F_f - A\rho g, \quad \text{Eq. 63}$$

where "$\rho$" represents the density of wellbore fluid; "v" represents the velocity; "A" represents the cross-section area of the flow channel; "$F_f$" represents the friction force; "$\hat{q}_{prod}$" represents the production rate per unit length of the producing formation; "S" represents the step function; "$Z_L$" and "$z_T$" represent the depth of the lower and upper boundary of the producing zone, respectively. Eqs. 62 and 63 are solved in combination of fluid transport equations in formation. Various possible utilities are available for the purpose of calculating the fluid dynamics in formation. For example, a reservoir simulator, such as the Eclipse Simulator, which is available from Schlumberger, may be utilized to simulate the fluid flow in formation. The solutions of Eqs. 62 and 62 are incorporated in the Eclipse Simulator to obtain the bottom hole pressure, chamber pressure and detailed fluid dynamics inside wellbore for a well test.

To represent the complicated conditions of a surge test as close as possible, a numerical simulator requires many inputs and parameters. It is usually impractical to infer formation properties and flow rate directly from the simulator by history matching the pressure measurements since the non-uniqueness could be significant. Therefore, the interpretation techniques based on analytical solutions should be used to narrow down the estimated properties, which are then verified and improved by the comprehensive numerical simulator. The analytical solutions and the sequential and iterative analysis techniques that are introduced herein are aimed to obtain reliable values of the formation and fluid flow properties for the further improvement from a numerical simulator. This substantially reduces the uncertainties in the estimated properties. The transmissibility of 1.09e+5 ft*md and the estimated skin variation by the analytical solutions depicted by plot 694 in FIG. 28 are input in the numerical simulator for the field example.

The plot 716 in FIG. 30 depicts the simulated bottom hole pressure from the simulator. Because an excellent match was obtained, no further adjustment of the formation properties was needed. This result verified the formation properties and skin variation history obtained by the analytical solutions and the sequential interpretation workflow. If the simulated results substantially deviate from those of the analytical solutions, we can go back to the previous analysis steps using the analytical solutions and reprocess the data again until the differences are properly conciliated.

Figure 31:
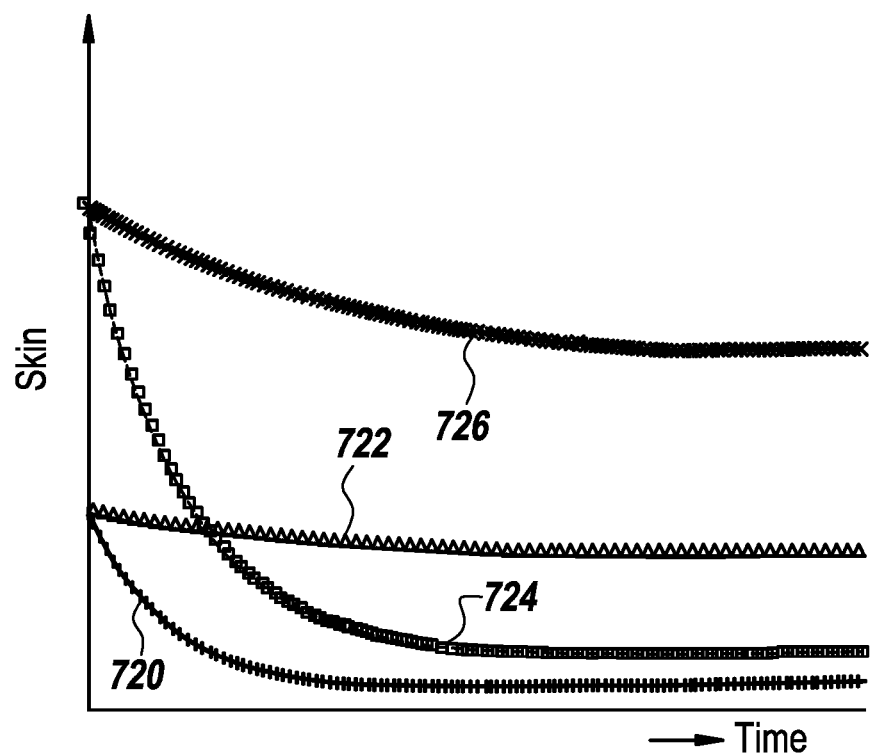
FIG. 31 depicts exemplary skin effect variations according to an embodiment of the invention.

The estimation of a time-varying skin effect factor is not just for providing better matching between the pressure measurements and the outputs of the analytical solutions or the numerical simulator, the time-varying skin effect factor estimation also has important usages for oil field development and management. For example, FIG. 31 illustrates four examples of the skin variations for evaluating the quality of perforation and clean-up. These skin variation histories may be interpreted as follows. Plot 720 depicts a skin effect factor for a well that had a good perforation due to the small initial skin and a good clean-up operation due to the small stabilized skin. Both the perforation and clean-up practices were appropriate for this well and even for the entire field. Plot 722 depicts a skin effect factor for a well that had a good perforation job because of the small initial skin but inefficient clean-up because of the persistent skin value. So, the perforation practice was appropriate, but the clean-up could be improved. Plot 724 depicts a skin effect factor for a well that had a poor perforation as the initial skin was large. However, the clean-up job was excellent as the skin decreased substantially and the stabilized skin effect factor was even smaller than the plot 722 (triangle-line), which has smaller initial skin. Thus, the high skin from perforation might be tolerable. Plot 726 depicts a skin effect factor for a well that had both a poor perforation and a mediocre clean-up. Therefore, the quality of perforation or clean-up should be improved in order to achieve satisfactory productivity of the well.

The above examples are given just for the purpose of illustrating the usage of the skin variations. Other types of skin variations and other usages are also possible, in accordance with other embodiments of the invention. The analytical solutions and the interpretation workflow that are described herein improve the capability of calculation of skin variations. Therefore, better estimation of formation parameter and detailed assessment of well completions are possible by applying the workflow to a well test.

Still referring to FIG. 22, pursuant to the workflow 550, after the history matching, a determination (diamond 608) is made whether the history match quality is acceptable or not. The acceptable criteria can be (a) a satisfactory matching quality is achieved by using the analytical solutions or a numerical simulator; or (b) satisfactory matching quality and consistent results are obtained by using both the analytical solutions and a numerical simulator. If the history matching quality is acceptable, then the final results are provided, pursuant to block 612. Otherwise, the following corrective action is taken.

A determination is made (diamond 610) whether it is necessary to change reservoir model or not. Improvements of the reservoir model include, but are not limited to, using a new reservoir model that is different from the model used. For example, if homogeneous model was applied to the first interpretation and the results were not satisfactory, a dual-porosity model may be used in the new analysis if the selection can be supported by enough reservoir data.

If the reservoir model is not changed, a determination is then made (diamond 596 of FIG. 21) whether or not to estimate formation properties again using the impulse techniques with new flow rate and skin factor variations obtained in block 604 and/or 606. If the formation properties are to be estimated again, the workflow proceeds to block 586 and/or 588 to perform another estimate. Otherwise, the workflow proceeds to block 598.

If the permeability and stabilized skin are not re-estimated, then a decision is made (diamond 598 of FIG. 21) whether or not to recalculate skin variation using the technique in block 592. If so, then the workflow proceeds back to block 592 to calculate skin variation again using convolution algorithm Eq. 60 as a new flow rate history and permeability estimation are available after the history matching from the analytical solutions and/or a numerical simulator. If a decision is made (diamond 598) to not recalculate the skin, then the workflow proceeds to diamond 600.

Pursuant to diamond 600, a decision is made whether or not to re-select the skin model. If so, then the workflow proceeds to block 594 to select a new skin model and obtain the parameter values in the model through curve fitting the estimated skin. If not, then the workflow proceeds to diamond 602 to begin history matching again.

In the workflow described above, the flow rate is estimated using the upper chamber pressure in block 584, and is fine-tuned using history matching in block 604 and/or 606. Those familiar with the art understand that the flow rate variation may also be obtained by a flow meter device. The interpretation techniques that are described herein may likewise be applied to a measured flow rate, in accordance with other embodiments of the invention.

Although the formulae, solutions and interpretation methods that are disclosed herein are suitable for CCT, they may also be used for other tests whenever variable flow rate and/or variable skin effect factor conditions occur. For example, pressure measurements in a conventional under-balanced perforating (wellbore cushion pressure is less than formation pressure) for a weak pressure reservoir may be analyzed using the methods that are described herein. Because the fluid in the well does not flow to surface due to insufficient reservoir pressure, the upper end of the surge chamber is often opened during the test. However, the surge flow after perforating still induces variable flow rate and variable skin effect factor condition. In this situation, except flow rate history is determined from conventional slug test approach, all other techniques that are disclosed herein may be equally applied. Thus, analysis of pressure in a conventional under-balanced perforating is within the scope of the appended claims, as the techniques that are described herein are applicable to any test that is subject to a variable time skin effect factor.

As another example, in another situation, perforating may be conducted in an over-balanced condition (i.e., wellbore pressure is larger than reservoir pressure), but the surge may start later after the wellbore pressure is reduced to a lower level, which is less than formation pressure. One way to create such situation is to apply high pressure from surface onto the surge chamber using nitrogen or other gas before perforating, and then the pressure is released to induce the surge flow after the well is perforated. Another way is to create high pressure in the wellbore and then close the test valve 50 to trap the high pressure condition. The perforation can be conducted in an over-balanced condition below the test valve. Subsequently, the pressure above the test valve can be reduced to create an under-balanced condition for the surge flow. The surge flow starts after the test valve is opened. Those familiar with the art may be appreciated that there are many ways to initiate a surge flow in a well in a variety of situations and operations. In all these situations, variable flow rate and/or variable skin effect factor may exist. The interpretation methods that are described herein may equally be applied.

The techniques that are disclosed herein may also be applied to a conventional well test or drill stem test (DST) where the production at the surface may be constant but the skin effect factor varies. A situation like this may happen for a conventional well test or DST during clean-up period. Because skin effect factor continuously varies with time in this situation, pressure change cannot be accurately modeled by existing well test solutions as they do not consider variable skin effect factor condition. Instead, the solutions and interpretation techniques that are described herein may be applied because Eq. 7 may equally be applied to constant flow condition. Therefore, the analysis methods described herein may be applied in any variable skin effect factor situation no matter whether the flow rate is constant or variable with respect to time Similarly, the techniques that are described herein may also be used to analyze pressure measurements of an injection test, during which skin effect factor usually increases as incompatible fluid is forced into the formation, resulting increase of formation damage. Current solutions used for analyzing the injection test cannot handle the variable skin effect factor, so they may not be able to match the measured pressure. Because Eq. 7 can handle any type of skin variation no matter it increases, decreases or constant, the techniques that are described herein may also be used to analyze data in this situation.

In summary, tests with skin effect factor variation (either increase, decrease or arbitrary change), induced due to conventional production, well clean-up, surge, closed chamber test, injection test, pulse injection or other operations, no matter whether flow rate is constant or variable, and no matter flow rate is measured or calculated, may be analyzed using the techniques that are described herein, as all variations are within the scope of the appended claims.

The techniques that are disclosed herein may also be applied to skin effect factor variations due to surge flow in a wireline-conveyed operation. For example, wireline underbalanced perforating may induce a significant surge flow, during which variable flow rate and variable skin effect factor may happen. The interpretation methods disclosed herein is suitable for the data analysis, parameter estimation or simply pressure simulation (bottom hole pressure (BHP) simulation, as a non-limiting example).

In other embodiments of this invention, the analytical solutions and the methods may not be used for parameter estimation. Instead, they may be used only to calculate bottom-hole pressure in the variable flow rate and/or variable skin effect factor condition for purpose of reservoir management.

In summary, techniques that are disclosed herein may generally be applied to a wide variety of different tests to estimate/simulate a wide range of parameters/properties. Their applicability does not restrict within a particular testing technique, although the CCT is discussed in detail herein as a specific non-limiting example. The applicability of the techniques also does not depend on the wellbore fluid producing or entering into the formation during the test; does not depend on whether the test is carried out using wireline, tubing, coiled tubing, drill pipes or other methods; does not rely on whether the flow rate is estimated or measured in the test. Whenever there is skin effect factor variation during a test operation, the analysis techniques that are disclosed herein may be applied.

While the terms of orientation and direction, such as "upper," "lower," "bottom," "upstream," etc., have been used herein to describe certain embodiments of the invention, it is understood that embodiments of the invention are not to be limited to these specified orientations and directions. For example, in other embodiments of the invention, the CCT system may be used to conduct a CCT inside a lateral wellbore. Thus, many variations are possible and are within the scope of the appended claims.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
based on measurements obtained in a well during a dynamic fluid flow, modeling a pressure in the well as a function of at least a skin effect factor that varies with time; and
performing a test in the well to obtain the measurements, wherein performing the test comprises closing off a surge chamber in response to a downhole parameter measured in connection with the test.

2. The method of claim 1, further comprising:
using the results of the modeling to estimate at least one well parameter.

3. The method of claim 2, wherein said at least one well parameter comprises parameters selected from a group consisting essentially of a formation parameter and a well pressure.

4. The method of claim 1, further comprising:
performing a test in the well to obtain the measurements during a surge fluid flow entering the well due to an under-balanced pressure differential between the wellbore and the formation.

5. The method of claim 1, further comprising:
performing a test in the well to obtain the measurements during a time in which wellbore fluid is forced into the formation due to an over-balanced pressure differential between the wellbore and formation.

6. The method of claim 1, further comprising:
performing a test to obtain the measurements during a clean up operation in the well.

7. The method of claim 1, wherein the act of modeling the pressure comprises:
determining a sandface flow rate history associated with a test in which the measurements were obtained; and
generating a model for the sandface flow rate which corresponds to the sandface flow rate history.

8. The method of claim 7, further comprising:
calculating the flow history from pressure measurements made during the test.

9. The method of claim 7, further comprising:
measuring the sandface flow rate history directly from a flow meter device.

10. The method of claim 7, further comprising:
calibrating the flow history based on a produced volume of well fluid during the test.

11. The method of claim 1, wherein the act of modeling the pressure comprises:
modeling the pressure based on a flow rate that varies with time.

12. The method of claim 11, further comprising:
determining a model for flow rate history, comprising:
using at least one of single and piecewise functions.

13. The method of claim 12, wherein the function comprises at least one of the following: a linear function, an exponential function, a polynomial function, a hyperbolic function and a parabolic function.

14. The method of claim 1, wherein the act of modeling the pressure comprises:
determining a skin effect factor history associated with a test in which the measurements were obtained; and
generating a model for the skin history factor which corresponds to the skin factor history.

15. The method of claim 14, wherein the act of determining the skin factor history comprises:
calculating the skin factor history based on a flow rate history and an estimated permeability.

16. The method of claim 1, wherein the modeled pressure comprises pressures at the corresponding locations of the measurements.

17. The method of claim 1, wherein the measurements comprise at least one of pressure measurements and temperature measurements.

18. The method of claim 1, further comprising:
generating a model for a skin factor history, comprising:
using at least one of single and multiple piecewise elementary functions.

19. The method of claim 18, wherein the function comprises at least one of the following: a linear function, an exponential function, a polynomial function, a hyperbolic function and a parabolic function.

* * * * *